United States Patent
DeCamp et al.

(10) Patent No.: US 11,614,776 B2
(45) Date of Patent: Mar. 28, 2023

(54) SYSTEMS AND METHODS FOR DOCKING STATIONS REMOVABLY ATTACHABLE TO DISPLAY APPARATUSES

(71) Applicant: TARGUS INTERNATIONAL LLC, Anaheim, CA (US)

(72) Inventors: Ronald DeCamp, Anaheim, CA (US); Man Cheung Dan Tsang, Anaheim, CA (US); Nicholas Anthony Markovsky, Anaheim, CA (US)

(73) Assignee: TARGUS INTERNATIONAL LLC, Anaheim, CA (US)

( * ) Notice: Subject to any disclaimer, the term of this patent is extended or adjusted under 35 U.S.C. 154(b) by 167 days.

(21) Appl. No.: 17/016,005

(22) Filed: Sep. 9, 2020

(65) Prior Publication Data
US 2021/0072792 A1 Mar. 11, 2021

Related U.S. Application Data

(63) Continuation-in-part of application No. 16/833,089, filed on Mar. 27, 2020.
(Continued)

(51) Int. Cl.
*G06F 1/16* (2006.01)
*G06F 13/40* (2006.01)
(Continued)

(52) U.S. Cl.
CPC .......... *G06F 1/1632* (2013.01); *G06F 1/1679* (2013.01); *G06F 13/4022* (2013.01);
(Continued)

(58) Field of Classification Search
CPC .... G06F 1/1632; G06F 1/1601; G06F 1/1626; G06F 1/1656; G06F 1/1679; G06F 1/266; H04B 1/3877
(Continued)

(56) References Cited

U.S. PATENT DOCUMENTS 5,278,730 A * 1/1994 Kikinis ................ H05K 5/0273
361/679.55
5,539,616 A * 7/1996 Kikinis .............. H04Q 11/0428
361/679.41
(Continued)

FOREIGN PATENT DOCUMENTS

AU 2014100171 A4 3/2014
CN 101893916 A 11/2010
(Continued)

OTHER PUBLICATIONS

U.S. Appl. No. 16/849,799, Notice of Allowance, dated Oct. 8, 2021, 5 pages.
(Continued)

*Primary Examiner* — Adrian S Wilson
*Assistant Examiner* — Gage Crum
(74) *Attorney, Agent, or Firm* — Stoel Rives LLP

(57) ABSTRACT

Systems and methods disclosed herein disclose the use of docking stations with docking station receptacles of display apparatuses and docking stand assemblies. A docking station placed in a docking station receptacle of a display apparatus may connect to a host device and transport power and/or data as between the docking station, the host device, the display apparatus, and any external object(s). A docking station placed in a docking station receptacle of a docking stand assembly that includes a docking tray configured to interface with a portable electronic device (PED) may transport power and/or data as between the docking station, the PED, and any external objects via a power and data delivery pathway within the docking stand assembly.

24 Claims, 41 Drawing Sheets

Related U.S. Application Data

(60) Provisional application No. 62/911,756, filed on Oct. 7, 2019, provisional application No. 62/897,772, filed on Sep. 9, 2019.

(51) Int. Cl.
*H04B 1/3877* (2015.01)
*G06F 13/42* (2006.01)

(52) U.S. Cl.
CPC ....... *G06F 13/4282* (2013.01); *H04B 1/3877* (2013.01); *G06F 2213/0042* (2013.01); *G06F 2213/3814* (2013.01)

(58) Field of Classification Search
USPC .................................................. 361/679.41
See application file for complete search history.

(56) References Cited

U.S. PATENT DOCUMENTS

| | | | |
|---|---|---|---|
| 5,627,974 A | 5/1997 | Watts, Jr. et al. | |
| 5,692,400 A | 12/1997 | Bliven et al. | |
| 5,835,733 A | 11/1998 | Walsh et al. | |
| 5,864,708 A * | 1/1999 | Croft | G06F 1/1632 |
| | | | 398/118 |
| 5,886,424 A | 3/1999 | Kim | |
| 6,029,215 A | 2/2000 | Watts, Jr. et al. | |
| 6,170,026 B1 | 1/2001 | Kimura et al. | |
| 6,275,378 B1 * | 8/2001 | Lee | E05B 73/0082 |
| | | | 361/679.55 |
| 6,604,199 B1 | 8/2003 | Yang et al. | |
| 6,629,182 B1 | 9/2003 | Mizoguchi et al. | |
| 6,665,805 B1 | 12/2003 | Tsirkel et al. | |
| 6,804,740 B1 | 10/2004 | Watts et al. | |
| 6,888,338 B1 | 5/2005 | Popescu-Stanesti et al. | |
| 6,956,474 B2 | 10/2005 | Jakubowski | |
| 6,976,885 B2 | 12/2005 | Lord | |
| 7,035,100 B2 | 4/2006 | Charles | |
| 7,035,126 B1 | 4/2006 | Lanni | |
| 7,062,389 B2 | 6/2006 | Johnson et al. | |
| 7,099,152 B2 | 8/2006 | Gasbarro | |
| 7,103,760 B1 | 9/2006 | Billington et al. | |
| 7,171,461 B2 | 1/2007 | Ewing et al. | |
| 7,201,611 B2 | 4/2007 | Faranda | |
| 7,225,227 B2 | 5/2007 | Omura et al. | |
| 7,281,698 B2 | 10/2007 | Patterson, Jr. | |
| 7,403,232 B1 | 7/2008 | Orlicki et al. | |
| 7,471,511 B2 | 12/2008 | Montag et al. | |
| 7,643,283 B2 | 1/2010 | Jubelirer et al. | |
| 7,681,134 B1 | 3/2010 | Grechishkin et al. | |
| 7,683,573 B2 | 3/2010 | Nikazm et al. | |
| 7,818,480 B2 | 10/2010 | Hoerl et al. | |
| 7,899,970 B2 | 3/2011 | Mori | |
| 7,926,430 B2 | 4/2011 | Bakker | |
| 7,976,337 B1 | 7/2011 | Cortopassi et al. | |
| 8,074,581 B2 | 12/2011 | Epstein et al. | |
| 8,312,199 B2 | 11/2012 | Johnson | |
| 8,323,040 B2 | 12/2012 | Prest | |
| 8,346,753 B2 | 1/2013 | Hayes | |
| 8,358,943 B2 | 1/2013 | Kim | |
| 8,359,356 B2 | 1/2013 | Belz et al. | |
| 8,395,605 B2 | 3/2013 | Sisto et al. | |
| 8,508,573 B2 | 8/2013 | Grimshaw | |
| 8,510,424 B2 | 8/2013 | Ewing et al. | |
| 8,611,076 B2 | 12/2013 | Wetzel et al. | |
| 8,751,836 B1 | 6/2014 | Piszczek et al. | |
| 8,762,752 B2 | 6/2014 | Inbaraj et al. | |
| 8,797,159 B2 | 8/2014 | Kirkpatrick et al. | |
| 8,799,537 B1 | 8/2014 | Zhu et al. | |
| 8,879,250 B2 | 11/2014 | Franz | |
| 8,884,896 B2 | 11/2014 | Tabone et al. | |
| 8,896,656 B2 | 11/2014 | Epstein et al. | |
| 8,909,842 B2 | 12/2014 | Johnson | |
| 8,913,380 B2 * | 12/2014 | Enomoto | G06F 1/1632 |
| | | | 361/679.41 |
| 8,990,469 B2 | 3/2015 | Benhard et al. | |
| 9,152,177 B2 | 10/2015 | Feldstein | |
| 9,189,751 B2 | 11/2015 | Matsuoka et al. | |
| 9,224,290 B1 | 12/2015 | Mason et al. | |
| 9,249,927 B2 | 2/2016 | Graham | |
| 9,274,994 B2 | 3/2016 | Capezza | |
| 9,304,545 B2 | 4/2016 | Ramirez et al. | |
| 9,338,268 B2 | 5/2016 | Holtman | |
| 9,377,814 B2 | 6/2016 | Ramirez et al. | |
| 9,392,427 B2 | 7/2016 | Goldman | |
| 9,411,551 B2 | 8/2016 | Haren | |
| 9,456,686 B2 | 10/2016 | Epstein | |
| 9,531,651 B1 | 12/2016 | Cherubini | |
| 9,602,760 B2 * | 3/2017 | Griffin | G06F 1/1601 |
| 9,612,628 B2 | 4/2017 | Halim et al. | |
| 9,647,481 B2 | 5/2017 | Huang et al. | |
| 9,696,777 B2 | 7/2017 | Pamley et al. | |
| 9,723,358 B1 | 8/2017 | Chan | |
| 9,736,427 B1 | 8/2017 | Grimshaw et al. | |
| 9,760,116 B2 | 9/2017 | Wylie | |
| 9,778,779 B2 | 10/2017 | Chartier et al. | |
| 9,794,496 B2 | 10/2017 | Soffer et al. | |
| 9,829,333 B1 | 11/2017 | Calder | |
| 9,838,475 B2 | 12/2017 | Brown et al. | |
| 9,961,306 B1 | 5/2018 | Lev et al. | |
| 10,001,807 B2 | 6/2018 | Chung et al. | |
| 10,108,221 B1 | 10/2018 | Jin et al. | |
| 10,354,531 B1 | 7/2019 | Bronder et al. | |
| 10,452,096 B1 | 10/2019 | Keilers et al. | |
| 10,462,611 B1 | 10/2019 | Klinkner et al. | |
| 10,499,531 B2 | 12/2019 | Schmidt et al. | |
| 10,623,701 B1 | 4/2020 | Bracewell et al. | |
| 10,663,498 B2 | 5/2020 | Decamp et al. | |
| 10,782,735 B2 * | 9/2020 | Wylie | G06F 1/1654 |
| 10,962,248 B1 | 3/2021 | Hasan et al. | |
| 11,017,334 B2 | 5/2021 | Decamp et al. | |
| 11,360,534 B2 | 6/2022 | Decamp et al. | |
| 2002/0080132 A1 | 6/2002 | Dai et al. | |
| 2002/0095533 A1 * | 7/2002 | Esterberg | G06F 1/1632 |
| | | | 710/8 |
| 2002/0119800 A1 | 8/2002 | Jaggers et al. | |
| 2003/0084222 A1 | 5/2003 | Wurzburg | |
| 2003/0107566 A1 | 6/2003 | Shin et al. | |
| 2003/0114206 A1 | 6/2003 | Timothy et al. | |
| 2003/0154293 A1 | 8/2003 | Zmolek et al. | |
| 2003/0182150 A1 | 9/2003 | Reddy | |
| 2003/0217098 A1 | 11/2003 | Bobde et al. | |
| 2003/0217142 A1 | 11/2003 | Bobde et al. | |
| 2003/0222149 A1 | 12/2003 | Solomon et al. | |
| 2003/0222848 A1 | 12/2003 | Solomon et al. | |
| 2004/0064621 A1 | 4/2004 | Dougherty et al. | |
| 2004/0088465 A1 | 5/2004 | Bianchi | |
| 2004/0095713 A1 | 5/2004 | Chuang | |
| 2004/0111382 A1 | 6/2004 | Haji-Ioannou | |
| 2004/0116149 A1 | 6/2004 | Yukie et al. | |
| 2004/0125777 A1 | 7/2004 | Doyle et al. | |
| 2004/0212586 A1 | 10/2004 | Denny | |
| 2004/0268163 A1 | 12/2004 | Yeh | |
| 2005/0033481 A1 | 2/2005 | Budhraja et al. | |
| 2005/0036283 A1 | 2/2005 | Hillman et al. | |
| 2005/0057893 A1 | 3/2005 | Homer et al. | |
| 2005/0114503 A1 | 5/2005 | Ruetschi et al. | |
| 2005/0162824 A1 | 7/2005 | Thompson | |
| 2005/0164545 A1 | 7/2005 | Rosenthal et al. | |
| 2005/0180086 A1 | 8/2005 | Schaefer et al. | |
| 2005/0207110 A1 * | 9/2005 | Wang | G06F 1/1626 |
| | | | 361/679.43 |
| 2005/0213298 A1 * | 9/2005 | Doherty | G06F 1/1632 |
| | | | 361/679.44 |
| 2005/0245115 A1 | 11/2005 | Bell et al. | |
| 2005/0246421 A1 | 11/2005 | Moore | |
| 2006/0005055 A1 | 1/2006 | Potega | |
| 2006/0031454 A1 | 2/2006 | Ewing et al. | |
| 2006/0061958 A1 | 3/2006 | Solomon et al. | |
| 2006/0075286 A1 | 4/2006 | Hodge et al. | |
| 2006/0095641 A1 | 5/2006 | Pandit et al. | |
| 2006/0103504 A1 | 5/2006 | Vassallo | |
| 2006/0112375 A1 | 5/2006 | Schneider | |
| 2006/0123807 A1 | 6/2006 | Sullivan et al. | |

(56) References Cited

U.S. PATENT DOCUMENTS

| | | |
|---|---|---|
| 2006/0161713 A1 | 7/2006 | Belady |
| 2006/0205381 A1 | 9/2006 | Beart et al. |
| 2006/0250764 A1 | 11/2006 | Howarth et al. |
| 2006/0250765 A1 | 11/2006 | Howarth et al. |
| 2006/0250767 A1 | 11/2006 | Brophy et al. |
| 2007/0030276 A1 | 2/2007 | MacInnis et al. |
| 2007/0033289 A1 | 2/2007 | Nuyttens et al. |
| 2007/0054550 A1 | 3/2007 | Cuthbert et al. |
| 2007/0055740 A1 | 3/2007 | Luciani et al. |
| 2007/0058332 A1 | 3/2007 | Canterbury et al. |
| 2007/0065078 A1 | 3/2007 | Jiang |
| 2007/0070598 A1 | 3/2007 | Chuang |
| 2007/0074284 A1 | 3/2007 | Woog |
| 2007/0097618 A1 | 5/2007 | Searby et al. |
| 2007/0101039 A1 | 5/2007 | Rutledge et al. |
| 2007/0120874 A1 | 5/2007 | MacInnis et al. |
| 2007/0130323 A1 | 6/2007 | Landsman et al. |
| 2007/0139870 A1* | 6/2007 | Lin .................... F16M 11/2021 248/917 |
| 2007/0168593 A1 | 7/2007 | Montag et al. |
| 2008/0036780 A1 | 2/2008 | Liang et al. |
| 2008/0053770 A1 | 3/2008 | Tynyk |
| 2008/0119241 A1 | 5/2008 | Dorogusker et al. |
| 2008/0126594 A1 | 5/2008 | Monks et al. |
| 2008/0194119 A1 | 8/2008 | Mori |
| 2008/0239681 A1 | 10/2008 | Iida |
| 2008/0244026 A1 | 10/2008 | Holt et al. |
| 2008/0313108 A1 | 12/2008 | Carrabis |
| 2009/0058359 A1 | 3/2009 | Fischer et al. |
| 2009/0066704 A1 | 3/2009 | Daniel et al. |
| 2009/0072782 A1 | 3/2009 | Randall |
| 2009/0079264 A1 | 3/2009 | Minami |
| 2009/0079416 A1 | 3/2009 | Vinden et al. |
| 2009/0125743 A1 | 5/2009 | Robertson et al. |
| 2009/0158423 A1 | 6/2009 | Orlassino et al. |
| 2009/0177906 A1 | 7/2009 | Paniagua, Jr. et al. |
| 2009/0228614 A1 | 9/2009 | Hwang |
| 2009/0247006 A1 | 10/2009 | Thompson |
| 2009/0254313 A1 | 10/2009 | Armour et al. |
| 2009/0302799 A1 | 12/2009 | Marquet et al. |
| 2009/0309748 A1 | 12/2009 | Elgort et al. |
| 2010/0037283 A1 | 2/2010 | Zhu |
| 2010/0066685 A1 | 3/2010 | Cain et al. |
| 2010/0070217 A1 | 3/2010 | Shimada et al. |
| 2010/0081473 A1 | 4/2010 | Chatterjee et al. |
| 2010/0088140 A1 | 4/2010 | Gil et al. |
| 2010/0128766 A1 | 5/2010 | Sugita |
| 2010/0138582 A1 | 6/2010 | Bird et al. |
| 2010/0174419 A1 | 7/2010 | Brumfield et al. |
| 2010/0182262 A1 | 7/2010 | Yoshikawa et al. |
| 2010/0188808 A1 | 7/2010 | Howarth et al. |
| 2010/0191487 A1 | 7/2010 | Rada et al. |
| 2010/0251361 A1 | 9/2010 | Collopy et al. |
| 2010/0259213 A1 | 10/2010 | Maharaj |
| 2010/0295384 A1 | 11/2010 | Kobayashi |
| 2010/0302454 A1 | 12/2010 | Epstein et al. |
| 2011/0001486 A1 | 1/2011 | Abouda et al. |
| 2011/0035443 A1 | 2/2011 | Jensen |
| 2011/0069445 A1* | 3/2011 | Haren .................... G06F 1/1632 361/679.44 |
| 2011/0085816 A1 | 4/2011 | Kim |
| 2011/0105226 A1 | 5/2011 | Perlman |
| 2011/0145466 A1 | 6/2011 | Supran et al. |
| 2011/0179291 A1 | 7/2011 | Weng et al. |
| 2011/0181238 A1 | 7/2011 | Soar |
| 2011/0204843 A1 | 8/2011 | Foster |
| 2011/0208980 A1 | 8/2011 | Brooks et al. |
| 2011/0239008 A1 | 9/2011 | Lam et al. |
| 2011/0246679 A1 | 10/2011 | Sretenovic |
| 2011/0266997 A1 | 11/2011 | Krancher et al. |
| 2011/0273632 A1 | 11/2011 | Casey |
| 2011/0292640 A1 | 12/2011 | Clark et al. |
| 2011/0297566 A1 | 12/2011 | Gallagher et al. |
| 2012/0034951 A1 | 2/2012 | Jones et al. |
| 2012/0054400 A1 | 3/2012 | Iverson et al. |
| 2012/0068538 A1 | 3/2012 | Ye et al. |
| 2012/0081087 A1 | 4/2012 | Ching-Wei |
| 2012/0110360 A1 | 5/2012 | Lin et al. |
| 2012/0120581 A1 | 5/2012 | Haren |
| 2012/0155013 A1 | 6/2012 | Huang |
| 2012/0166115 A1 | 6/2012 | Apostolakis |
| 2012/0170212 A1 | 7/2012 | Gallouzi et al. |
| 2012/0188087 A1 | 7/2012 | Wang |
| 2012/0203949 A1 | 8/2012 | Benhard et al. |
| 2012/0229076 A1 | 9/2012 | Zhu et al. |
| 2012/0275526 A1 | 11/2012 | Hughes |
| 2012/0278640 A1 | 11/2012 | Caglianone |
| 2012/0314777 A1 | 12/2012 | Zhang et al. |
| 2013/0010418 A1 | 1/2013 | Flynn et al. |
| 2013/0050216 A1 | 2/2013 | Whitby-Strevens et al. |
| 2013/0054348 A1 | 2/2013 | Holsman et al. |
| 2013/0057567 A1 | 3/2013 | Frank et al. |
| 2013/0060662 A1 | 3/2013 | Carlson et al. |
| 2013/0073882 A1 | 3/2013 | Inbaraj et al. |
| 2013/0106979 A1 | 5/2013 | Chang et al. |
| 2013/0115826 A1* | 5/2013 | Sloey .................... H01R 24/62 439/690 |
| 2013/0143521 A1 | 6/2013 | Hernandez et al. |
| 2013/0159756 A1 | 6/2013 | Ellis |
| 2013/0165046 A1 | 6/2013 | Tang et al. |
| 2013/0205060 A1 | 8/2013 | Benhard et al. |
| 2013/0311801 A1 | 11/2013 | Kong et al. |
| 2014/0028462 A1 | 1/2014 | Lawson |
| 2014/0117780 A1 | 5/2014 | Buchheim et al. |
| 2014/0136749 A1 | 5/2014 | North et al. |
| 2014/0150812 A1 | 6/2014 | Liao |
| 2014/0168884 A1 | 6/2014 | Wylie et al. |
| 2014/0172478 A1 | 6/2014 | Vadasz |
| 2014/0172731 A1 | 6/2014 | Ericksen et al. |
| 2014/0181350 A1 | 6/2014 | Pedro et al. |
| 2014/0208134 A1 | 7/2014 | Waters et al. |
| 2014/0244869 A1 | 8/2014 | Adrian et al. |
| 2014/0278645 A1 | 9/2014 | Davidson et al. |
| 2014/0301575 A1 | 10/2014 | Holtman et al. |
| 2014/0316584 A1 | 10/2014 | Matsuoka et al. |
| 2014/0342669 A1 | 11/2014 | Zeung et al. |
| 2014/0355200 A1 | 12/2014 | Thiers |
| 2014/0359318 A1 | 12/2014 | Liu et al. |
| 2014/0365396 A1 | 12/2014 | Kumar et al. |
| 2015/0006026 A1 | 1/2015 | Schaffer et al. |
| 2015/0013010 A1 | 1/2015 | Rozenweig |
| 2015/0035939 A1 | 2/2015 | Hillier et al. |
| 2015/0036051 A1 | 2/2015 | Broberg et al. |
| 2015/0043154 A1 | 2/2015 | Feldstein et al. |
| 2015/0046623 A1 | 2/2015 | Ramirez et al. |
| 2015/0081381 A1 | 3/2015 | Okoba |
| 2015/0082061 A1 | 3/2015 | Ramirez et al. |
| 2015/0106814 A1 | 4/2015 | Vilke et al. |
| 2015/0169477 A1 | 6/2015 | Beel et al. |
| 2015/0170497 A1 | 6/2015 | Thuersam et al. |
| 2015/0195489 A1 | 7/2015 | Sobti et al. |
| 2015/0237191 A1 | 8/2015 | Moran et al. |
| 2015/0281627 A1 | 10/2015 | Wang et al. |
| 2015/0295440 A1 | 10/2015 | Liao |
| 2015/0333789 A1 | 11/2015 | An |
| 2015/0346792 A1 | 12/2015 | Rathi et al. |
| 2015/0356045 A1 | 12/2015 | Soffer |
| 2015/0370681 A1 | 12/2015 | Tonry et al. |
| 2015/0378420 A1 | 12/2015 | Ippolito et al. |
| 2016/0026883 A1 | 1/2016 | Matos |
| 2016/0050375 A1 | 2/2016 | Soffer et al. |
| 2016/0065633 A1 | 3/2016 | Kawakubo |
| 2016/0091926 A1 | 3/2016 | Saxton |
| 2016/0173678 A1 | 6/2016 | Decamp |
| 2016/0187963 A1 | 6/2016 | Leinonen et al. |
| 2016/0193932 A1 | 7/2016 | Pedram |
| 2016/0195856 A1 | 7/2016 | Spero |
| 2016/0195897 A1 | 7/2016 | Robinson |
| 2016/0285310 A1 | 9/2016 | Tan et al. |
| 2016/0308929 A1 | 10/2016 | Fu |
| 2016/0321333 A1 | 11/2016 | Oka |
| 2017/0024197 A1 | 1/2017 | Pantelka et al. |
| 2017/0054734 A1 | 2/2017 | Sigal et al. |
| 2017/0068913 A1 | 3/2017 | Pignataro et al. |

(56) References Cited

U.S. PATENT DOCUMENTS

| | | |
|---|---|---|
| 2017/0099361 A1 | 4/2017 | Digilov et al. |
| 2017/0123456 A1 | 5/2017 | Chung et al. |
| 2017/0140235 A1 | 5/2017 | Yu et al. |
| 2017/0177029 A1* | 6/2017 | Nguyen ............... G06F 21/445 |
| 2017/0255452 A1 | 9/2017 | Barnes et al. |
| 2017/0262779 A1 | 9/2017 | Remaker |
| 2017/0325318 A1 | 11/2017 | Wendt et al. |
| 2017/0336846 A1 | 11/2017 | Shieh et al. |
| 2017/0345290 A1 | 11/2017 | Law et al. |
| 2017/0351638 A1 | 12/2017 | Chen et al. |
| 2017/0374114 A1 | 12/2017 | Feldman |
| 2018/0017992 A1 | 1/2018 | Wylie |
| 2018/0067885 A1 | 3/2018 | Hsieh et al. |
| 2018/0103212 A1 | 4/2018 | Epstein et al. |
| 2018/0131148 A1 | 5/2018 | Liu |
| 2018/0143664 A1 | 5/2018 | Wylie |
| 2018/0143665 A1 | 5/2018 | Wylie |
| 2018/0143934 A1 | 5/2018 | Li |
| 2018/0189730 A1 | 7/2018 | Wilkinson et al. |
| 2018/0191113 A1 | 7/2018 | Byrne et al. |
| 2018/0198248 A1* | 7/2018 | Sun ...................... G06F 1/1632 |
| 2018/0267681 A1 | 9/2018 | Epstein |
| 2018/0324393 A1 | 11/2018 | Ryan et al. |
| 2018/0338368 A1 | 11/2018 | Pfund et al. |
| 2019/0005476 A1 | 1/2019 | Luo et al. |
| 2019/0018811 A1 | 1/2019 | Hundal et al. |
| 2019/0025353 A1 | 1/2019 | Decamp |
| 2019/0025354 A1 | 1/2019 | Decamp |
| 2019/0025355 A1 | 1/2019 | Decamp |
| 2019/0197009 A1 | 6/2019 | Chen et al. |
| 2019/0228348 A1 | 7/2019 | O'Keefe-Sally et al. |
| 2019/0243419 A1 | 8/2019 | Charlesworth et al. |
| 2019/0272141 A1 | 9/2019 | Poel et al. |
| 2019/0354361 A1 | 11/2019 | Gang et al. |
| 2019/0361407 A1 | 11/2019 | Vogel et al. |
| 2019/0389064 A1 | 12/2019 | High et al. |
| 2019/0392356 A1 | 12/2019 | Munir et al. |
| 2020/0104762 A1 | 4/2020 | Gibson et al. |
| 2020/0133368 A1* | 4/2020 | Volek ...................... G06F 1/266 |
| 2020/0201388 A1 | 6/2020 | Spyrison et al. |
| 2020/0218324 A1 | 7/2020 | Decamp et al. |
| 2020/0219036 A1 | 7/2020 | Decamp et al. |
| 2020/0241597 A1 | 7/2020 | Decamp et al. |
| 2020/0326955 A1 | 10/2020 | Adiletta et al. |
| 2021/0051298 A1 | 2/2021 | Atkins et al. |
| 2021/0058584 A1 | 2/2021 | Decamp et al. |
| 2021/0073155 A1 | 3/2021 | Decamp et al. |
| 2021/0097565 A1 | 4/2021 | Subbloie et al. |
| 2021/0181794 A1 | 6/2021 | Chung et al. |
| 2021/0191462 A1 | 6/2021 | Decamp et al. |
| 2021/0233010 A1 | 7/2021 | Decamp et al. |
| 2021/0258538 A1 | 8/2021 | Decamp, II et al. |
| 2022/0011382 A1 | 1/2022 | Chiang et al. |

FOREIGN PATENT DOCUMENTS

| | | |
|---|---|---|
| CN | 104094187 | 10/2014 |
| CN | 104838558 | 8/2015 |
| CN | 105593782 | 5/2016 |
| CN | 106707834 | 5/2017 |
| CN | 107274660 A | 10/2017 |
| CN | 107702282 A | 2/2018 |
| DE | 102013104216 | 11/2013 |
| EP | 1085400 A2 | 3/2001 |
| EP | 2645343 A2 | 10/2013 |
| EP | 2722728 | 4/2014 |
| EP | 2722728 A1 | 4/2014 |
| EP | 2823372 | 1/2015 |
| EP | 2929613 | 10/2015 |
| EP | 3030948 | 6/2016 |
| EP | 3087476 | 11/2016 |
| GB | 2457252 A | 8/2009 |
| GB | 2513197 A | 10/2014 |
| IN | 201617004084 | 12/2015 |
| IN | 201406041 | 1/2016 |
| JP | 2013239178 | 11/2013 |
| JP | 6110878 | 5/2015 |
| JP | 2016504900 | 2/2016 |
| KR | 1020090069890 A | 7/2009 |
| KR | 1020140069684 | 6/2014 |
| KR | 101452319 | 10/2014 |
| KR | 20150091362 | 8/2015 |
| KR | 1020150130842 | 11/2015 |
| KR | 1020160121116 A | 10/2016 |
| KR | 2020100000082 | 1/2020 |
| RU | 2630376 | 7/2017 |
| TW | I387182 B1 | 2/2013 |
| TW | 201347581 | 11/2013 |
| WO | 03030304 A2 | 4/2003 |
| WO | 2005003983 A1 | 1/2005 |
| WO | 2008109193 A1 | 9/2008 |
| WO | 2011138581 A2 | 11/2011 |
| WO | 2013024855 A1 | 2/2013 |
| WO | 2013033573 A2 | 3/2013 |
| WO | 2016011566 A1 | 1/2016 |
| WO | 2017140474 | 8/2017 |
| WO | 20018216004 A1 | 11/2018 |
| WO | 2019018007 | 1/2019 |
| WO | 2020142525 A1 | 7/2020 |
| WO | 2021035156 A1 | 2/2021 |
| WO | 2021050215 A1 | 3/2021 |
| WO | 2021050575 A1 | 3/2021 |

OTHER PUBLICATIONS

U.S. Appl. No. 17/308,351, Non-Final Office Action, dated Nov. 15, 2021, 14 pages.

U.S. Appl. No. 17/229,547, Non-Final Office Action, dated Feb. 15, 2022, 24 pages.

U.S. Appl. No. 16/446,440, Non-Final Office Action, dated Sep. 16, 2021, 15 pages.

U.S. Appl. No. 17/308,351, Notice of Allowance, dated Mar. 29, 2022, 5 pages.

U.S. Appl. No. 13/365,754, Final Office Action, dated Dec. 27, 2013, 18 pgs.

U.S. Appl. No. 13/365,754, Notice of Allowance, dated Feb. 4, 2015, 8 pgs.

U.S. Appl. No. 13/365,754, Final Office Action, dated Jun. 10, 2014, 22 pgs.

U.S. Appl. No. 13/365,754, Non-Final Office Action, dated May 13, 2014, 18 pgs.

U.S. Appl. No. 13/365,754, Non-Final Office Action, dated Sep. 10, 2013, 15 pgs.

U.S. Appl. No. 13/365,754, Non-Final Office Action, dated Sep. 17, 2014, 25 pgs.

U.S. Appl. No. 13/786,038, Non-Final Office Action, dated Sep. 18, 2014, 24 pgs.

U.S. Appl. No. 14/634,196, Non-Final Office Action, dated Sep. 7, 2016, 25 pgs.

U.S. Appl. No. 14/923,833, Final Office Action, dated Aug. 9, 2017, 22 pgs.

U.S. Appl. No. 14/923,833, Notice of Allowance, dated Dec. 18, 2017, 5 pgs.

U.S. Appl. No. 14/923,833, Non-Final Office Action, dated Mar. 2, 2017, 22 pgs.

U.S. Appl. No. 14/923,833, Non-Final Office Action, dated Nov. 1, 2016, 14 pgs.

U.S. Appl. No. 14/970,318, Notice of Allowance, dated Dec. 6, 2017, 11 pgs.

U.S. Appl. No. 14/970,318, Non-Final Office Action, dated Feb. 6, 2017, 21 pgs.

U.S. Appl. No. 14/970,318, Non-Final Office Action, dated Jul. 11, 2017, 15 pgs.

U.S. Appl. No. 14/970,318, Final Office Action, dated Jul. 11, 2017, 25 pgs.

U.S. Appl. No. 14/970,318, Non-Final Office Action, dated Oct. 14, 2016, 13 pgs.

U.S. Appl. No. 14/970,318, Advisory Action, dated Sep. 28, 2017, 3 pgs.

(56) References Cited

OTHER PUBLICATIONS

U.S. Appl. No. 15/261,204, Non-Final Office Action, dated Apr. 30, 2018, 20 pgs.
U.S. Appl. No. 15/261,204, Advisory Action, dated Feb. 1, 2019, 7 pages.
U.S. Appl. No. 15/261,204, Notice of Allowance, dated Feb. 4, 2020, 8 pages.
U.S. Appl. No. 15/261,204, Non-Final Office Action, dated Jun. 27, 2019, 20 pages.
U.S. Appl. No. 15/261,204, Final Office Action, dated Nov. 2, 2018, 22 pgs.
U.S. Appl. No. 15/655,669, Final Office Action, dated May 16, 2019, 16 pages.
U.S. Appl. No. 15/655,699, Advisory Action, dated Aug. 1, 2019, 4 pages.
U.S. Appl. No. 15/655,699, Final Office Action, dated Feb. 7, 2020, 8 pages.
U.S. Appl. No. 15/655,699, Notice of Allowance, dated Mar. 6, 2020, 7 pages.
U.S. Appl. No. 15/655,699, Non-Final Office Action, dated Nov. 19, 2018, 37 pgs.
U.S. Appl. No. 15/655,699, Non-Final Office Action, dated Sep. 6, 2019, 18 pages.
U.S. Appl. No. 15/905,241, Non-Final Office Action, dated Nov. 2, 2018, 34 pgs.
U.S. Appl. No. 16/029,339, Final Office Action, dated Apr. 19, 2019,14 pages.
U.S. Appl. No. 16/029,339, Non-Final Office Action, dated Aug. 8, 2019, 14 pages.
U.S. Appl. No. 16/029,339, Notice of Allowance, dated Dec. 4, 2019, 10 pages.
U.S. Appl. No. 16/029,339, Non-Final Office Action, dated Nov. 2, 2018, 28 pgs.
U.S. Appl. No. 16/849,858, Non-Final Office Action, dated Jun. 26, 2020, 12 pages.
17849313.6, Extended European Search Report, dated Mar. 25, 2020, 8 pages.
Dong, Wei, "Web-based Building Energy Consumption Monitoring and Conservation Service", 4th International Conference on Mechatronics, Materials, Chemistry and Computer Engineering (ICMMCCE 2015), pp. 3036-3040.
Fink, Thomas, "Toshiba Dynadock V Review", Laptop Magazine, retrieved from the Internet on Dec. 21, 2013, at <http://www.laptopmag.com/review/accessories/Toshiba-dynadock-v.aspx>, Aug. 9, 2010, pp. 1-2.
Ganesh, "Visible Engergy UFO Power Center Smart Power Strip Review", AnandTech, http://www.anandtech.com/show/6413/visible-energy-ufo-power-center-smart-power-stripreview, Oct. 26, 2012.
PCT/US2012/023717, International Preliminary Report on Patentability, dated Aug. 15, 2013, 6 pgs.
PCT/US2012/023717, International Search Report and Written Opinion, dated Aug. 30, 2012, 9 pgs.
PCT/US2014/017434, International Search Report and Written Opinion, dated Jun. 30, 2014, 8 pgs.
PCT/US2014/017434, International Preliminary Report on Patentability, dated Sep. 17, 2015, 10 pgs.
PCT/US2015/065730, International Preliminary Report on Patentability, dated Apr. 6, 2016, 13 pgs.
PCT/US2015/065730, International Search Report and Written Opinion, dated Apr. 6, 2016, 16 pgs.
PCT/US2017/048367, International Preliminary Report on Patentability, dated Mar. 21, 2019, 9 pages.
PCT/US2017/048367, International Search Report and Written Opinion, dated Oct. 27, 2017, 15 pgs.
PCT/US2018/017232, International Preliminary Report on Patentability, dated Jan. 30, 2020, 9 pages.
PCT/US2018/017232, International Search Report and Written Opinion, dated May 21, 2018, 13 pgs.
PCT/US2020/047448, et al., International Search Report and Written Opinion ,dated Nov. 20, 2020, 13 pages.
U.S. Appl. No. 16/240,124, Notice of Allowance, dated Feb. 22, 2021, 9 pages.
U.S. Appl. No. 16/999,778, et al., Notice of Allowance ,dated Mar. 19. 2021 ,13 pages.
U.S. Appl. No. 16/999,778, et al., Non-Final Office Action ,dated Nov. 13. 2020 ,16 pages.
U.S. Appl. No. 16/721,403, Non-Final Office Action, dated Feb. 1, 2022, 17 pages.
PCT/US2020/046703, Invitation to Pay Additional Fees and, Where Applicable, Protest Fee, dated Oct. 29, 2020, 2 pages.
U.S. Appl. No. 16/240,124, Non-Final Office Action, dated Nov. 13, 2020, 30 pages.
Agnihotri, Mohit, et al., "Topology Formation in Mesh Networks Considering Role Suitability", Workshop on Device Communications for 5G Networks, WD5G, 2016, 7 pages.
Dell, "Dell Docking Station WD15 User Guide", 2015, 31 pages.
PCT/US2020/046703, International Search Report and Written Opinion, dated Jan. 13, 2021, 12 pages.
U.S. Appl. No. 16/849,858, Notice of Allowance, dated Jan. 22, 2021, 8 pages.
PCT/US2020/049980, International Search Report and Written Opinion, dated Nov. 27, 2020, 15 pages.
U.S. Appl. No. 16/446,440, Notice of Allowance, dated Mar. 31, 2022, 8 pages.
U.S. Appl. No. 16/833,089, Non-Final Office Action, dated Apr. 8, 2022, 23 pages.
Chau et al., 2015, "STAQ I Modular Powerbank, Wifi Memory, Audio & Dock System", AEGLO, [ online], Available from: https ://www.kickstarter.com/projects/ aeglobrand/worlds-first-modular-phone-dock-power-and-multi-me/description [ Accessed Jun. 22, 2022] ,22 pages.
Goodbros., et al., Minimal Size Privacy Protecting WebCam cover "Spyslide" (with English translation), NAVER blog, https://m.post.naver.com/viewer/postView.nhn?volumeNo=7636827&memberNo=36238167&vType=VERTICAL, May 15, 2017 ,32 pages.
Tech Armor, et al., Tech Armor Macbook Pro Privacy Screen Protector, Privacy Apple MacBook Pro Retina, https://www.amazon.com/Macbook-Privacy-Protector-Tech-Armor/dp/B01MZ1W2Y2 ,Dec. 20, 2016 ,9 pages.
Vmei, et al., Echo Show Screen Protecto. https://www.amazon.com/Protector-Important-Everyones-Safe-Designed-VMEI/dp/B075W6Y— Retrieved Jul. 30, 2019 ,2017.

\* cited by examiner

US 11,614,776 B2

SYSTEMS AND METHODS FOR DOCKING STATIONS REMOVABLY ATTACHABLE TO DISPLAY APPARATUSES

CROSS-REFERENCE TO RELATED APPLICATIONS

This application is a continuation-in-part of U.S. patent application Ser. No. 16/833,089, filed Mar. 27, 2020 and titled SYSTEMS AND METHODS FOR DOCKING STATIONS REMOVABLY ATTACHABLE TO DISPLAY APPARATUSES, which claims priority to U.S. Provisional Application No. 62/911,756, filed Oct. 7, 2019 and titled SYSTEMS AND METHODS FOR VIEWING APPARATUS WITH REMOVABLY ATTACHABLE DOCKING STATION, and to U.S. Provisional Application No. 62/897,772, filed Sep. 9, 2019 and titled SYSTEMS AND METHODS FOR VIEWING APPARATUS WITH REMOVABLY ATTACHABLE DOCKING STATION, each of which is hereby incorporated by reference in its entirety.

BACKGROUND

Electronic devices may connect to each other in order to transport data and/or power between themselves. Relative to each relevant electronic device, the data so transported may be input data or output data. Relative to each relevant electronic device, the power so transported may be input power or output power.

TECHNICAL FIELD

This disclosure relates generally to the field of docking stations and their use with display apparatuses and docking stand assemblies.

BRIEF DESCRIPTION OF THE SEVERAL VIEWS OF THE DRAWINGS

Non-limiting and non-exhaustive embodiments of the disclosure are described, including various embodiments of the disclosure with reference to the figures, in which.

DETAILED DESCRIPTION

Figure 1A:
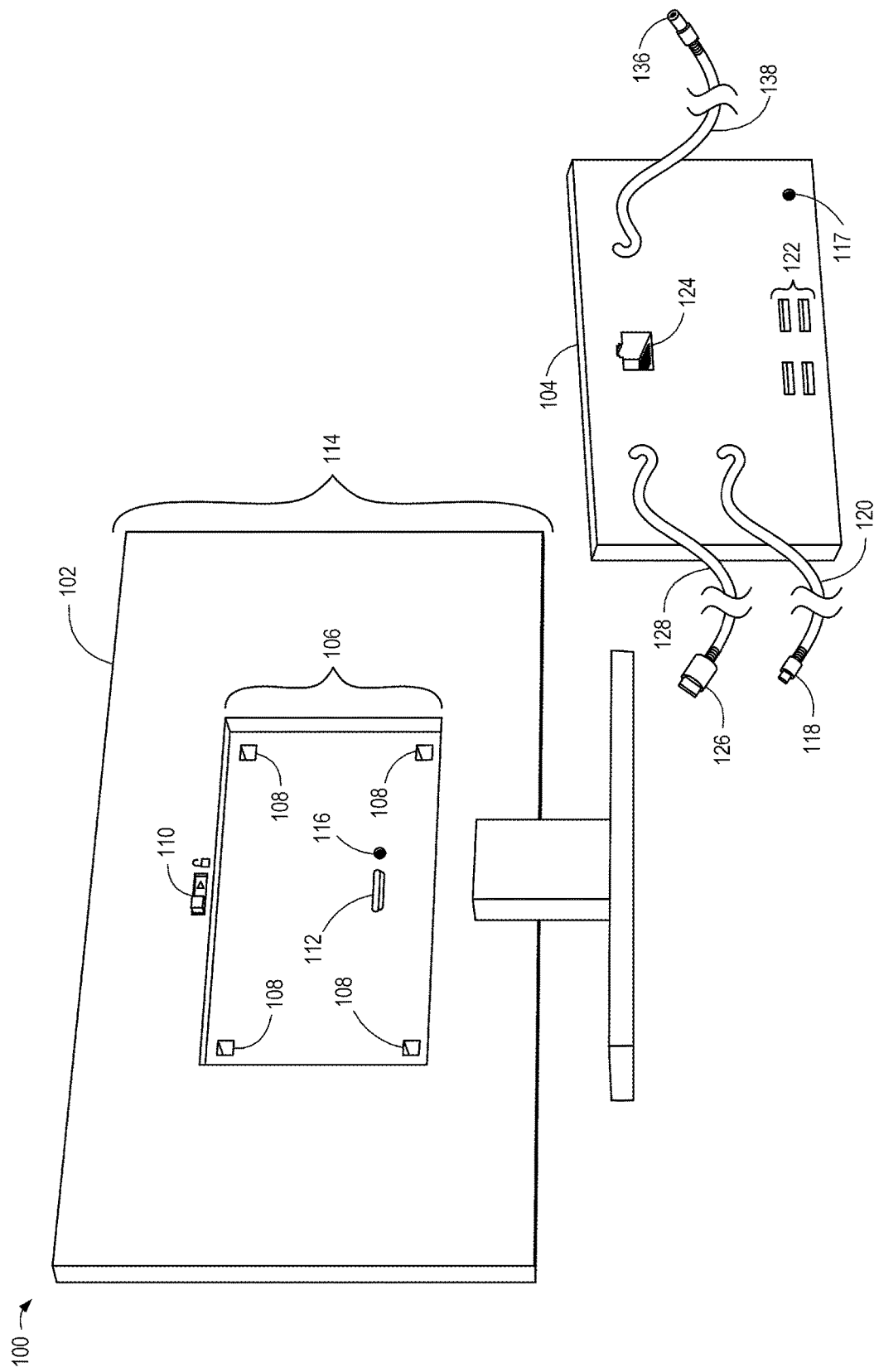
FIGS. 1A-1B illustrate components of a system for docking with a host device, according to an embodiment.

Electronic devices may be designed that connect to, and receive power and/or data signals from, external objects via one or more connectors. Many devices have a plurality of these connectors, which may include power connectors to connect power sources (e.g., a DC connector to connect to an AC/DC adapter or a C14 connector to connect to utility transformers via a wall outlet), communications connectors to connect communication devices (e.g., RJ-45 connectors to connect to routers or other networking equipment), and data connectors to connect output devices (e.g., stereo out connectors to connect to speakers, High-Definition Multimedia Interface (HDMI), DisplayPort, or Video Graphics Array (VGA) connectors to connect to display screens; etc.) and/or input devices (e.g., Universal Serial Bus (USB) or PS/2 connectors to connect to mice and/or keyboards, etc.) to an electronic device. Hybrid connectors (e.g., connectors that are capable of performing as more than one type of connector) are expressly contemplated. Persons skilled in the art will recognize that many of these (and other, including custom) connectors are understood to be one or the other of a complementary pair of possibilities for that connector type (e.g., a "male" version and a "female" version of the connector type). For the purposes of this disclosure, a "connector" may refer at times individually to either of the complementary pair for that connector type.

In some cases, one or more of these external objects may instead be connected to one or more connectors of an intermediary docking station rather than directly to the electronic device. The docking station may then connect to and electronically communicate with the electronic device (e.g., via a connector that is designed to interface with a connector on the electronic device). In this situation, the electronic device may be considered a "host" device (and any connector of the docking station connected to the host device may be considered a "host device connector").

The docking station may handle data and/or power to and/or from each external object connected to the docking station to and/or to and/or from the connected host device. In this way, the ability to connect and/or remove the one or more external objects to and/or from the host device all at once may be greatly simplified via the simple connection and/or removal of the single host device connector of the docking station. In some embodiments, the docking station may instead (or additionally) connect to a host device by wirelessly interfacing a wireless transceiver of the host device and a wireless transceiver of the docking station. However, the act of connecting external objects with the connectors of a docking station (instead of directly with connectors on a host device) may not entirely solve the problem of clutter associated with, for example, cabling from the external object(s) to those connectors. If the docking station is not appropriately placed, this clutter may still take up room on, for example, a desk of the user of the host device and docking station, just as it might if these external objects instead were directly connected to connectors on the host device.

It may therefore also be beneficial to develop systems and methods for integrating a docking station into another device. For example, it may be beneficial to develop systems and methods for integrating a docking station into, for example, a display apparatus on the desk of the user. This integration may help remove the clutter associated with the docking station away from the surface of the desk (or other area) that the user may desire to be uncluttered. By integrating a docking station into a display apparatus, clutter may also be further reduced by communicating at least some power and/or data (e.g., power from the docking station to the display apparatus and/or video signals from the docking station to the display apparatus) via directly interfacing (without a separate cable) compatible connectors on the docking station and the display apparatus (rather than by running detachable power and/or video cables between the docking station and the display apparatus).

Further, because of the wide variety of possible host devices (e.g., laptop computers, smartphones, tablets, desktop computers, etc.), and because many of these host devices may only interface with certain types of host device connectors (each with, perhaps, its own associated circuitry) and/or may only be compatible with certain wireless protocols, it would also be beneficial to design the display apparatus in such a way that different docking stations (with different host device connectors, differing circuitry associated with those connectors, different supported wireless protocols and/or other various possible differences) may be interchanged into the display apparatus in order to match the requirements of the current device to be used with the system.

Display Apparatuses with Docking Station Receptacles

Figure 1B:
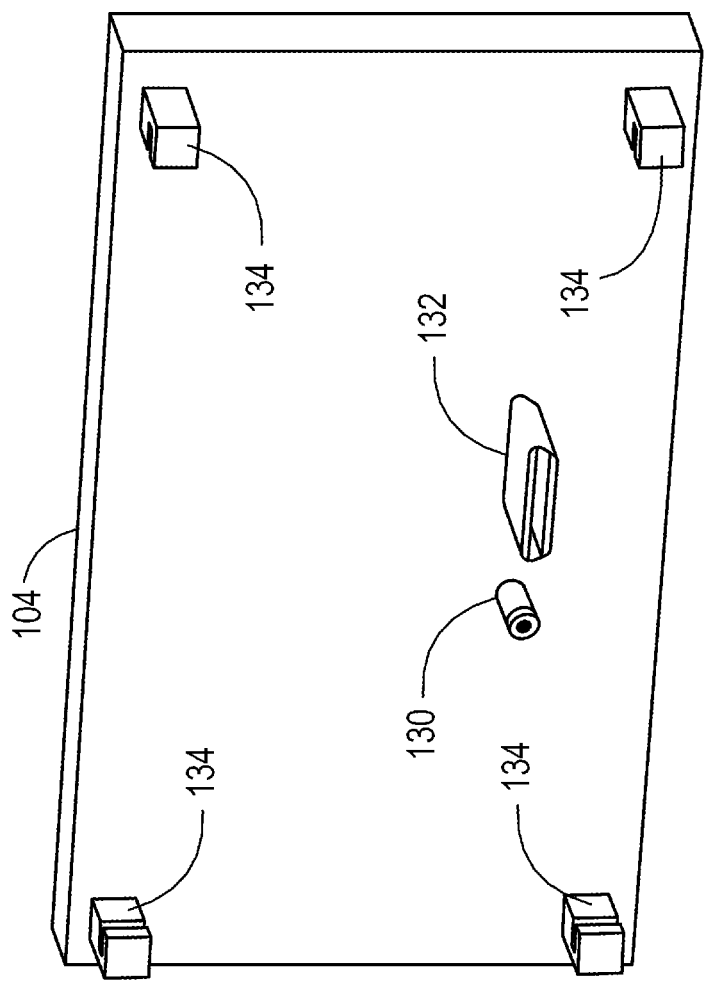

FIGS. 1A-1B illustrate components of a system 100 for docking with a host device, according to an embodiment. FIG. 1A illustrates a display apparatus 102 and a docking station 104.

The display apparatus 102 may include a docking station receptacle 106. The docking station receptacle 106 may be shaped to receive the docking station 104 when the docking station 104 is inserted into the back of the display apparatus 102. The docking station 104 may be one of many possible docking stations (with compatibility with many possible host devices) that are useable with the display apparatus 102.

The docking station receptacle 106 may include one or more attachment devices 108 that may interact with attachment devices of the docking station 104 to removably attach the docking station 104 in place once the docking station 104 has been inserted into the docking station receptacle 106. Examples of possible attachment devices that may be used between the docking station 104 and the docking station receptacle 106 include magnet features, hook and catch features, slotted peg and catch features, or any other attachment device 108 appropriate for securing the docking station 104 to the docking station receptacle 106. One, two, three, four, or any other number of these attachment devices may be used. In the embodiment of FIG. 1A, the attachment devices 108 are catch attachment devices appropriate to accept a slotted peg.

The display apparatus 102 may further include a docking station release mechanism 110. The docking station release mechanism 110 may release the docking station 104 from the docking station receptacle 106 by disengaging the attachment between the attachment devices 108 and any attachment devices of the docking station 104. For example, the docking station release mechanism 110 may disengage a magnetic connection between a magnet associated with an attachment device 108 and a piece of metal associated with an attachment device 108 of the docking station 104. As another example, the docking station release mechanism 110 may disengage a catch associated with an attachment device 108 from, for example, a hook or a slotted peg associated with an attachment device of the docking station 104. The docking station release mechanism 110 may be, for example, a button or a slider. It is contemplated that in some embodiments, the docking station release mechanism 110 may instead be included on the docking station 104.

The docking station receptacle 106 may include a direct data connector 112. The direct data connector 112 of the display apparatus 102 may be configured to interface with a direct data connector of the docking station 104 directly (without the use of a cable). This interface may allow the display apparatus 102 to receive and use graphical and/or other data from the docking station 104. For example, graphical data may be communicated to the docking station 104 by a host device connected to the docking station 104 and from there communicated via this interface to the display apparatus 102 and used to render a display on a display screen 114 of the display apparatus 102. This interface between the direct data connector 112 of the display apparatus 102 and the direct data connector 112 of the docking station 104 may also allow the display apparatus 102 to send data to the docking station 104. The direct data connector 112 may be, for example, a High-Definition Multimedia Interface (HDMI) connector, a Digital Visual Interface (DVI) connector, a USB (e.g., USB-C) connector, a Thunderbolt™ 3 connector, or any other connector (including custom and/or hybrid connectors) capable of communicating graphical and/or other data from and/or to the docking station 104 and the display apparatus 102.

The docking station receptacle 106 may include a direct power in connector 116. The direct power in connector 116 may be configured to interface with a direct power out connector of the docking station 104 directly (without the use of a cable). This interface may allow the docking station 104 to provide the display apparatus 102 with the power necessary to operate. The direct power in connector 116 may be, for example, a DC connector, a USB (e.g., USB-C) connector, or any other connector (including custom and/or hybrid connectors) capable of communicating power from the docking station 104 to the display apparatus 102.

It is further contemplated that the features of the direct data connector 112 and the direct power in connector 116 may, in some embodiments, be combined into a single connector that is capable of performing both the data and power communication features described (e.g., a USB-C connector, a Thunderbolt™ 3 connector, and/or a custom and/or hybrid connector made for this combined purpose).

The docking station 104 may include a host device connector 118. The host device connector 118 may interface with a connector of a host device that is being used with the docking station 104. Via this interface, the host device connector 118 may electronically communicate data and/or power to and/or from the docking station 104 to and/or from the connected host device. The host device connector 118 may be, for example, a USB-C connector, a Thunderbolt™ 3 connector, or any other connector (including custom and/or hybrid connectors) that may be used to interface with a connector of the connected host device for this purpose.

In some embodiments, the docking station 104 may include a wireless transceiver (internal, not shown in FIG. 1A). This wireless transceiver may communicate with a wireless transceiver of the host device that is being used with the docking station 104. This interface may communicate data (e.g., graphical or other data) to and/or from the docking station 104 to and/or from the connected host device. This interface may use, for example, a Wi-Fi™ protocol, a Bluetooth™ protocol, or any other appropriate wireless protocol useable to transfer data in this fashion.

This (or another) wireless transceiver may also be used by the docking station 104 to connect to other wireless network devices (e.g., a network device such as a router) in order to receive independent data (e.g., data not from a host device) from a network. This data may be used to operate the display apparatus 102 (e.g., used to power on and/or off the display apparatus 102, used to render a display on the display screen of 114 of the display apparatus 102 (such as, e.g., weather, news, or status of another device on the network)). This data may be, e.g., data received from an Internet of Things (IoT) system (such as, e.g., an IoT home automation system).

The docking station 104 may include one or more connectors (for example, connectors 117, 122-126, 136) for connecting the docking station 104 to one or more external objects. As discussed above, the docking station 104 may communicate data and/or power to and/or from each of these external objects to and/or from the host device connected to the docking station 104 via the host device connector 118 and/or the wireless transceiver of the docking station 104.

For example, the docking station 104 may include a power source connector 117. The power source connector 117 may be connected to an external power source such as, for example, a battery, a connection to a utility transformer that is provided in a structure, or any other appropriate external power source. The connection to an external power source via the power source connector 117 may provide the docking station 104 the necessary power to function. Further, the docking station 104 may need to provide power to each of the display apparatus 102, one or more secondary display apparatuses (not shown), a host device (not shown), and/or one or more external objects connected to the docking station 104. This power (as supplied from the docking station 104 to these other devices) may be necessary for these other devices to, for example, operate, charge their internal batteries, and/or pass along power to external objects. The power to be supplied to these other devices by the docking station 104 may be drawn by the docking station 104 from the external power source via the power source connector 117. The power source connector 117 may be, for example, a DC connector, a USB (e.g., USB-C) connector, an International Electrotechnical Commission (IEC) 420 C13 or C14 connector, or any other connector (including custom and/or hybrid connectors) capable of communicating power from an external power source to the docking station 104.

As another example, the docking station 104 may include USB connectors 122, which may be individually used by the docking station 104 as one of many possible connectors (e.g., power connectors, communications connectors, and/or data connectors). In some embodiments, one or more of the USB connectors 122 (or other data connectors) may be used to connect to input devices, such as mice and keyboards. Data from these input devices may travel through the docking station 104 to a connected host device via the host device connector 118 and/or the wireless transceiver of the docking station 104. In other embodiments, one or more of the USB connectors 122 (or other data connectors) may be used to connect output devices, such as speakers, secondary display screens, printers, or other output devices. Data to these output devices may travel from a connected host device through the docking station 104 via the host device connector 118 and/or the wireless transceiver of the docking station 104.

As another example, the docking station 104 may include an RJ-45 connector 124, which may be used by the docking station 104 as, for example, a communications connector. In some embodiments, communications data to and/or from a communications device (e.g., a router or other network device) connected to the RJ-45 connector 124 (or other communications connector) may travel through the docking station 104 to and/or from a connected host device via the host device connector 118 and/or the wireless transceiver of the docking station 104.

As another example, the docking station 104 may include an auxiliary graphical data connector 126, which may be, for example, an HDMI connector, a USB-C connector, or another data connector. In some embodiments, graphical data from a connected host device may travel from the host device via the host device connector 118 and/or the wireless transceiver of the docking station 104 through the docking station 104 to a secondary display apparatus (not shown) or another secondary display device that may be connected to the auxiliary graphical data connector 126. This graphical data may be used to render a display on a display screen of such secondary display apparatus or other secondary display device. In embodiments where a secondary display device is connected to an auxiliary graphical data connector 126 in this fashion, the communication of graphical data through the docking station 104 to the secondary display device may be instead of, or in addition to, the communication of graphical data to the direct data connector 112 of the display apparatus 102 previously described.

As another example, the docking station 104 may include an auxiliary power out connector 136, which may be used by the docking station 104 as, for example, a power connector for use with a secondary display apparatus (not shown). The auxiliary power out connector 136 may be, for example, a DC connector, a USB (e.g., USB-C) connector, an IEC 420 C13 or C14 connector, or any other connector (including custom and/or hybrid connectors) capable of communicating power from the docking station 104 to another device. In some embodiments, power from the docking station 104 may travel to a secondary display apparatus that is connected to the auxiliary power out connector 136. This power may be provided to the secondary display apparatus so that it may operate. This power may be sourced by the docking station 104 from the power source connector 117.

Various connectors of the docking station 104 (e.g., the host device connector 118, the auxiliary graphical data connector 126, and/or the auxiliary power out connector 136) may be placed at the end of cables (e.g., cables 120, 128, 138) integrated into the docking station 104 in order to facilitate simplicity in connecting the connector to its associated external object/host device. Other embodiments without such cables (e.g., where a fully detachable cable is separately provided to interface with the connector of the docking station 104 and a connector on the associated external object/host device, and/or where the associated external object/host device is connected directly to the docking station 104 via a connector integrated into the body of the docking station 104) are also contemplated.

FIG. 1B illustrates a back view of the docking station 104. The docking station 104 may include a direct power out connector 130. As described above, the direct power out connector 130 may interface with the direct power in connector 116 of the display apparatus 102 and may deliver power to the direct power in connector 116 to operate the display apparatus 102. The direct power out connector 130 may be, for example, a DC connector, a USB (e.g., USB-C) connector, or any other connector (including custom and/or hybrid connectors) capable of communicating power from the docking station 104 to the display apparatus 102.

The docking station 104 may include a direct data connector 132. As described above, the direct data connector 132 may interface with the direct data connector 112 of the display apparatus 102 to communicate graphical and/or other data from a host device connected to the docking station 104 to the display screen 114 of the display apparatus 102. The direct data connector 132 may be, for example, an HDMI connector, a DVI connector, a USB (e.g., USB-C) connector, a Thunderbolt™3 connector, or any other connector (including custom and/or hybrid connectors) capable of communicating graphical and/or other data from the docking station 104 for use with the display apparatus 102.

It is further contemplated that the features of the direct data connector 132 and the direct power out connector 130 may, in some embodiments, be combined into a single connector that is capable of performing both the data and power communication features described (e.g., a USB-C connector, a Thunderbolt™ 3 connector, and/or a custom and/or hybrid connector made for this combined purpose).

The docking station 104 may include one or more attachment devices 134. As described above, the attachment devices 134 may interact with the attachment devices 108 of the docking station 104 in order to removably attach the docking station 104 to the docking station receptacle 106. In the embodiment of FIG. 1B, the attachment devices 134 may be slotted peg features.

The docking station 104 may include the host device connector 118 (and associated circuitry) and/or the wireless protocol compatibilities necessary to connect with some types of host devices for the communication of data and/or power to and/or from that type of host device, while another docking station may include a different host device connector (and perhaps different associated circuitry) and/or different wireless protocol compatibilities to connect with other types of host devices for the communication of data and/or power to and/or from those types of host devices. It is anticipated that a user of the system 100 may be able to leverage the removably attachable nature of the docking stations herein described (e.g., the docking station 104) to switch between two or more such docking stations that are configured to work with the display apparatus 102 as needed, depending on current device (host or otherwise) compatibility requirements.

The docking station 104 may include one or more processors and/or controllers (not shown) having instructions thereon to implement one or more features of the docking station 104 as described herein. Similarly, the display apparatus 102 may include one or more processors and/or controllers (not shown) having instructions thereon to implement one or more features of the display apparatus 102 as described herein. Such instructions may be sourced from a non-transitory computer-readable medium (not shown) on or associated with these processors and/or controllers.

Figure 2A:
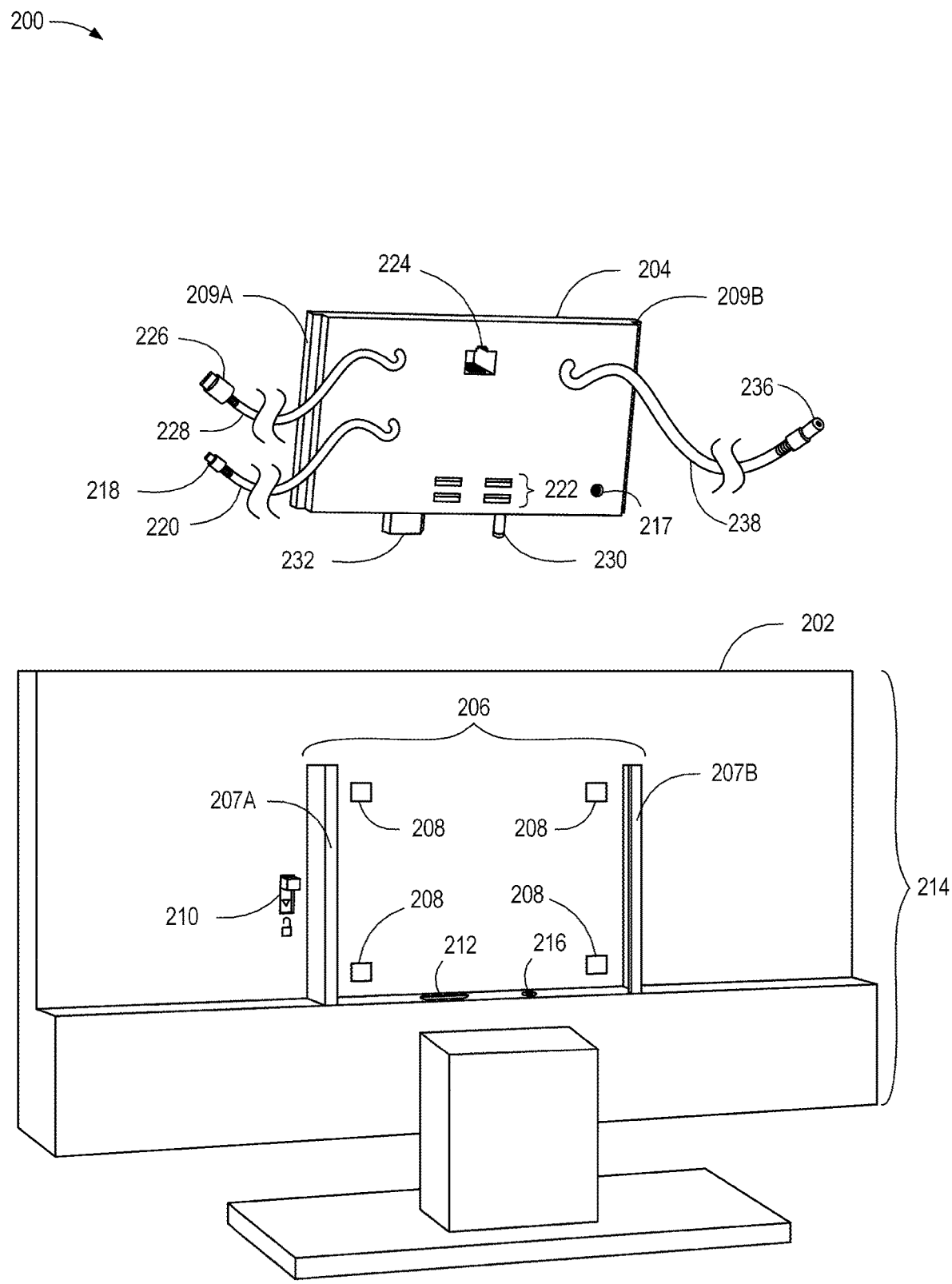
FIGS. 2A-2B illustrate components of a system for docking with a host device, according to an embodiment.
Figure 2B:
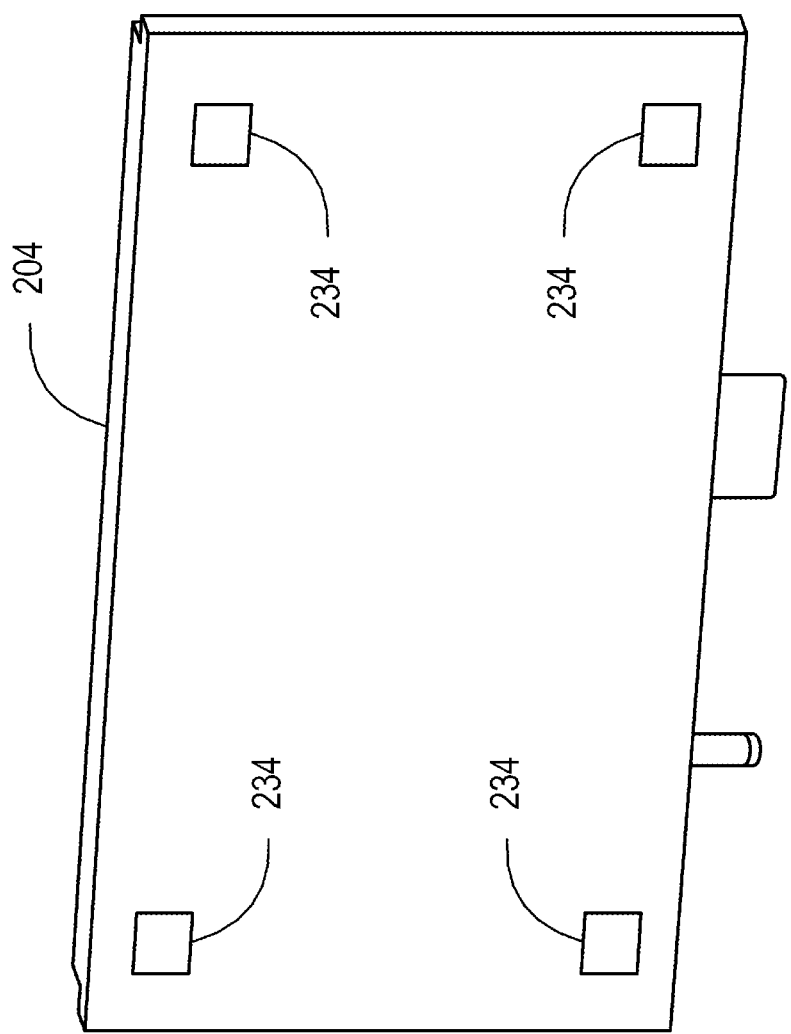

FIGS. 2A-2B illustrate components of a system 200 for docking with a host device, according to an embodiment. FIG. 2A illustrates a display apparatus 202 and a docking station 204.

The display apparatus 202 may include a docking station receptacle 206. The docking station receptacle 206 may include rails 207A and 207B to receive the docking station 204 when the docking station 204 is slid down the back of the display apparatus 202. The docking station 204 may be one of many possible docking stations (with compatibility with many possible host devices) that are useable with the display apparatus 202.

The docking station receptacle 206 may include one or more attachment devices 208 that may interact with attachment devices of the docking station 204 to removably attach the docking station 204 in place once the docking station 204 has been inserted into the docking station receptacle 206. Examples of possible attachment devices that may be used between the docking station 204 and the docking station receptacle 206 include magnet features, hook and catch features, slotted peg and catch features, or any other attachment device 108 appropriate for securing the docking station 204 to the docking station receptacle 206. One, two, three, four, or any other number of these attachment devices may be used. In the embodiment of FIG. 2A, the attachment devices 208 may be magnet attachment devices.

The display apparatus 202 may further include a docking station release mechanism 210. The docking station release mechanism 210 may release the docking station 204 from the docking station receptacle 206 by disengaging the attachment between the attachment devices 208 and any attachment devices of the docking station 204. For example, the docking station release mechanism 210 may disengage a magnetic connection between a magnet associated with an attachment device 208 and a piece of metal associated with an attachment device of the docking station 204. As another example, the docking station release mechanism 210 may disengage a catch associated with an attachment device 208 from, for example, a hook or a slotted peg associated with an attachment device of the docking station 204. The docking station release mechanism 210 may be, for example, a button or a slider. It is contemplated that, in some embodiments, the docking station release mechanism 210 may instead be included on the docking station 204.

The docking station receptacle 206 may include a direct data connector 212. The direct data connector 212 may be configured to interface with a direct data connector 232 of the docking station 204 directly (without the use of a separate cable). This interface may allow the display apparatus 202 to receive and use graphical and/or other data from the docking station 204. For example, graphical data may be communicated to the docking station 204 by a host device connected to the docking station 204 and from there communicated via this interface to the display apparatus 202 and used to render a display on a display screen 214 of the display apparatus 202. The interface between the direct data connector 212 and the direct data connector 232 of the docking station 204 may also allow the display apparatus 202 to send data to the docking station 204. The direct data connector 212 may be, for example, an HDMI connector, a DVI connector, a USB (e.g., USB-C) connector, a Thunderbolt™ 3 connector, or any other connector (including custom and/or hybrid connectors) capable of communicating graphical and/or other data from the docking station 204 for use with the display apparatus 202.

The docking station receptacle 206 may include a direct power in connector 216. The direct power in connector 216 may be configured to interface with a direct power out connector 230 of the docking station 204 directly (without the use of a cable). This interface may allow the docking station 204 to provide the display apparatus 202 with the power necessary to operate. The direct power in connector 216 may be, for example, a DC connector, a USB (e.g., USB-C) connector, or any other connector (including custom and/or hybrid connectors) capable of communicating power from the docking station 204 to the display apparatus 202.

It is further contemplated that the features of the direct data connector 212 and the direct power in connector 216 may, in some embodiments, be combined into a single connector that is capable of performing both the data and power communication features described (e.g., a USB-C connector, a Thunderbolt™ 3 connector, and/or a custom and/or hybrid connector made for this combined purpose).

The docking station 204 may include a host device connector 218. The host device connector 218 may interface with a connector of a host device that is being used with the docking station 204. Via this interface, the host device connector 218 may electronically communicate data and/or power to and/or from the docking station 204 to and/or from the connected host device. The host device connector 218 may be, e.g., a USB-C connector, a Thunderbolt™ 3 connector, or any other connector (including custom and/or hybrid connectors) that may be used to interface with a connector of the connected host device for this purpose.

In some embodiments, the docking station 204 may include a wireless transceiver (internal, not shown in FIG. 2). This wireless transceiver may communicate with a wireless transceiver of the host device that is being used with the docking station 204. This interface may communicate data (e.g., graphical or other data) to and/or from the docking station 204 to and/or from the connected host device. This interface may use, for example, a Wi-Fi™ protocol, a Bluetooth™ protocol, or any other appropriate wireless protocol useable to transfer data in this fashion.

This (or another) wireless transceiver may also be used by the docking station 204 to connect to other wireless network devices (e.g., a network device such as a router) in order to receive independent data (e.g., data not from a host device) from a network. This data may be used to operate the display apparatus 202 (e.g., used to power on and/or off the display apparatus 202, used to render a display on the display screen 214 of the display apparatus 202 (such as, e.g., weather, news, or status of another device on the network)). This data may be, e.g., data received from an IoT system (such as, e.g., an IoT home automation system).

The docking station 204 may include one or more connectors (for example, connectors 217, 222-226, 236) for connecting the docking station 204 to one or more external objects. As discussed above, the docking station 204 may communicate data and/or power to and/or from each of these external objects to and/or from the host device connected to the docking station 204 via the host device connector 218 and/or the wireless transceiver of the docking station 204.

For example, the docking station 204 may include a power source connector 217. The power source connector 217 may be connected to an external power source such as a battery, a connection to a utility transformer that is provided in a structure, or any other appropriate external power source. The connector to an external power source via the power source connector 217 may provide the docking station 204 the necessary power to function. Further, the docking station 204 may need to provide power to each of the display apparatus 202, one or more secondary display apparatuses (not shown), a host device (not shown), and/or one or more external objects connected to the docking station 204. This power (as supplied from the docking station 204 to these other devices) may be necessary for these other devices to operate, charge their internal batteries, and/or pass along power to external objects. The power to be supplied to these other devices by the docking station 204 may be drawn by the docking station 204 from the external power source via the power source connector 217. The power source connector 217 may be, for example, a DC connector, a USB (e.g., USB-C) connector, an IEC 420 C13 or C14 connector, or any other connector (including custom and/or hybrid connectors) capable of communicating power from an external power source to the docking station 204.

As another example, the docking station 204 may include USB connectors 222, which may be individually used by the docking station 204 as one of many possible connectors (e.g., power connectors, communications connectors, and/or data connectors). In some embodiments, one or more of the USB connectors 222 (or other data connectors) may be used to connect to input devices, such as mice and keyboards. Data from these input devices may travel through the docking station 204 to a connected host device via the host device connector 218 and/or the wireless transceiver of the docking station 204. In other embodiments, one or more of the USB connectors 222 (or other data connectors) may be used to connect output devices, such as speakers, secondary display screens, printers, or other output devices. Data to these output devices may travel from a connected host device through the docking station 204 via the host device connector 218 and/or the wireless transceiver of the docking station 204.

As another example, the docking station 204 may include an RJ-45 connector 224, which may be used by the docking station 204 as, for example, a communications connector. In some embodiments, communications data to and/or from a communications device (e.g., a router or other network device) connected to the RJ-45 connector 224 (or other communications connector) may travel through the docking station 204 to and/or from a connected host device via the host device connector 218 and/or the wireless transceiver of the docking station 204.

As another example, the docking station 204 may include an auxiliary graphical data connector 226, which may be, for example, an HDMI connector, a USB-C connector, or another data connector. In some embodiments, graphical data from a connected host device may travel from the host device via the host device connector 218 and/or the wireless transceiver of the docking station 204 through the docking station 204 to a secondary display apparatus (not shown) or another secondary display device that may be connected to the auxiliary graphical data connector 226. This graphical data may be used to render a display on a display screen of such secondary display apparatus or other secondary display device. In embodiments where a secondary display device is connected to the auxiliary graphical data connector 226 (or other data connector) in this fashion, the communication of graphical data through the docking station 204 to the secondary display device may be instead of, or in addition to, the communication of graphical data to the direct data connector 212 of the display apparatus 202 previously described.

As another example, the docking station 204 may include an auxiliary power out connector 236, which may be used by the docking station 204 as, for example, a power connector for use with a secondary display apparatus (not shown). The auxiliary power out connector 236 may be, for example, a DC connector, a USB (e.g., USB-C) connector, an IEC 420 C13 or C14 connector, or any other connector (including custom and/or hybrid connectors) capable of communicating power from the docking station 204 to another device. In some embodiments, power from the docking station 204 may travel to a secondary display apparatus that is connected to the auxiliary power out connector 236. This power may be provided to the secondary display apparatus so that it may operate. This power may be sourced by the docking station 204 from the power source connector 217.

The docking station 204 may include the direct power out connector 230. As described above, the direct power out connector 230 may interface with the direct power in connector 216 of the display apparatus 202 and may deliver power to the direct power in connector 216 to operate the display apparatus 102. The direct power out connector 230 may be, for example, a DC connector, a USB (e.g., USB-C) connector, or any other connector (including custom and/or hybrid connectors) capable of communicating power from the docking station 204 to the display apparatus 202.

The docking station 204 may include the direct data connector 232. As described above, the direct data connector 232 may interface with the direct data connector 212 of the display apparatus 202 to communicate graphical and/or other data from a host device connected to the docking station 204 to the display screen 214 of the display apparatus 202. The direct data connector 232 may be, for example, an HDMI connector, a DVI connector, a USB (e.g., USB-C) connector, a Thunderbolt™3 connector, or any other connector (including custom and/or hybrid connectors) capable of communicating graphical and/or other data from and/or to the docking station 204 and the display apparatus 202.

It is further contemplated that the features of the direct data connector 232 and the direct power out connector 230 may, in some embodiments, be combined into a single connector that is capable of performing both the data and power communication features described (e.g., a USB-C connector, a Thunderbolt™ 3 connector, and/or a custom and/or hybrid connector made for this combined purpose).

The docking station 204 includes a set of rails 209A, 209B. Each rail 209A, 209B may respectively engage with the rails 207A, 207B of the docking station receptacle 206 of the display apparatus 202 as the docking station 204 is slid down the back of the display apparatus 202 and into the docking station receptacle 206. As can be seen when compared to analogous connectors from FIGS. 1A-1B, the positions of the direct power in connector 216 and the direct data connector 212 of the docking station receptacle 206 and the direct power out connector 230 and the direct data connector 232 of the docking station 204 have been modified to account for the sliding nature of the embodiment of FIG. 2A (as opposed to, e.g., the insertion nature of the embodiment of FIG. 1A).

Various connectors of the docking station 204 (e.g., the host device connector 218, the auxiliary graphical data connector 226, and/or the auxiliary power out connector 236) may be placed at the end of cables (e.g., cables 220, 228, 238) integrated into the docking station 204 in order to facilitate simplicity in connecting the connector to its associated external object/host device. Other embodiments without such cables (e.g., where a fully detachable cable is separately provided to interface with the connector of the docking station 204 and a connector on the associated external object/host device, and/or where the associated external object/host device is connected directly to the docking station 204 via a connector integrated into the body of the docking station 204) are also contemplated.

FIG. 2B illustrates a back view of the docking station 204. The docking station 204 may include one or more attachment devices 234. As described above, the attachment devices 234 may interact with the attachment devices 208 of the docking station 204 in order to removably attach the docking station 204 to the docking station receptacle 206. In the embodiment of FIG. 2B, the attachment devices 234 may be metal attachment devices.

The docking station 204 may include the host device connector 218 (and associated circuitry) and/or the wireless protocol compatibilities necessary to connect with some types of host devices for the communication of data and/or power to and/or from that type of host device, while another docking station may include a different host device connector (and perhaps different associated circuitry) and/or the wireless protocol compatibilities to connect with other types of host devices for the communication of data and/or power to and/or from those types of host devices. It is anticipated that a user of the system 200 may be able to leverage the removably attachable nature of the docking stations herein described (e.g., the docking station 204) to switch between two or more such docking stations that are configured to work with the display apparatus 202 as needed, depending on current device (host or otherwise) compatibility requirements.

The docking station 204 may include one or more processors and/or controllers (not shown) having instructions thereon to implement one or more features of the docking station 204 as described herein. Similarly, the display apparatus 202 may include one or more processors and/or controllers (not shown) having instructions thereon to implement one or more features of the display apparatus 202 as described herein. Such instructions may be sourced from a non-transitory computer-readable medium (not shown) on or associated with these processors and/or controllers.

Figure 3A:
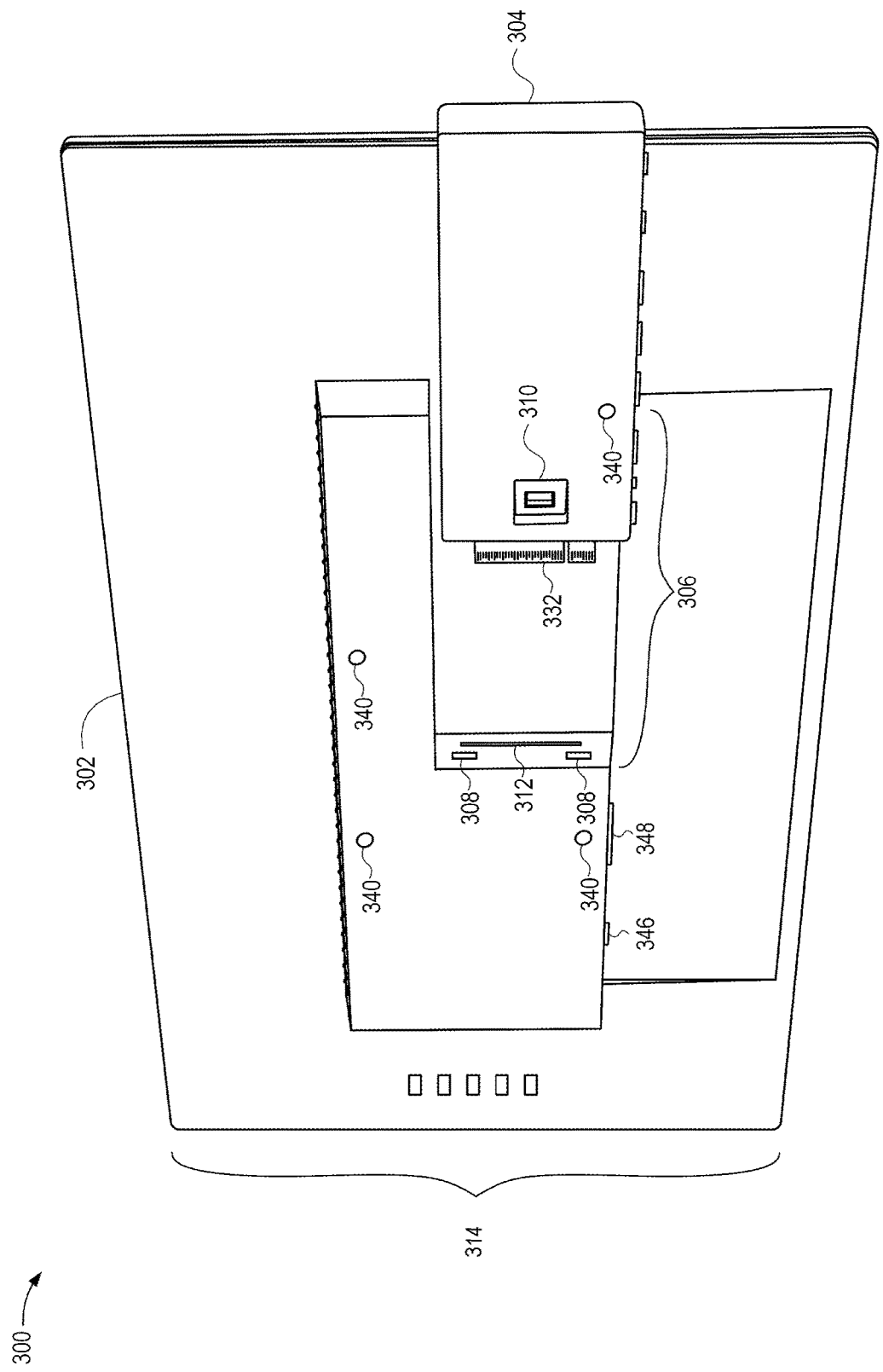
FIGS. 3A-3C illustrate components of a system for docking with a host device, according to an embodiment.
Figure 3B:
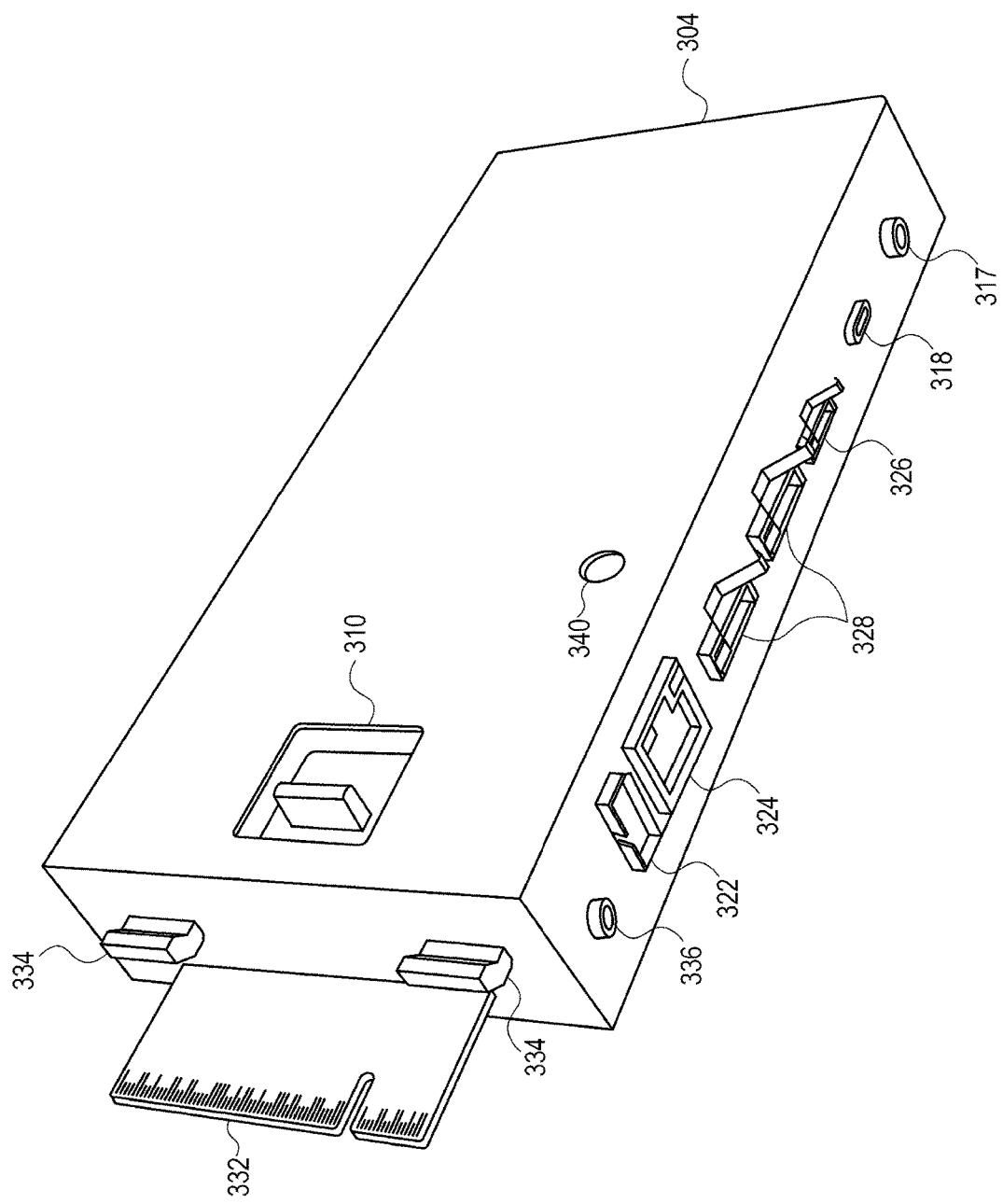
Figure 3C:
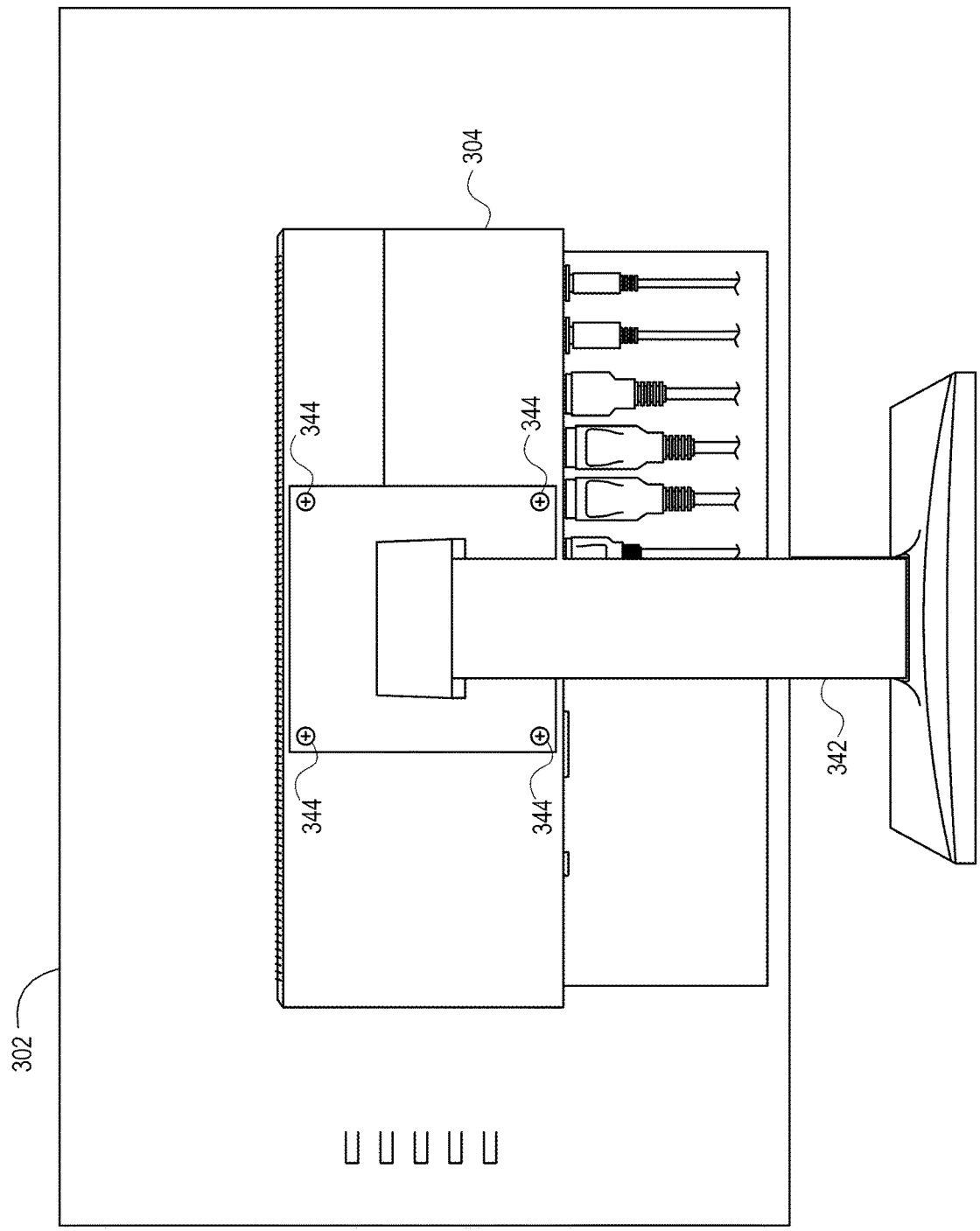

FIGS. 3A-3C illustrate components of a system 300 for docking with a host device, according to an embodiment. FIG. 3A illustrates a display apparatus 302 and a docking station 304.

The display apparatus 302 may include a docking station receptacle 306. The docking station receptacle 306 may be shaped to receive the docking station 304 when the docking station 304 is slid across the back of the display apparatus 302. The docking station 304 may be one of many possible docking stations (with compatibility with many possible host devices) that are useable with the display apparatus 302.

The docking station receptacle 306 may include one or more attachment devices 308 that may interact with attachment devices of the docking station 304 (not shown in FIG. 3A) to removably attach the docking station 304 in place once the docking station 304 has been placed into the docking station receptacle 306. Examples of possible attachment devices that may be used between the docking station 304 and the docking station receptacle 306 include magnet features, hook and catch features, slotted peg and catch features, or any other attachment device 108 appropriate for securing the docking station 304 to the docking station receptacle 306. One, two, three, four, or any other number of these attachment devices may be used. In the embodiment of FIG. 3A, the attachment devices 308 are catch attachment devices appropriate to accept a hook.

The docking station 304 may include a docking station release mechanism 310. The docking station release mechanism 310 may release the docking station 304 from the docking station receptacle 306 by disengaging the attachment between the attachment devices 308 and any attachment devices of the docking station 304. For example, the docking station release mechanism 310 may disengage a magnetic connection between a magnet associated with an attachment device 308 and a piece of metal associated with an attachment device of the docking station 304. As another example, the docking station release mechanism 310 may disengage a hook associated with an attachment device of the docking station 304 from, for example, a catch associated with an attachment device 308 the docking station 304. The docking station release mechanism 310 may be, for example, a button or a slider. It is contemplated that in some embodiments the docking station release mechanism 310 may instead be included on the display apparatus 302.

The docking station receptacle 306 may include a combined direct data/power in connector 312. The combined direct data/power in connector 312 may be configured to interface with a combined direct data/power out connector 332 of the docking station 304 directly (without the use of a separate cable). This interface may allow the display apparatus 302 to receive and use graphical and/or other data from the docking station 304. For example, graphical data may be communicated to the docking station 304 by a host device connected to the docking station 304 and from there communicated via this interface to the display apparatus 302 and used to render a display on a display screen 314 of the display apparatus 302. The interface between the combined direct data/power in connector 312 and the combined direct data/power out connector 332 of the docking station 304 may also allow the display apparatus 302 to send data to the docking station 304.

The interface between the combined direct data/power in connector 312 and the combined direct data/power out connector 332 may also allow the docking station 304 to provide the display apparatus 302 with the power necessary to operate.

The combined direct data/power in connector 312 may be, for example, an HDMI connector, a DVI connector, a USB (e.g., USB-C) connector, a Thunderbolt™ 3 connector, or any other connector (including custom and/or hybrid connectors) capable of communicating power and graphical and/or other data from the docking station 304 for use with the display apparatus 302. In the embodiment of FIG. 3A, the combined direct data/power in connector 312 is a custom connector.

Relatedly, the docking station 304 may include a combined direct data/power out connector 332. As described above, the combined direct data/power out connector 332 may interface with the combined direct data/power in connector 312 of the display apparatus 302 and may deliver power to the combined direct data/power in connector 312 to operate the display apparatus 302.

The interface between the combined direct data/power out connector 332 and the combined direct data/power in connector 312 of the display apparatus 302 may also allow the docking station 304 to communicate graphical and/or other data from a host device connected to the docking station 304 to the display screen 314 of the display apparatus 302 (and/or other data transfers between the docking station 304 and the display apparatus 302) in the manner described above.

The combined direct data/power out connector 332 may be, for example, an HDMI connector, a USB (e.g., USB-C) connector, a Thunderbolt™ 3 connector, or any other connector (including custom and/or hybrid connectors) capable of communicating power and graphical and/or other data from the docking station 304 for use with the display apparatus 302. In the embodiment of FIG. 3B, the combined direct data/power out connector 332 is a custom connector.

Each of the display apparatus 302 and/or the docking station 304 may include one or more mounting features 340. The mounting features 340 may be used to attach a mount to the display apparatus 302 and/or the docking station 304 such that one or both of these can be mounted. In the embodiment of FIG. 3A, three mounting features 340 are present on the display apparatus 302 and one mounting feature 340 is present on the docking station 304. A subset of the mounting features 340 may be placed on each of the display apparatus 302 and the docking station 304 such that when the docking station 304 is placed in the docking station receptacle 306 to interface with the display apparatus 302 in the manner described herein, the mounting features 340 are aligned with the mounting features of a mount (e.g., are placed such that they are compatible/consistent with mounting features on a mount provided by the manufacturer of the display apparatus 302 and/or the docking station 304, and/or such that they are compatible/consistent with mounting features on another mount (e.g., a Flat Display Mounting Interface (FDMI) compatible mount (also known colloquially as a Video Electronics Standards Association (VESA) mount))).

By placing a subset of the mounting features 340 on each of the display apparatus 302 and the docking station 304, it may be that the installation of a mount that uses one or more of the mounting features 340 from each of the display apparatus 302 and the docking station 304 may act to secure the docking station 304 in the docking station receptacle 306 of the display apparatus 302 (as shown in FIG. 3C). While FIGS. 3A-3C show (in aggregate) three mounting features 340 on the display apparatus 302, this is not strictly necessary; in various embodiments, a single mounting feature 340 on each of the display apparatus 302 and the docking station 304 is sufficient to secure the docking station 304 in the docking station receptacle 306 of the display apparatus 302. Mounting features 340 may be, e.g., holes (e.g., tapered holes), tabs, slots, slotted posts, hooks, screws, catches, or any other feature sufficient to interface with mounting features found on a mount. In the embodiment of FIG. 3A, the mounting features 340 are illustrated as holes.

The display apparatus 302 may further include an auxiliary power in connector 346. The auxiliary power in connector 346 may be capable of connecting to an external power source to receive the power to operate the display apparatus 302. The use of an auxiliary power in connector is described in more detail below.

The display apparatus 302 may further include a graphical data connector 348 (illustrated here as an HDMI port, but other types consistent with the disclosure herein are contemplated) that can be used to communicate graphical data to the display apparatus 302 in a manner other than via the combined direct data/power in connector 312 as describe herein.

It may be that in some instances, the display apparatus 302 may be able to operate its display screen 314 via power received at the auxiliary power in connector 346 and/or graphical data received at the graphical data connector 348 in cases where the docking station 304 is not present.

FIG. 3B illustrates a perspective view of the docking station 304. The docking station 304 may include a host device connector 318. The host device connector 318 may interface with a connector of a host device that is being used with the docking station 304. Via this interface, the host device connector 318 may electronically communicate data and/or power to and/or from the docking station 204 to and/or from the connected host device. The host device connector 318 may be, e.g., a USB-C connector, a Thunderbolt™ 3 connector, or any other connector (including custom and/or hybrid connectors) that may be used to interface with a connector of the connected host device for this purpose. In the embodiment of FIG. 3B, the host device connector 318 is illustrated as a USB-C connector.

In some embodiments, the docking station 304 may include a wireless transceiver (internal, not shown in FIG. 3B). This wireless transceiver may communicate with a wireless transceiver of the host device that is being used with the docking station 304. Via this interface, the wireless transceiver may electronically communicate data (e.g., graphical or other data) to and/or from the docking station 304 to and/or from the connected host device. This interface may use, for example, a Wi-Fi™ protocol, a Bluetooth™ protocol, or any other appropriate wireless protocol useable to transfer data in this fashion.

This (or another) wireless transceiver may also be used by the docking station 304 to connect to other wireless network devices (e.g., a network device such as a router) in order to receive independent data (e.g., data not from a host device) from a network. This data may be used to operate the display apparatus 302 (e.g., used to power on and/or off the display apparatus 302, used to render a display on the display screen 314 of the display apparatus 302 (such as, e.g., weather, news, or status of another device on the network)). This data may be, e.g., data received from an IoT system (such as, e.g., an IoT home automation system).

The docking station 304 may include one or more connectors (for example, connectors 317, 322-328, 336) for connecting the docking station 304 to one or more external objects. As discussed above, the docking station 304 may communicate data and/or power to and/or from each of these external objects to and/or from the host device connected to the docking station 304 via the host device connector 318 and/or the wireless transceiver of the docking station 304.

For example, the docking station 304 may include a power source connector 317. The power source connector 317 may be connected to an external power source such as a battery, a connection to a utility transformer that is provided in a structure, or any other appropriate external power source. The connector to an external power source via the power source connector 317 may provide the docking station 304 the necessary power to function. Further, the docking station 304 may need to provide power to each of the display apparatus 302, one or more secondary display apparatuses (not shown), a host device (not shown), and/or one or more external objects (not shown) connected to the docking station 304. This power (as supplied from the docking station 304 to these other devices) may be necessary for these other devices to operate, charge their internal batteries, and/or pass along power to external objects. The power to be supplied to these other devices by the docking station 304 may be drawn by the docking station 304 from the external power source via the power source connector 317. The power source connector 317 may be, for example, a DC connector, a USB (e.g., USB-C) connector, an IEC 420 C13 or C14 connector, or any other connector (including custom and/or hybrid connectors) capable of communicating power from an external power source to the docking station 304. In the embodiment of FIG. 3B, the power source connector 317 is illustrated as a DC connector.

As another example, the docking station 304 may include one or more USB connectors 322, which may be individually used by the docking station 304 as one of many possible connectors (e.g., power connectors, communications connectors, and/or data connectors). In some embodiments, one or more of the USB connectors 322 (or other data connectors) may be used to connect to input devices, such as mice and keyboards. Data from these input devices may travel through the docking station 304 to a connected host device via the host device connector 318 and/or the wireless transceiver of the docking station 304. In other embodiments, one or more of the USB connectors 322 (or other data connectors) may be used to connect output devices, such as speakers, secondary display screens, printers, or other output devices. Data to these output devices may travel from a connected host device through the docking station 304 via the host device connector 318 and/or the wireless transceiver of the docking station 304.

As another example, the docking station 304 may include an RJ-45 connector 324, which may be used by the docking station 304 as, for example, a communications connector. In some embodiments, communications data to and/or from a communications device (e.g., a router or other network device) connected to the RJ-45 connector 324 (or other communications connector) may travel through the docking station 304 to and/or from a connected host device via the host device connector 318 and/or the wireless transceiver of the docking station 304.

As another example, the docking station 304 may include an external HDMI connector 326 and/or one or more DisplayPort™ connectors 328, each of which may be used by the docking station 304 as, for example, auxiliary graphical data connector(s). In some embodiments, graphical data from a connected host device may travel from the host device via the host device connector 318 and/or the wireless transceiver of the docking station 304 through the docking station 304 to a secondary display apparatus (not shown) or another secondary display device that may be connected to any of the external HDMI connector 326 or the DisplayPort™ connectors 328. This graphical data may be used to render a display on a display screen of such secondary display apparatus or other secondary display device. In embodiments where a secondary display device is connected to the external HDMI connector 326 or a DisplayPort™ connector 328 (or other data connector) in this fashion, the communication of graphical data through the docking station 304 to the secondary display device may be instead of, or in addition to, the communication of graphical data to the combined direct data/power in connector 312 of the display apparatus 302 previously described.

As another example, the docking station 304 may include an auxiliary power out connector 336, which may be used by the docking station 304 as, for example, a power connector for use with a secondary display apparatus (not shown). The auxiliary power out connector 336 may be, for example, a DC connector, a USB (e.g., USB-C) connector, an IEC 420 C13 or C14 connector, or any other connector (including custom and/or hybrid connectors) capable of communicating power from the docking station 304 to another device. In some embodiments, power from the docking station 304 may travel to a secondary display apparatus that is connected to the auxiliary power out connector 336. This power may be provided to the secondary display apparatus so that it may operate. This power may be sourced by the docking station 304 from the power source connector 317. In the embodiment of FIG. 3B, the power out connector 336 is illustrated as a DC connector.

The docking station 304 may include one or more attachment devices 334. As described above, the attachment devices 334 may interact with the attachment devices 308 of the docking station receptacle 306 of FIG. 3A in order to removably attach the docking station 304 to the docking station receptacle 306. In the embodiment of FIG. 3B, the hook attachment devices 334 are illustrated as hook features corresponding to the catch attachment devices 308 described above in relation to FIG. 3A.

The docking station 304 may include the host device connector 318 (and associated circuitry) and/or the wireless protocol compatibilities necessary to connect with some types of host devices for the communication of data and/or power to and/or from that type of host device, while another docking station may include a different host device connector (and perhaps different associated circuitry) and/or the wireless protocol compatibilities to connect with other types of host devices for the communication of data and/or power to and/or from those types of host devices. It is anticipated that a user of the system 300 may be able to leverage the removably attachable nature of the docking stations herein described (e.g., the docking station 304) to switch between two or more such docking stations that are configured to work with the display apparatus 302 as needed, depending on current device (host or otherwise) compatibility requirements.

The docking station 304 may include one or more processors and/or controllers (not shown) having instructions thereon to implement one or more features of the docking station 304 as described herein. Similarly, the display apparatus 302 may include one or more processors and/or controllers (not shown) having instructions thereon to implement one or more features of the display apparatus 302 as described herein. Such instructions may be sourced from a non-transitory computer-readable medium (not shown) on or associated with these processors and/or controllers.

FIG. 3C illustrates the docking station 304 having been placed in the docking station receptacle 306 of the display apparatus 302, with the combined display apparatus 302 and docking station 304 having been attached to a mount 342. The mount 342 may be, e.g., a VESA mount. As illustrated, the mount may be designed such that it does not interfere with access by one or more cables to the various connectors (described above) of the docking station 304 when in use.

The mount 342 includes mounting features 344 that are interfaced with the mounting features 340 showing (by way of example and not by way of limitation, as described above) one mounting feature 344 connected to one mounting feature 340 present on the docking station 304 and three mounting features 344 connected to three mounting features 340 present on the display apparatus 302. Mounting features 344 may be screws, holes, tabs, slots, slotted posts, hooks, or any other feature sufficient to interface with mounting features as those features have been described above. In the embodiment of FIG. 3C, the mounting features 344 are illustrated as screws. As illustrated, the installation of the mount 342 to the combined display apparatus 302 and docking station 304 has acted to further secure the docking station 304 in the docking station receptacle 306 (see FIG. 3A) of the display apparatus 302 in the manner described above.

Figure 4:
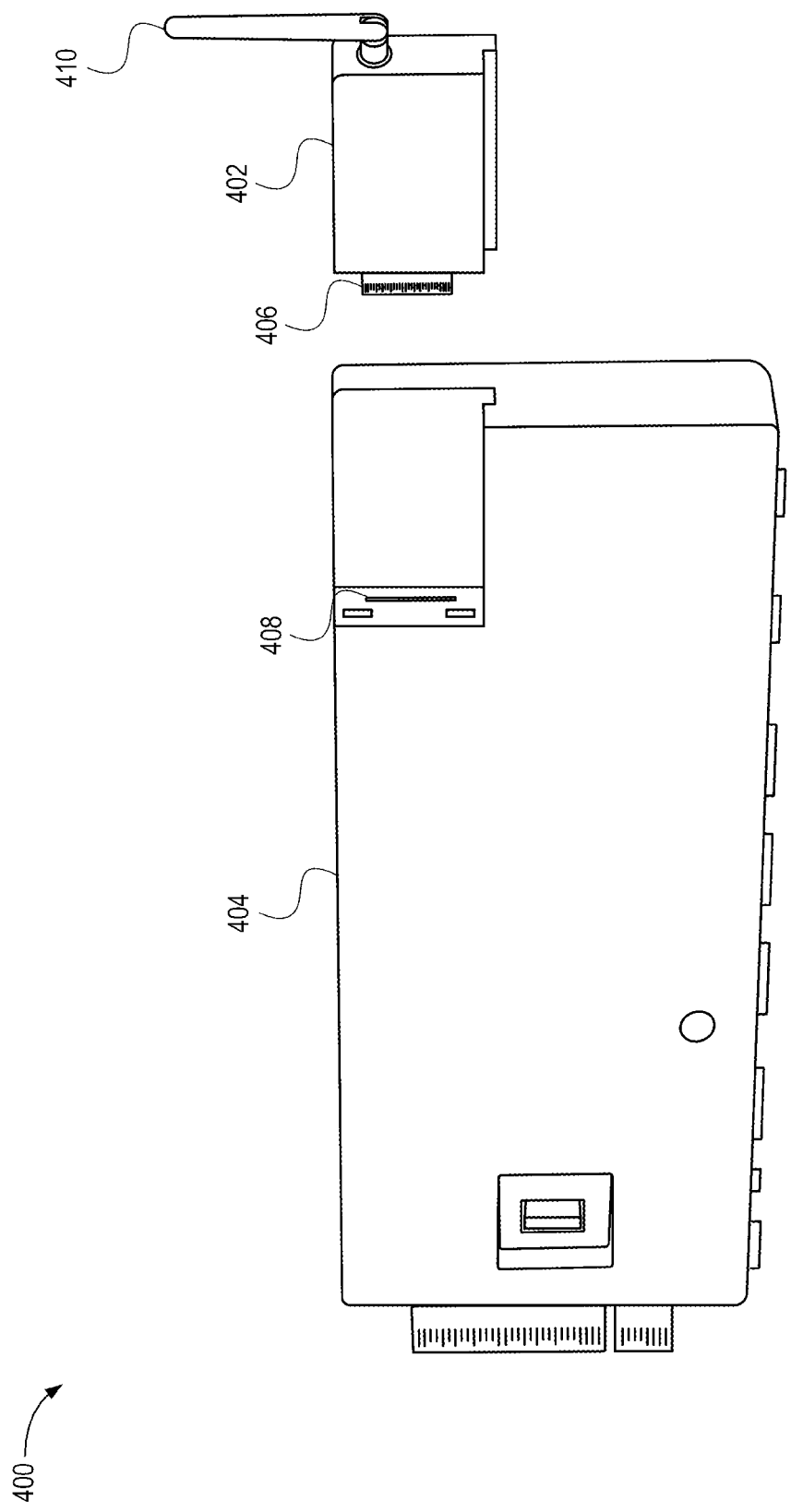
FIG. 4 illustrates a docking station with a wireless transceiver that is removable from a body of the docking station, according to an embodiment.

FIG. 4 illustrates a docking station 400 with a wireless transceiver 402 that is removable from a body 404 of the docking station 400, according to an embodiment. The wireless transceiver 402 may include a transceiver data/power in connector 406 that interfaces with a transceiver data/power out connector 408 on the body 404 of the docking station 400. The wireless transceiver 402 may draw data and/or power from the transceiver data/power out connector 408 through the transceiver data/power in connector 406. This data and/or power may be sourced at the docking station 400 (e.g., via one or more of connectors of the docking station 400, analogously to embodiments herein described) and from there provided to the wireless transceiver 402 to be sent to, for example, a host device and/or other wireless network device(s). Further, the wireless transceiver 402 may provide received data (e.g., data received at the wireless transceiver 402 from the host device and/or from other wireless network device(s), as described herein) for use at the docking station 400.

The wireless transceiver 402 may further include an external antenna 410. The external antenna 410 may be used to wirelessly communicate wireless signals to and/or from a host device and/or other wireless network device(s) in the manner described herein. Use of the external antenna 410 may result in the reception of a wireless signal that is more powerful than, or different than, e.g., a reception of a signal at a wireless transceiver (whether integrated or removable) that does not use an external antenna. While the antenna 410 has been illustrated on the wireless transceiver 402 (which is removable), it is contemplated that an external antenna may be used with integrated (rather than removable) wireless transceivers of docking stations having integrated wireless transceivers.

It may be that there are a plurality of wireless transceivers (e.g., the wireless transceiver 402, and other wireless transceivers) which are removable and are each configured to removably interface with the docking station 400 in the manner described. It may be possible to switch one wireless transceiver (e.g., the wireless transceiver 402) for another wireless transceiver (or vice versa) in order to use a wireless transceiver at the docking station 400 that is compatible with a particular host device, and/or that supports one or more desired wireless standards that allow for the wireless communications (including, e.g., IoT communications) that are described herein.

While the docking station 400 has been illustrated as similar in style to the docking station 304 of FIGS. 3A-3C, it is contemplated that any docking station discussed herein (e.g., the docking stations 104 of FIGS. 1A-1B and 204 of FIGS. 2A-2B) may also include a removable wireless transceiver as described herein.

It is contemplated that other embodiments of docking stations (e.g., the docking stations described in relation to FIGS. 1-3) may have internal (non-removable) wireless transceivers. Other docking stations may not include a wireless transceiver at all. It is contemplated that any type of docking station (having either no wireless transceiver, having an integrated wireless transceiver, or having a removable wireless transceiver) with any type of antenna(s) (no antennas, one or more internal antenna(s), one or more external antenna(s)) may be used in embodiments discussed herein.

Figure 5:
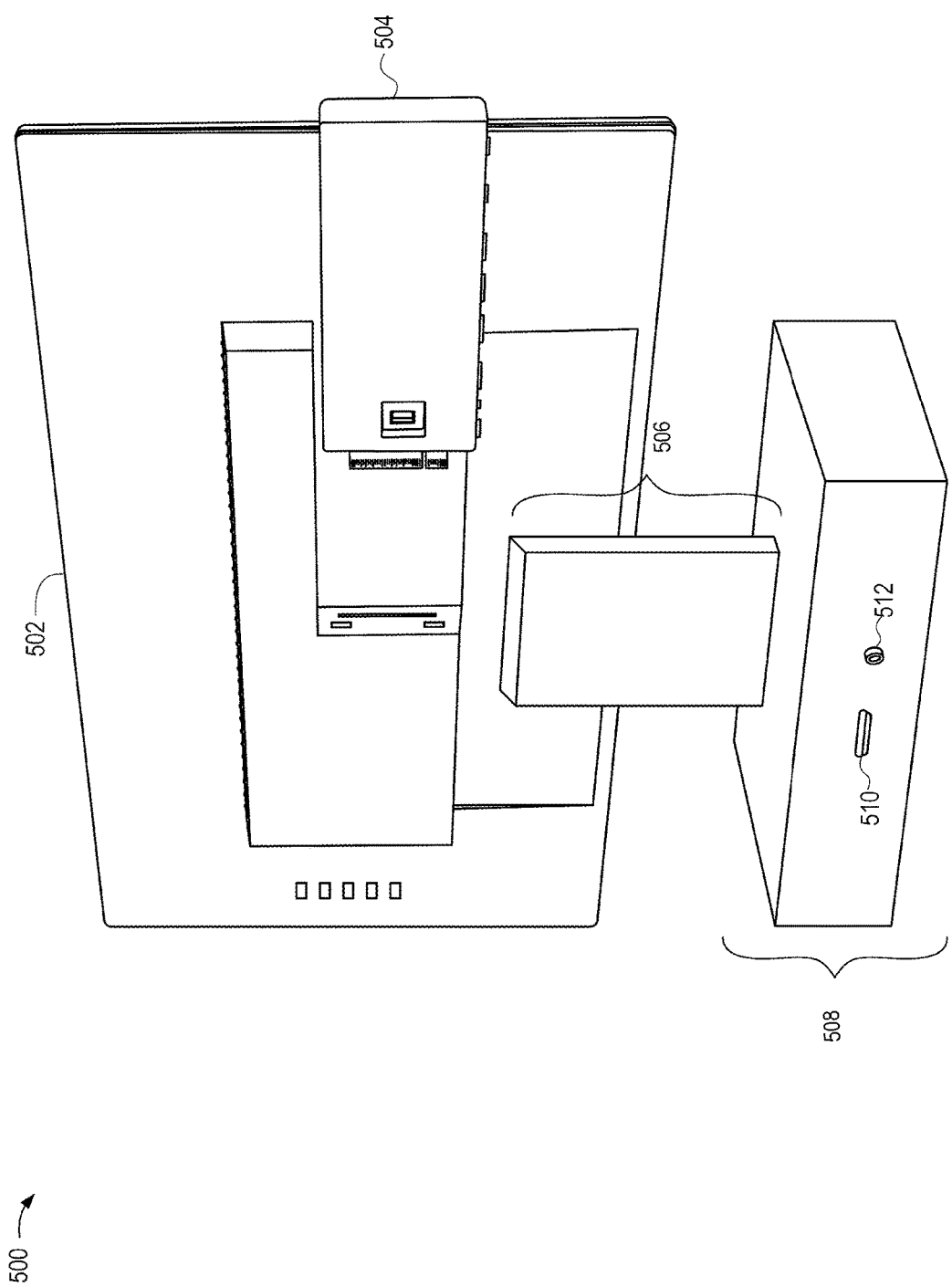
FIG. 5 illustrates components of a system for docking with a host device, according to an embodiment.

FIG. 5 illustrates components of a system 500 for docking with a host device, according to an embodiment. It is contemplated that a display apparatus of the present disclosure may or may not include a neck and/or a base incorporated into the display apparatus. For example, it is noted that the display apparatuses 102 of FIG. 1A and 202 of FIG. 2A have been illustrated with a neck and a base. In FIG. 5, a display apparatus 502 is being used with a docking station 504. The docking station 504 may be similar to the docking station 304 of FIGS. 3B and 3C. Alternatively, another docking station described herein (such as, e.g., the docking station 400 of FIG. 4, with the removable wireless transceiver and an external antenna, or other docking station(s) described herein) may be used. The display apparatus 502 may be similar to the display apparatus 302 of FIGS. 3A and 3C, but may further include one or more of a neck 506 and/or a base 508.

The neck 506 and/or the base 508 of the display apparatus 502 may include any part of the components necessary for the display apparatus 502 to function, as described herein. For example, the base 508 has been illustrated with the graphical data port 510 and the auxiliary power in port 512 (which may serve the same purpose for the display apparatus 502 as, e.g., the graphical data connector 348 and the auxiliary power in connector 346 described above in relation to the display apparatus 302 of FIG. 3A). Any other component (including internal components) of the display apparatus 502 may be included in either of the neck or the base of the display apparatus when such neck and/or base are present.

Figure 6:
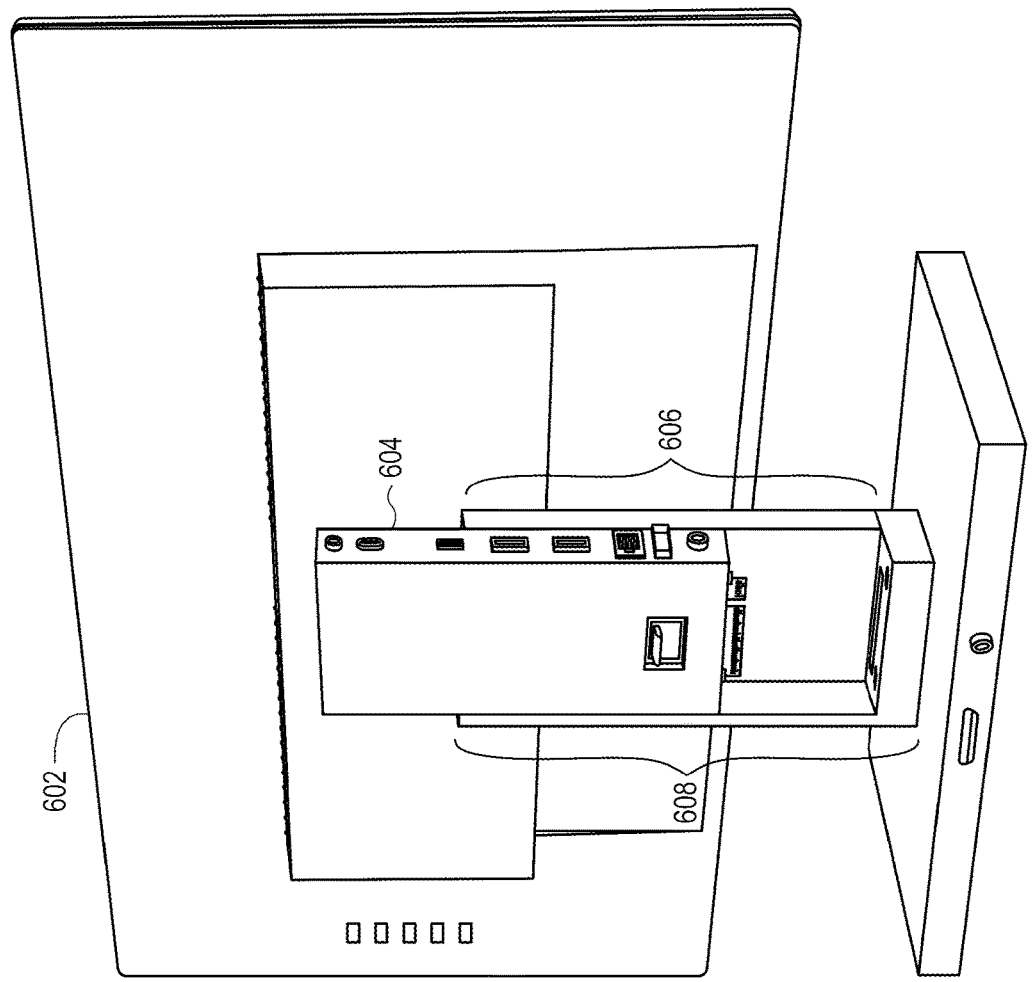
FIG. 6 illustrates components of a system for docking with a host device, according to an embodiment.

FIG. 6 illustrates components of a system 600 for docking with a host device, according to an embodiment. It is contemplated that for some embodiments of a display apparatus, a docking station may interface with a docking station receptacle that is in a neck portion of the display apparatus. For example, the docking station 604 may interface with a docking station receptacle 606 that is in the neck 608 of the display apparatus 602, in the manner illustrated. The docking station 604 may be similar to the docking station 304 of FIGS. 3B and 3C. Alternatively, other docking station(s) described herein (such as, e.g., the docking station 400 of FIG. 4, with the removable wireless transceiver and an external antenna) may be used.

Figure 7:
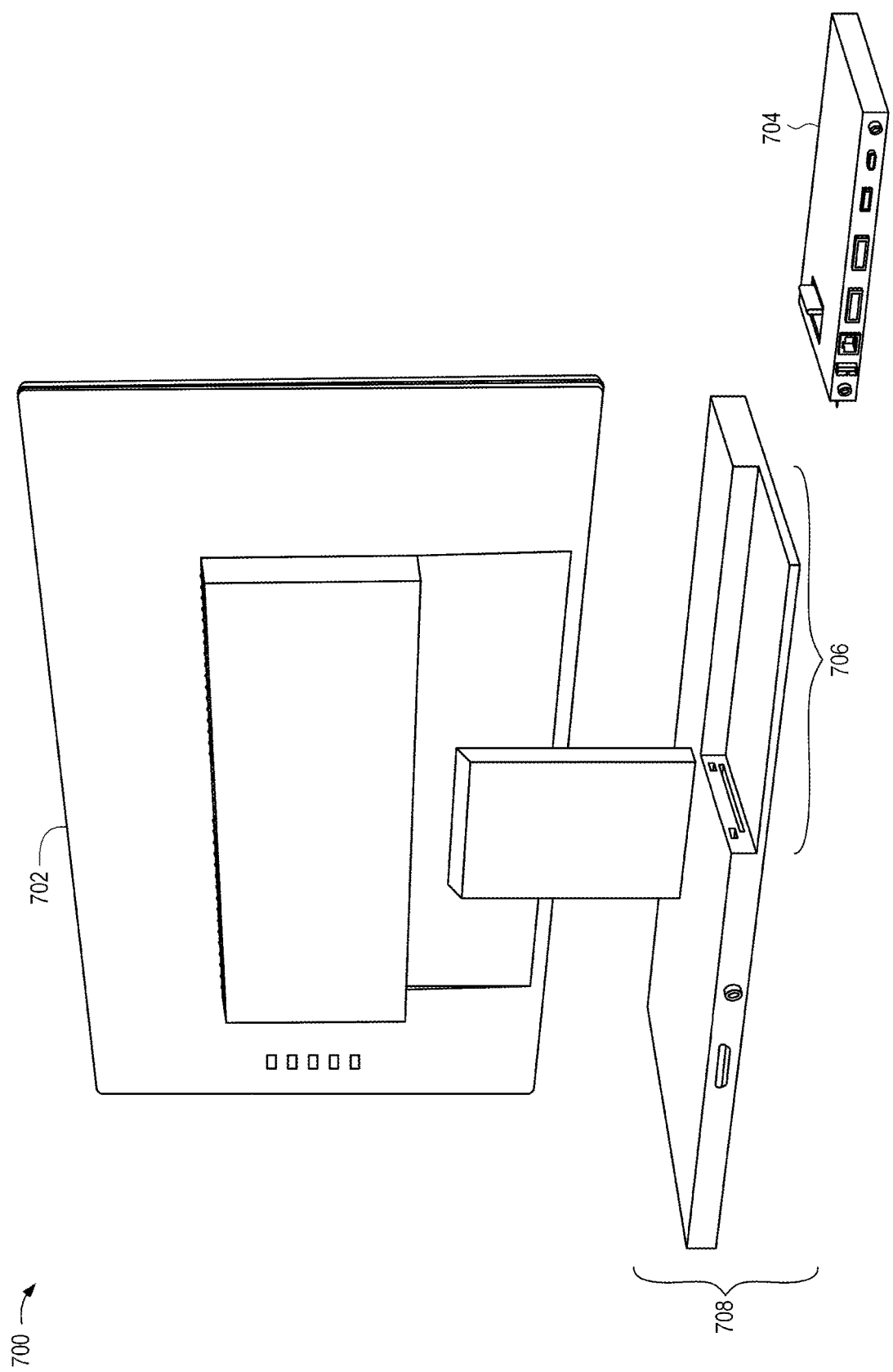
FIG. 7 illustrates components of a system for docking with a host device, according to an embodiment.

FIG. 7 illustrates components of a system 700 for docking with a host device, according to an embodiment. It is contemplated that for some embodiments of a display apparatus, a docking station may interface with a docking station receptacle that is in a base portion of the display apparatus. For example, the docking station 704 may interface with a docking station receptacle 706 that is in the base 708 of the display apparatus 702, in the manner illustrated. The docking station 704 may be similar to the docking station 304 of FIGS. 3B and 3C. Alternatively, other docking station(s) described herein (such as, e.g., the docking station 400 of FIG. 4, with the removable wireless transceiver and an external antenna) may be used.

Figure 8:
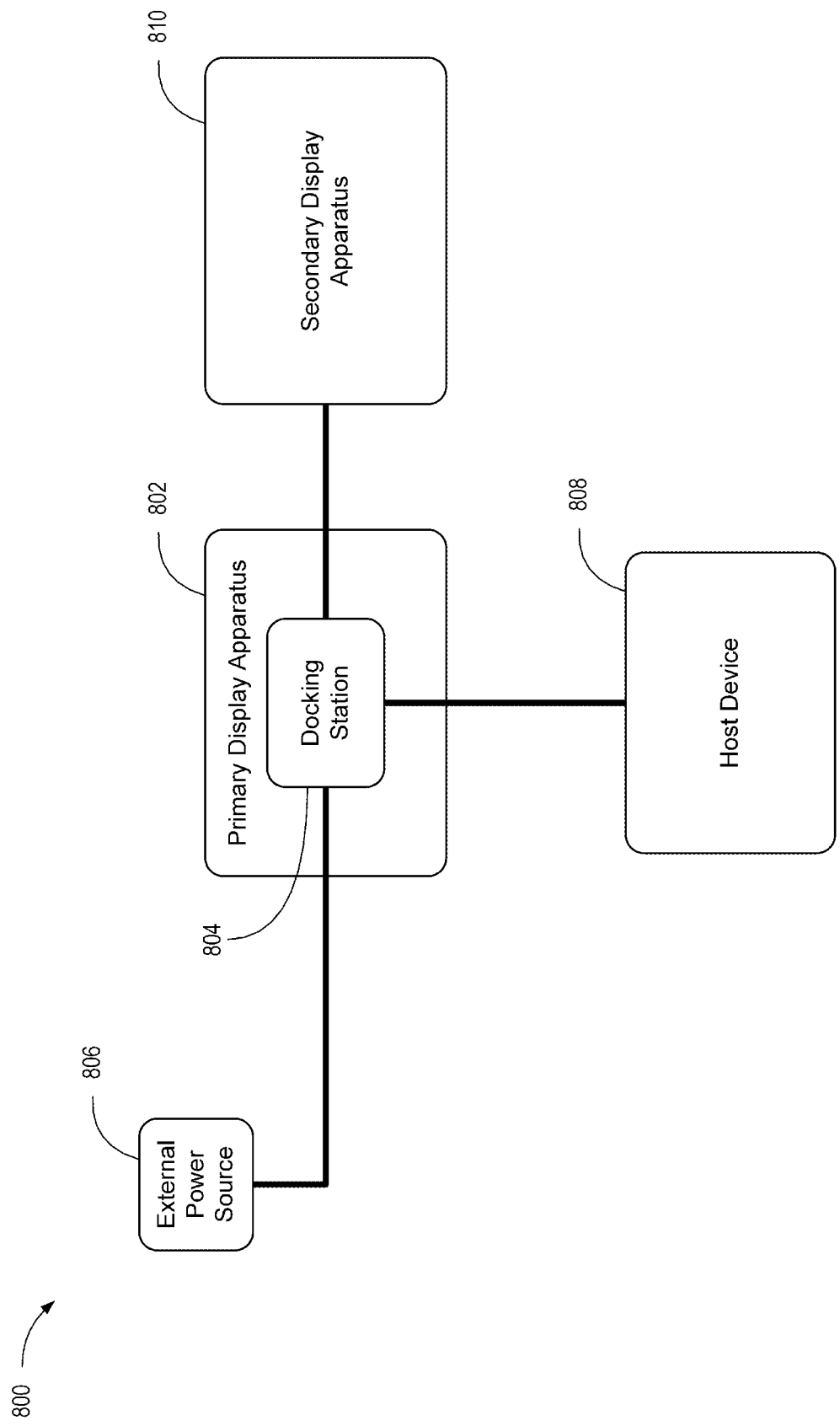
FIG. 8 is a block diagram of a system for docking with a host device, according to an embodiment.

FIG. 8 is a block diagram of a system 800 for docking with a host device 808, according to an embodiment. The system 800 further includes a primary display apparatus 802, a docking station 804, an external power source 806, and a secondary display apparatus 810. In the system 800, the docking station 804 may have been removably attached to the primary display apparatus 802 at a docking station receptacle (not illustrated) of the primary display apparatus 802, in like manner to that described above in relation to FIGS. 1A-1B and/or FIGS. 2A-2B.

The external power source 806 may be connected to the docking station 804. The external power source 806 may be, for example, a battery, a connection to a utility transformer via a wall outlet, or any other appropriate external power source. The docking station 804 may take power directly from the external power source 806 in order to operate. It may further provide at least some of the power from the external power source 806 to the primary display apparatus 802 to which it has been attached (e.g., via the interface between a direct power in connector of the primary display apparatus 802 and a direct power out connector of the docking station 804 in like manner to that described above in relation to FIGS. 1A-1B and/or FIGS. 2A-2B). The primary display apparatus 802 may use power supplied via the docking station 804 in this way to operate.

In some embodiments, at least some of the power received at the docking station 804 from the external power source 806 may be communicated to the host device 808 connected to the docking station 804. This power may be used by the host device 808 to operate, charge a battery of the host device 808, power external objects that are connected directly to any connector(s) of the host device 808, and/or for any other purpose for which the host device 808 may require power. This power may be provided from the docking station 804 to the host device 808 via a host device connector (e.g., the host device connectors 118, 218 described in relation to FIG. 1A and FIG. 2A above). The host device 808 may provide graphical data (and/or other data) via the host device connector and/or the wireless transceiver of the docking station 804 for communication to and use with the primary display apparatus 802 and/or any external objects (such as input and/or output devices) connected to the docking station 804.

The system 800 further includes the secondary display apparatus 810. The secondary display apparatus 810 may be connected to, for example, a connector (such as an external HDMI connector) of the docking station 804. Similarly to embodiments discussed above, communication of graphical data from the host device 808 to the secondary display apparatus 810 may be instead of, or in addition to, the communication of graphical data to the direct data connector of the primary display apparatus 802. In some embodiments, at least some of the power received at the docking station 804 from the external power source 806 may be communicated to the secondary display apparatus 810 connected to the docking station 804. This power may be used by the secondary display apparatus 810 to operate and/or for any other purpose for which the secondary display apparatus 810 may require power. This power may be provided from the docking station 804 to the host device 808 via an auxiliary power out connector (e.g., the auxiliary power out connectors 136, 236 described in relation to FIG. 1A and/or FIG. 2A above). These auxiliary power out connectors may be connected to a direct power in connector located at a docking station receptacle of the secondary display apparatus 810 or alternatively may be connected to an auxiliary power in connector of the secondary display apparatus 810 (that is not a direct power in connector of a docking station receptacle of the secondary display apparatus 810).

Figure 9:
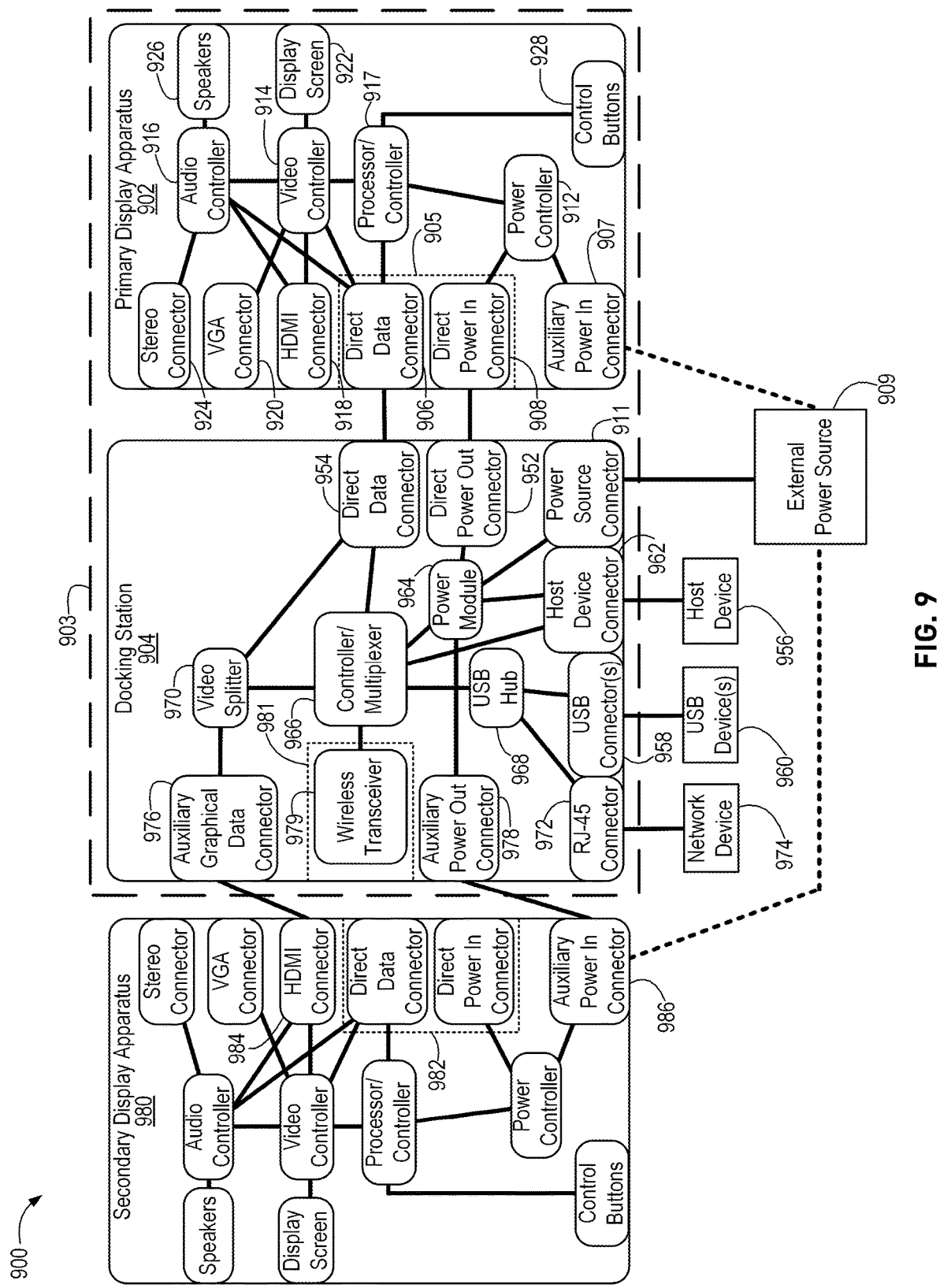
FIG. 9 is a block diagram of a system for docking with a host device, according to an embodiment.

FIG. 9 is a block diagram of a system 900 for docking with a host device 956, according to an embodiment. The system 900 includes a primary display apparatus 902, a docking station 904, and a secondary display apparatus 980. In the embodiment of FIG. 9, the docking station 904 may have been removably attached (as represented by box 903) to the primary display apparatus 902 at a docking station receptacle 905 of the primary display apparatus 902, in like manner to that described above in relation to, e.g., FIGS. 1A-1B, 2A-2B, 3A-3C, 5, 6, 7 and/or FIG. 8 (and this should be understood even though, merely for purposes of illustration, the docking station 904 has been drawn apart from, and similarly sized to, the display apparatuses 902 and 980).

The primary display apparatus 902 may include a direct data connector 906. The direct data connector 906 of the primary display apparatus 902 may be located in, for example, the docking station receptacle 905 of the primary display apparatus 902. The direct data connector 906 may be configured to interface with and communicate data to and/or from a direct data connector 954 of the docking station 904, in the manner described above. The direct data connector 906 of the primary display apparatus 902 and/or the direct data connector 954 of the docking station 904 may be, for example, HDMI connectors, USB connectors, or any other appropriate connectors as described above. The data received at the primary display apparatus 902 via the direct data connector 954 may be graphical and/or other data communicated by the docking station 904 from the host device 956.

The primary display apparatus 902 may include a direct power in connector 908. The direct power in connector 908 may be located in, for example, the docking station receptacle 905 of the primary display apparatus 902. The direct power in connector 908 may be configured to interface with and receive power from a direct power out connector 952 of the docking station 904. The direct power in connector 908 and the direct power out connector 952 may be, for example, DC connectors, USB-C connectors, or any other appropriate connector as explained above. The power received at the primary display apparatus 902 via the direct power in connector 908 may be used to operate the primary display apparatus 902.

The direct data connector 906 and the direct power in connector 908 may, in some embodiments, be combined into a single combined direct data/power in connector (e.g., the combined direct data/power in connector 312 of FIG. 3A) as described above. Further, the direct data connector 954 and the direct power out connector 952 may, in some embodiments, be combined into a single combined direct data/power out connector (e.g., the combined direct data/power out connector 332 of FIGS. 3A-3B) as described above.

The primary display apparatus 902 may also include a video controller 914. The video controller 914 may be able to receive graphical data from, for example, the direct data connector 906. Further, the video controller 914 may receive graphical data (either alternatively or additionally) from, for example, an HDMI connector 918 and/or a Video Graphics Array (VGA) connector 920 of the primary display apparatus 902 (which may not be located in the docking station receptacle 905 of the primary display apparatus 902). Other types of connectors (such as, e.g., DVI connectors) are also contemplated to provide graphical data to the video controller 914 instead of, or in addition to, the direct data connector 906 of the docking station receptacle 905. The video controller 914 may then select one or more of the graphical data received from the direct data connector 906, the HDMI connector 918, the VGA connector 920, and/or any other such connector for use to render a display on a display screen 922 of the primary display apparatus 902.

The primary display apparatus 902 may also include an audio controller 916. The audio controller 916 may be able to receive audio data from, for example, the direct data connector 906. Further, the audio controller 916 may receive audio data (either alternatively or additionally) from, for example, the HDMI connector 918 and/or a stereo connector 924 (which may not be located in the docking station receptacle 905 of the primary display apparatus 902). Other types of connectors (such as, e.g., optical audio connectors) are also contemplated to provide audio data to the audio controller 916 instead of or in addition to the direct data connector 906 of the docking station receptacle 905. The audio controller 916 may then select one or more of the audio data received from the direct data connector 906 of the docking station receptacle 905, the HDMI connector 918, and/or the stereo connector 924 for reproduction on speakers 926 of the primary display apparatus 902.

While the primary display apparatus 902 has been illustrated as being removably attached 903 with the docking station 904, it should be understood that the primary display apparatus 902 may be used to display data and perform other functions without being removably attached 903 to the docking station 904 via the use of one or more of, for example, the auxiliary power in connector 907, the HDMI connector 918 and/or the VGA connector 920, the stereo connector 924, and/or another connector(s) present on the primary display apparatus 902.

The primary display apparatus 902 may further include control buttons 928. The control buttons 928 may include a power button for turning the primary display apparatus 902 on and off. This may also turn on and off any docking station attached to the primary display apparatus 902 (e.g., the docking station 904) via signal(s) sent to the docking station 904 via the direct data connector 906. The control buttons 928 may include one or more volume buttons for adjusting the volume of the speakers 926 of the primary display apparatus 902. The control buttons 928 may further include a reset button to reset the primary display apparatus 902 (which may have the effect of resetting any docking station attached to the primary display apparatus 902 (e.g., the docking station 904) via signal(s) sent to the docking station via the direct data connector 906).

The primary display apparatus 902 may include a power controller 912. The power controller 912 may be responsible for distributing power to the rest of the primary display apparatus 902 in order to operate the primary display apparatus 902. This power may be received from, for example, the docking station 904 via the interface between the direct power out connector 952 of the docking station 904 and the direct power in connector 908 of the primary display apparatus 902, in the manner described above.

Alternatively, the power controller 912 may receive its power from an auxiliary power in connector 907. The auxiliary power in connector 907 may be capable of connecting to an external power source 909 to receive the power to operate the primary display apparatus 902. The external power source 909 may be, for example, a battery, a connection (whether direct or through intermediate device(s)) to a utility transformer, or any other appropriate external power source. The external power source 909 may include, for example, a DC connector, a USB (e.g., USB-C) connector, an IEC 420 C13 or C14 connector, or any other connector (including custom and/or hybrid connectors) capable of communicating power from the external power source 909 to another device. The auxiliary power in connector 907 may be any connector (including custom and/or hybrid connectors) capable of connecting to a connector on the external power source 909. A connection between the auxiliary power in connector 907 and the external power source 909 may be useful to provide power to the primary display apparatus 902 in cases where, for example, the docking station 904 is not attached to the primary display apparatus 902 or is otherwise not providing power to the primary display apparatus 902 at the direct power in connector 908 in the manner described above.

Any of the power controller 912, the video controller 914, and/or the audio controller 916, or another processor/controller 917 of the primary display apparatus 902 may have instructions thereon to implement one or more features of the primary display apparatus 902 consistent with embodiments of primary display apparatuses discussed herein. Such instructions may be sourced from a non-transitory computer-readable medium (not shown) on or associated with these processors and/or controllers.

As will be described in more detail below, the auxiliary power in connector of a display apparatus (such as the auxiliary power in connector 907) may alternatively receive power from an auxiliary power out connector of a docking station (such as an auxiliary power out connector 978 of the docking station 904).

The docking station 904 may include a power source connector 911. The power source connector 911 may receive power from the external power source 909. The power source connector 911 may be any connector (including custom and/or hybrid connectors) capable of connecting to a connector on the external power source 909. The power provided may be communicated to a power module 964 of the docking station 904 for distribution to the rest of the docking station 904 in order to operate the docking station 904. There may be sufficient remaining power for the docking station 904 to further communicate power to the primary display apparatus 902 via the direct power out connector 952 in the matter described herein. Additionally (or alternatively), there may be sufficient remaining power to be communicated to, for example, the host device 956 in the manner described herein. Additionally (or alternatively), there may be sufficient remaining power to be communicated to, for example, the auxiliary power out connector 978, in order to provide power to a secondary display apparatus (e.g., the secondary display apparatus 980) for it to operate. There may also be sufficient power remaining to communicate power (perhaps indirectly) to external objects connected to other connectors of the docking station 904 (e.g., USB device(s) 960 connected to USB connector(s) 958), or for any other purpose for which power may be used by the docking station 904.

The docking station 904 may further include a host device connector 962. The host device connector 962 may connect the docking station 904 to the host device 956. The host device connector 962 may communicate power from the power module 964 to the host device 956. The host device connector 962 may further transmit data to and/or from the host device 956 to and/or from a controller/multiplexer 966. The host device connector 962 may be, in some embodiments, a Thunderbolt™ 3/USB-C connector.

The docking station 904 may further include a wireless transceiver 979. This wireless transceiver 979 may communicate with a wireless transceiver of the host device 956. This interface may communicate data (e.g., graphical or other data) to and/or from the docking station 904 to and/or from the host device 956. This interface may use, for example, a Wi-Fi™ protocol, a Bluetooth™ protocol, or any other appropriate wireless protocol useable to transfer data in this fashion. The data may be provided additionally (or alternatively) to data being provided via the host device connector 962.

The wireless transceiver 979 may also be used by the docking station 904 to connect to other wireless network devices (e.g., a network device such as a router) in order to receive independent data (e.g., data not from the host device 956) from a network. This data may be used to operate the primary display apparatus 902 (e.g., used to power on and/or off the primary display apparatus 902, used to render a display on the display screen of 922 of the primary display apparatus 902 (such as, e.g., weather, news, or status of another device on the network)). This data may be, e.g., data received from an IoT system (such as, e.g., an IoT home automation system). It is further contemplated that this data may be used to display settings corresponding to one or more networked devices (e.g., an IoT device). It is also contemplated that the primary display apparatus 902 may be used to send commands to networked devices modifying these settings or performing other control tasks (e.g., via a control button 928 on the primary display apparatus 902, and/or via interaction with a display screen 922 of the primary display apparatus 902 that is a touch screen).

For example, the docking station 904 may receive an instruction via the wireless transceiver 979 to communicate with a control panel of the primary display apparatus 902 (which may be a software engine that exists in one or more of the power controller 912, the video controller 914, the audio controller 916, and/or another processor/controller 917 of the primary display apparatus 902). In this way, an administrator of the system 900 (through a separate network device in communication with the wireless transceiver 979) may have access to, e.g., information about the usage (power usage, time of use, time of day of usage statistics, etc.) of the primary display apparatus 902 (that is being tracked by, e.g., the control panel of the primary display apparatus). This communication with a control panel of the primary display apparatus 902 may also allow an administrator of the system 900 to set various control features (e.g., time allowed for use, time of day allowed for use, maximum allowed power use, etc.) to control the functionality of the primary display apparatus 902.

The controller/multiplexer 966 may receive power from the power module 964. The controller/multiplexer 966 may then communicate this power to, for example, a USB hub 968. The controller/multiplexer 966 may also send data (e.g., graphical data provided from the host device 956) to a video splitter 970. The controller/multiplexer 966 may also send and/or receive data (e.g., graphical data) to and/or from the host device connector 962, the USB hub 968, and/or the wireless transceiver 979 which may or may not be removeable 981 in the manner described herein. The controller/multiplexer 966 may be, in some embodiments, a Thunderbolt™ 3/USB-C controller/multiplexer.

The controller/multiplexer 966 or another processor/controller 917 of the docking station 904 may have instructions thereon to implement one or more other features of the docking station 904 consistent with embodiments of docking stations discussed herein. Such instructions may be sourced from a non-transitory computer-readable medium (not shown) on or associated with these processors and/or controllers.

The USB hub 968 may be connected to the USB connector(s) 958, and may be responsible for routing data and/or power between the USB connector(s) 958, an RJ-45 connector 972, and the controller/multiplexer 966. As described above, data at the USB connector(s) 958 may be provided by and/or sent to the USB device(s) 960. Further, power to the USB device(s) 960 may be provided by the USB hub 968. Data from the RJ-45 connector(s) 972 may be provided by a network device 974 connected to the RJ-45 connector 972.

The video splitter 970 may receive data (including graphical data) from the controller/multiplexer 966. This graphical data may have originated from, for example, the host device 956 in the manner described herein. The video splitter 970 may provide all or a portion of received graphical data to the direct data connector 954 of the docking station 904. This graphical data may be communicated, eventually, to the primary display apparatus 902 to be used to render a display on the display screen 922 in the manner described herein. The video splitter 970 may provide (alternatively or additionally) all or a portion of received graphical data to an auxiliary graphical data connector 976 of the docking station 904. From the auxiliary graphical data connector 976, that graphical data may then be communicated to the secondary display apparatus 980.

Although FIG. 9 has been illustrated with a primary display apparatus 902 and a secondary display apparatus 980, it is contemplated the more than two display apparatuses may be used at once with the docking station 904. Accordingly, it is contemplated that in some embodiments, the video splitter 970 of the docking station 904 may provide all or a portion of received graphical data to a plurality of auxiliary graphical data connectors (including the auxiliary graphical data connector 976). In these cases, each auxiliary graphical data connector beyond the auxiliary graphical data connector 976 may provide graphical data from the docking station 904 to other display apparatuses which are not illustrated.

The docking station 904 may further include the auxiliary power out connector 978. This auxiliary power out connector 978 may be an auxiliary power out connector according to FIGS. 1A and 2A. The auxiliary power out connector 978 may include, for example, a DC connector, a USB (e.g., USB-C) connector, an IEC 420 C13 or C14 connector, or any other connector (including custom and/or hybrid connectors) capable of communicating power from the auxiliary power out connector 978 to, for example, an auxiliary power in connector of a display apparatus (such as the auxiliary power in connector 986 of the secondary display apparatus 980). The auxiliary power out connector 978 may be able to connect to a display apparatus (e.g., the secondary display apparatus 980) in order to provide power to the display apparatus for the display apparatus to operate.

The secondary display apparatus 980 may contain the same (or similar) elements as provided in the primary display apparatus 902. However, in the system 900 of FIG. 9, the secondary display apparatus 980 is not attached to the docking station 904 at its docking station receptacle 982. (Note, as described above, that the docking station 904 is instead attached to the docking station receptacle 905 of the primary display apparatus 902.) Instead, the secondary display apparatus 980 receives data via an interface between the auxiliary graphical data connector 976 of the docking station 904 and, e.g., an HDMI connector 984 of the secondary display apparatus 980. Further, the secondary display apparatus 980 receives power via an interface between the auxiliary power out connector 978 of the docking station 904 and an auxiliary power in connector 986 of the secondary display apparatus 980. It is anticipated that in some embodiments, the secondary display apparatus 980 may instead be a display apparatus that does not include the docking station receptacle 982 (and, accordingly, does not include a direct data connector or a direct power in connector).

Alternatively, the auxiliary power in connector 986 of the secondary display apparatus 980 may receive power from an external power source rather than from the auxiliary power out connector 978 of the docking station 904. For example, the auxiliary power in connector 986 may receive power from the external power source 909. In these embodiments, the auxiliary power in connector 986 may be any connector (including custom and/or hybrid connectors) capable of connecting to a connector on the external power source 909. This may be useful to provide power to the secondary display apparatus 980 in cases where, for example, the auxiliary power out connector 978 of the docking station 904 is not available or is not otherwise providing power to the secondary display apparatus 980 via its auxiliary power out connector 978.

It is contemplated that in some embodiments, the functionalities of an auxiliary graphical data connector (such as the auxiliary graphical data connector 976) of the docking station 904 and the functionalities of the auxiliary power out connector 978 may be combined into a single connector (not shown). This connector may be a connector that is capable of providing both data and power from the docking station 904 to an external object (such as, e.g., a USB-C connector). Accordingly, it is contemplated that an external object (e.g., the secondary display apparatus 980) may include a single corresponding connector that is capable of receiving both data and power from the docking station 904 (such as, e.g., a USB-C connector) and by so doing perform both the functionalities of the auxiliary power in connector 986 and the data reception functionalities that are analogous to those that would occur using the HDMI connector 984 (or another data connector of the secondary display apparatus 980).

Figure 10:
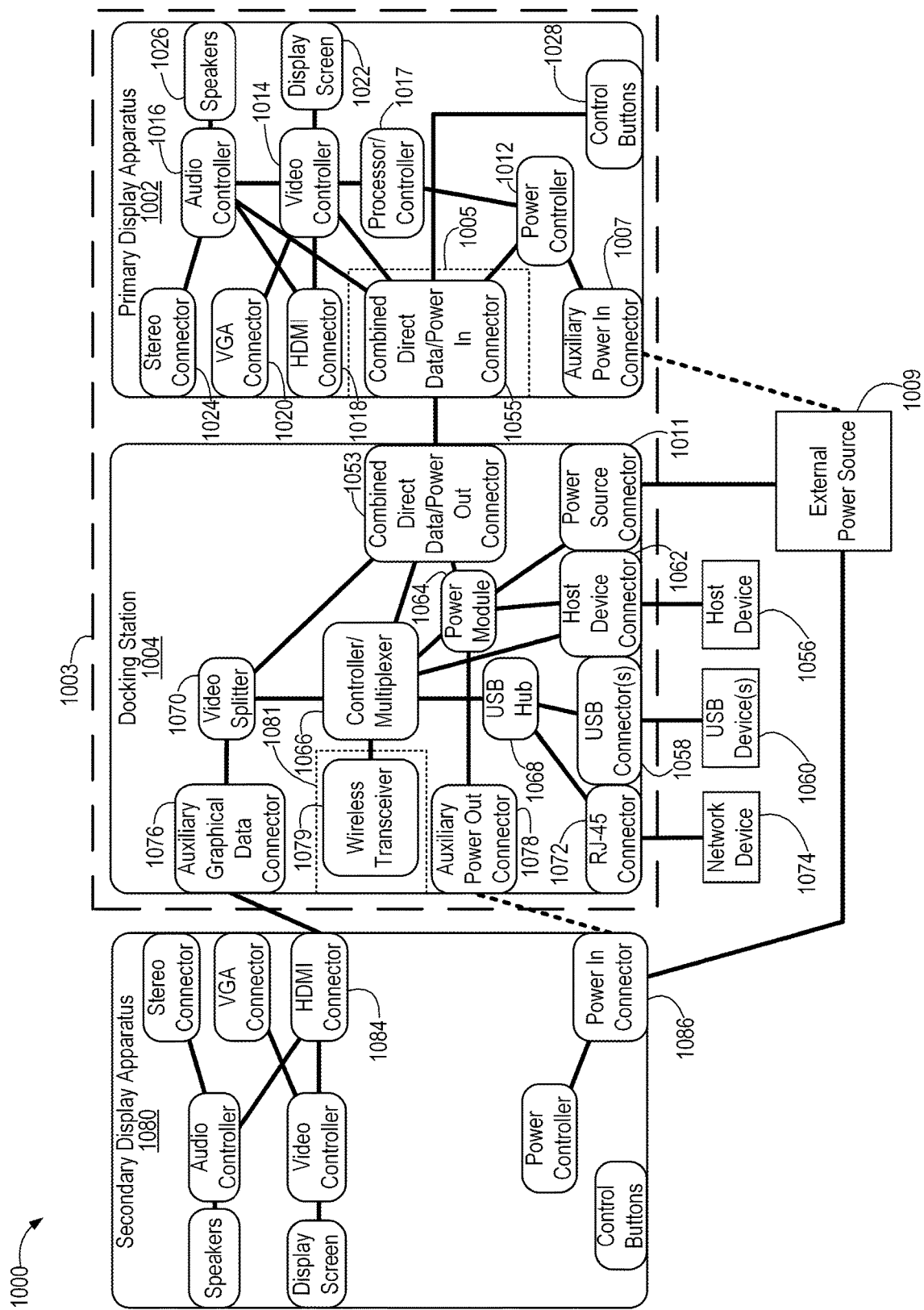
FIG. 10 is a block diagram of a system for docking with a host device, according to an embodiment.

FIG. 10 is a block diagram of a system 1000 for docking with a host device, according to an embodiment. Many of the numbered elements of the system 1000 are similar to like-numbered elements of the system 900. However, at least the following differences apply:

The docking station 1004 has been illustrated with a combined direct data/power out connector 1053 instead of, e.g., the direct data connector 954 and the direct power out connector 952 described in relation to FIG. 9. This combined direct data/power out connector 1053 may combine the features of the direct data connector 954 and the direct power out connector 952 of FIG. 9 together into a single connector. This combined direct data/power out connector 1053 may be analogous to the combined direct data/power out connector 332 of FIGS. 3A-3B.

The primary display apparatus 1002 has been illustrated with a combined direct data/power in connector 1055 instead of, e.g., the direct data connector 906 and the direct power in connector 908 of FIG. 9. This combined direct data/power in connector 1055 may combine the features of the direct data connector 906 and the direct power in connector 908 of FIG. 9 into a single connector. This combined direct data/power in connector 1055 may be analogous to the combined direct data/power in connector 312 of FIG. 3A.

While the primary display apparatus 1002 has been illustrated as being removably attached 1003 with the docking station 1004, it should be understood that the primary display apparatus 1002 may be used to display data and perform other functions without being removably attached 1003 to the docking station 1004 via the use of one or more of, for example, the auxiliary power in connector 1007, the HDMI connector 1018 and/or the VGA connector 1020, the stereo connector 1024, and/or another connector(s) present on the primary display apparatus.

The secondary display apparatus 1080 does not have a docking station receptacle analogous to the docking station receptacle 982 of the secondary display apparatus 980 of FIG. 9. This may be because the secondary display apparatus 1080 is not a display apparatus that was developed specifically for docking with docking station 1004 at a docking station receptacle (e.g., the secondary display apparatus 1080 was developed by a different manufacturer than the manufacturer of the docking station 1004, or secondary display apparatus 1080 was produced without the docking station receptacle to reduce costs of production).

The power in connector 1086 of the secondary display apparatus 1080 of FIG. 10 may be the only power in connector of the secondary display apparatus 1080 (and thus the power in connector 1086 is not termed an "auxiliary" power in connector). This power in connector 1086 is illustrated as being powered by the external power source 1009 instead of by, e.g., the auxiliary power out connector 1078 of the docking station 1004 (e.g., in the manner described in relation to the auxiliary power in connector 986 of FIG. 9). However, there may be some cases where the auxiliary power out connector 1078 of the docking station 1004 is still capable of providing power to the secondary display apparatus 1080 via the power in connector 1086 (e.g., when the secondary display apparatus 1080 is manufactured to be compatible with the auxiliary power out connector 1078 of the docking station 1004).

It is further contemplated that in some cases, a single connector (e.g., a USB-C connector) may perform the functionalities of the auxiliary graphical data connector 1076 and the auxiliary power out connector 1078, and this connector may interface (e.g., via a cable) with a corresponding single connector on the secondary display apparatus 1080, which may replace the uses of the HDMI connector 1084 and the power in connector 1086 illustrated in FIG. 10.

Figure 11:
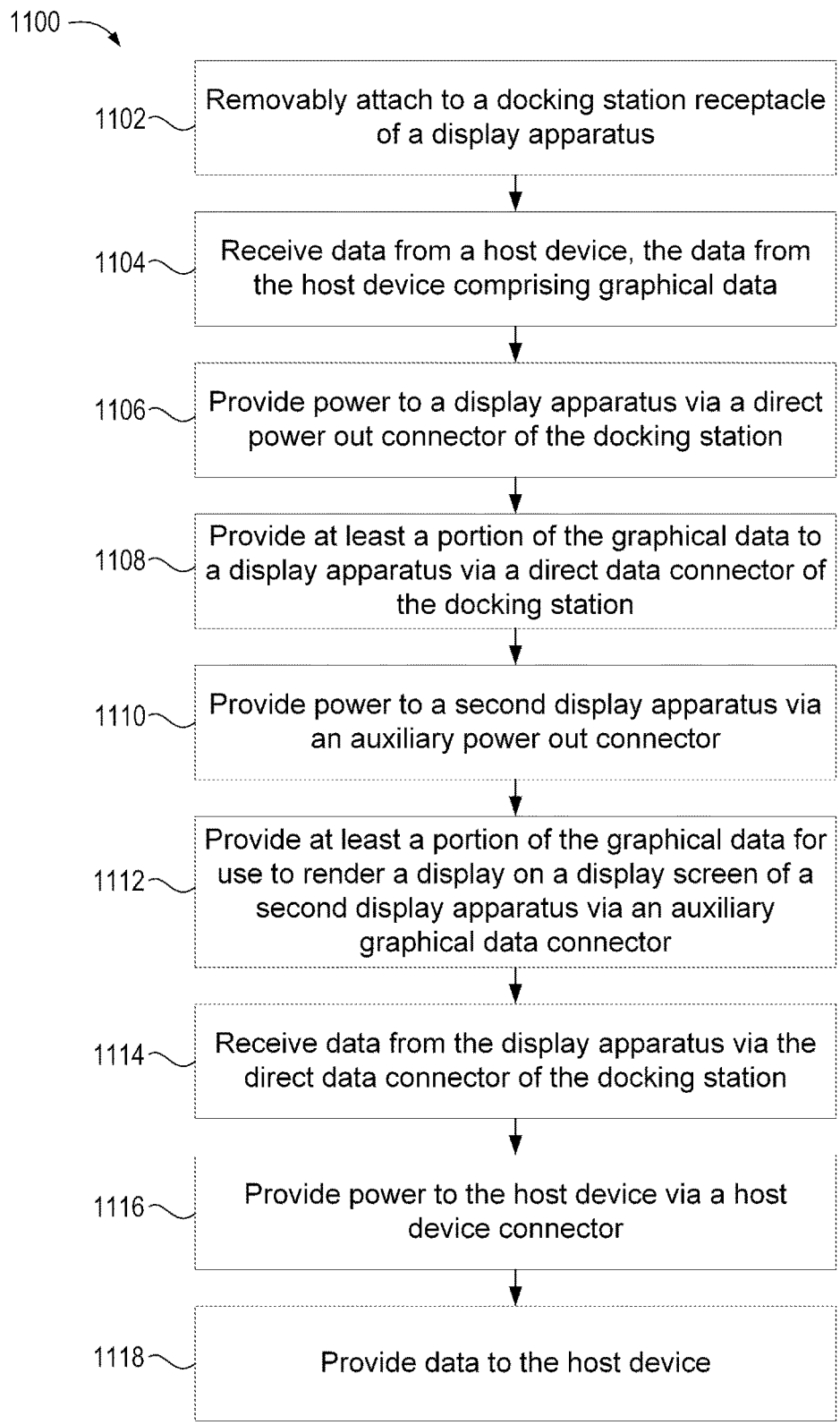
FIG. 11 illustrates a method of a docking station, according to an embodiment.

FIG. 11 illustrates a method 1100 of a docking station, according to one embodiment. The method 1100 may include more or less than other methods of docking stations contemplated by the present application.

The method 1100 may include removably attaching 1102 to a docking station receptacle of a display apparatus. The attachment of the docking station to the docking station receptacle may act to create a direct interface (without a separate cable) between a direct data connector of the docking station and a direct data connector of the display apparatus. This attachment may further act to create a direct interface (without a separate cable) between a direct power out connector of the docking station and a direct power in connector of the display apparatus.

The method 1100 further may include receiving 1104 data from a host device, the data from the host device comprising graphical data.

The method 1100 further may include providing 1106 power to a display apparatus via a direct power out connector of the docking station.

The method 1100 further may include providing 1108 at least a portion of the graphical data to the display apparatus via a direct data connector of the docking station.

The method 1100 further may include providing 1110 power to a second display apparatus via an auxiliary power out connector.

The method 1100 further may include providing 1112 at least a portion of the graphical data for use to render a display on a display screen of a second display apparatus via an auxiliary graphical data connector.

The method 1100 further may include receiving 1114 data from the display apparatus via the direct data connector of the docking station.

The method 1100 further may include providing 1116 power to the host device via a host device connector.

The method 1100 further may include providing 1118 data to the host device. This data may be provided via a host device connector and/or via a wireless transceiver of the docking station.

Figure 12:
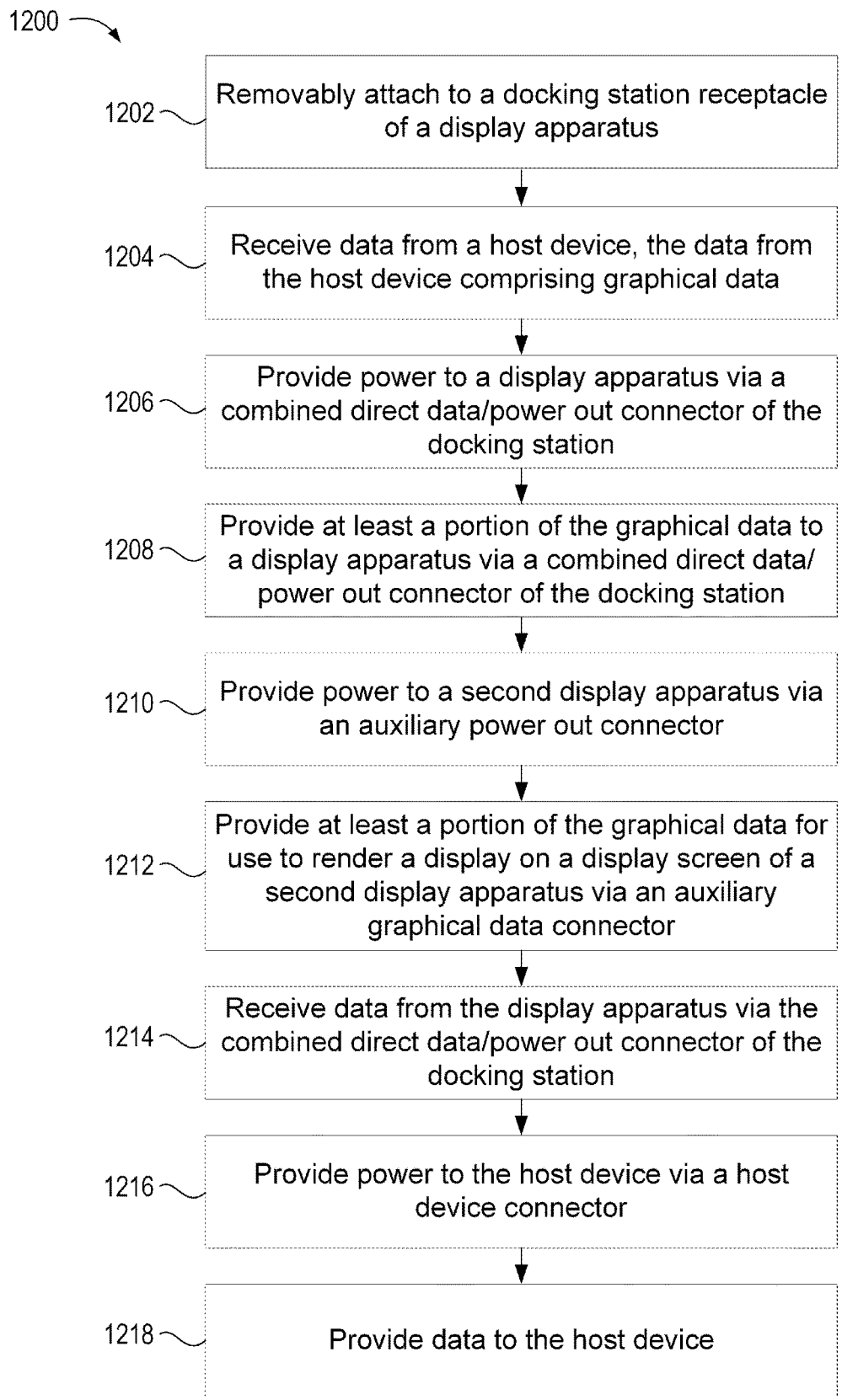
FIG. 12 illustrates a method of a docking station, according to an embodiment.

FIG. 12 illustrates a method 1200 of a docking station, according to one embodiment. The method 1200 may include more or less than other methods of docking stations contemplated by the present application.

The method 1200 may include removably attaching 1202 to a docking station receptacle of a display apparatus. The attachment of the docking station to the docking station receptacle may act to create a direct interface (without a separate cable) between a combined direct data/power out connector of the docking station and a combined direct data/power in connector of the display apparatus.

The method 1200 may include receiving 1204 data from a host device, the data from the host device comprising graphical data.

The method 1200 further may include providing 1206 power to a display apparatus via a combined direct data/power out connector of the docking station.

The method 1200 further may include providing 1208 at least a portion of the graphical data to the display apparatus via the combined direct data/power out connector of the docking station.

The method 1200 further may include providing 1210 power to a second display apparatus via an auxiliary power out connector.

The method 1200 further may include providing 1212 at least a portion of the graphical data for use to render a display on a display screen of a second display apparatus via an auxiliary graphical data connector.

The method 1200 further may include receiving 1214 data from the display apparatus via the combined direct data/power out connector of the docking station.

The method 1200 further may include providing 1216 power to the host device via a host device connector.

The method 1200 further may include providing 1218 data to the host device. This data may be provided via a host device connector and/or via a wireless transceiver of the docking station.

Figure 13:
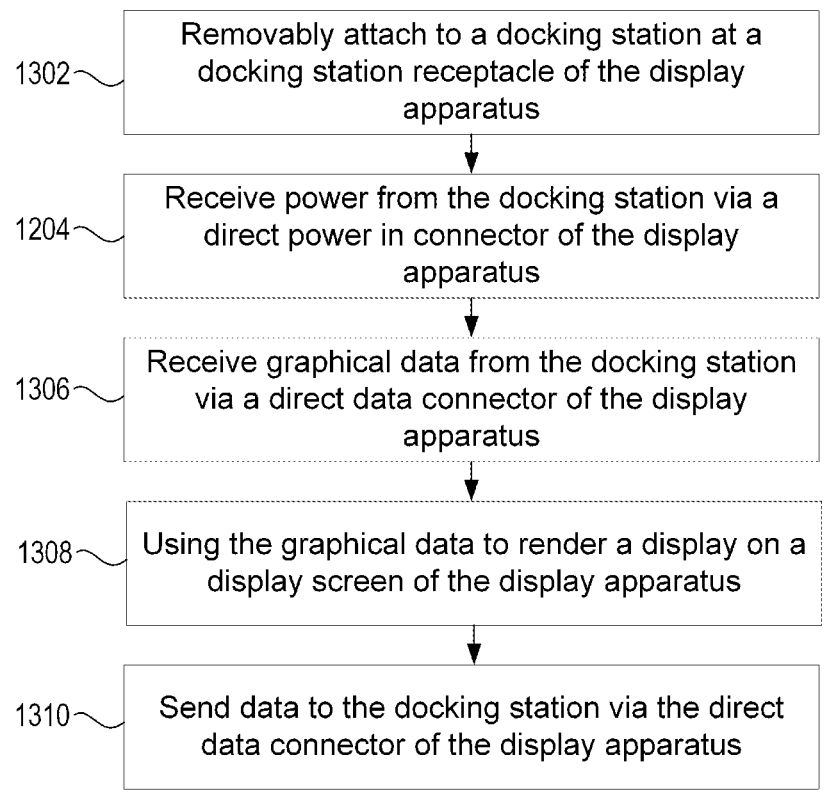
FIG. 13 illustrates a method of a display apparatus, according to an embodiment

FIG. 13 illustrates a method 1300 of a display apparatus, according to an embodiment. The method 1300 may include more or less than other methods of display apparatuses contemplated by the present application.

The method 1300 may include removably attaching 1302 to a docking station at a docking station receptacle of the display apparatus. The attachment of the display apparatus to the docking station at the docking station receptacle may act to create a direct interface (without a separate cable) between a direct data connector of the docking station and a direct data connector of the display apparatus. This attachment may further act to create a direct interface (without a separate cable) between a direct power out connector of the docking station and a direct power in connector of the display apparatus.

The method 1300 may include receiving 1304 power from the docking station via a direct power in connector of the display apparatus.

The method 1300 further may include receiving 1306 graphical data from the docking station via a direct data connector of the display apparatus The method 1300 further may include using 1308 the graphical data to render a display on a display screen of the display apparatus.

The method 1300 further may include sending 1310 data to the docking station via the direct data connector of the display apparatus.

Figure 14:
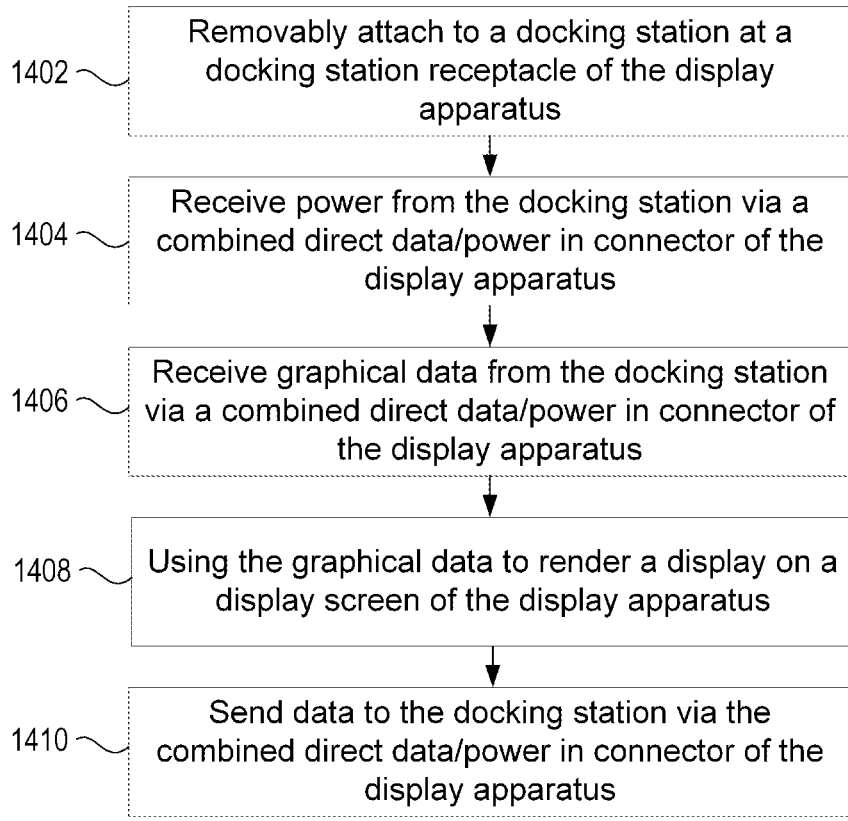
FIG. 14 illustrates a method of a display apparatus, according to an embodiment.

FIG. 14 illustrates a method 1400 of a display apparatus, according to an embodiment. The method 1400 may include more or less than other methods of display apparatuses contemplated by the present application.

The method 1400 may include removably attaching 1402 to a docking station at a docking station receptacle of the display apparatus. The attachment of the display apparatus to the docking station at the docking station receptacle may act to create a direct interface (without a separate cable) between a combined direct data/power out connector of the docking station and a combined direct data/power in connector of the display apparatus.

The method 1400 may include receiving 1404 power from the docking station via a combined direct data/power in connector of the display apparatus.

The method 1400 further may include receiving 1406 graphical data from the docking station via the combined direct data/power in connector of the display apparatus.

The method 1400 further may include using 1408 the graphical data to render a display on a display screen of the display apparatus.

The method 1400 further may include sending 1410 data to the docking station via the combined direct data/power in connector of the display apparatus.

Docking Stand Assemblies with Docking Station Receptacles

Improvements to electronics design and manufacturing techniques over time have allowed for increasingly powerful electronics to be incorporated into a portable form factor. A portable electronic device (PED) in many cases incorporates a screen that facilitates a user's interaction with the PED by displaying data related to the workings of the device to the user. In many cases, the screen may be a touchscreen, which allows the screen to furthermore function as an input device for the user to use to issue instructions to the electronic device. These devices have the advantage of being able to be easily moved from one location to another. A PED may be a smartphone, a tablet computer, a laptop computer, a 2-in-1 computer, or any other portable electronic device.

Disclosure herein relates to embodiments of a docking stand assembly configured to receive a PED. In some embodiments, the docking stand assembly may be configured to receive the PED directly. In other embodiments, the docking stand assembly may instead be configured to receive a PED assembly that comprises the PED disposed within a case encasing the PED.

In either instance, the PED is removably attachable to the docking stand assembly. Because the PED is removably attached to the docking stand assembly, a user of the electronic device has the option to use the PED in a portable mode, or in a non-portable stand mode, and can select between the two modes simply by removing the PED from the docking stand assembly or placing the PED back within the docking stand assembly. This allows the user to (alternately) enjoy benefits stemming from the portable mode and the non-portable mode.

As will be described below, a docking stand assembly may also include a docking station receptacle for the receipt of a docking station to be used in conjunction with a PED device that has been received in the docking stand assembly.

Figure 15:
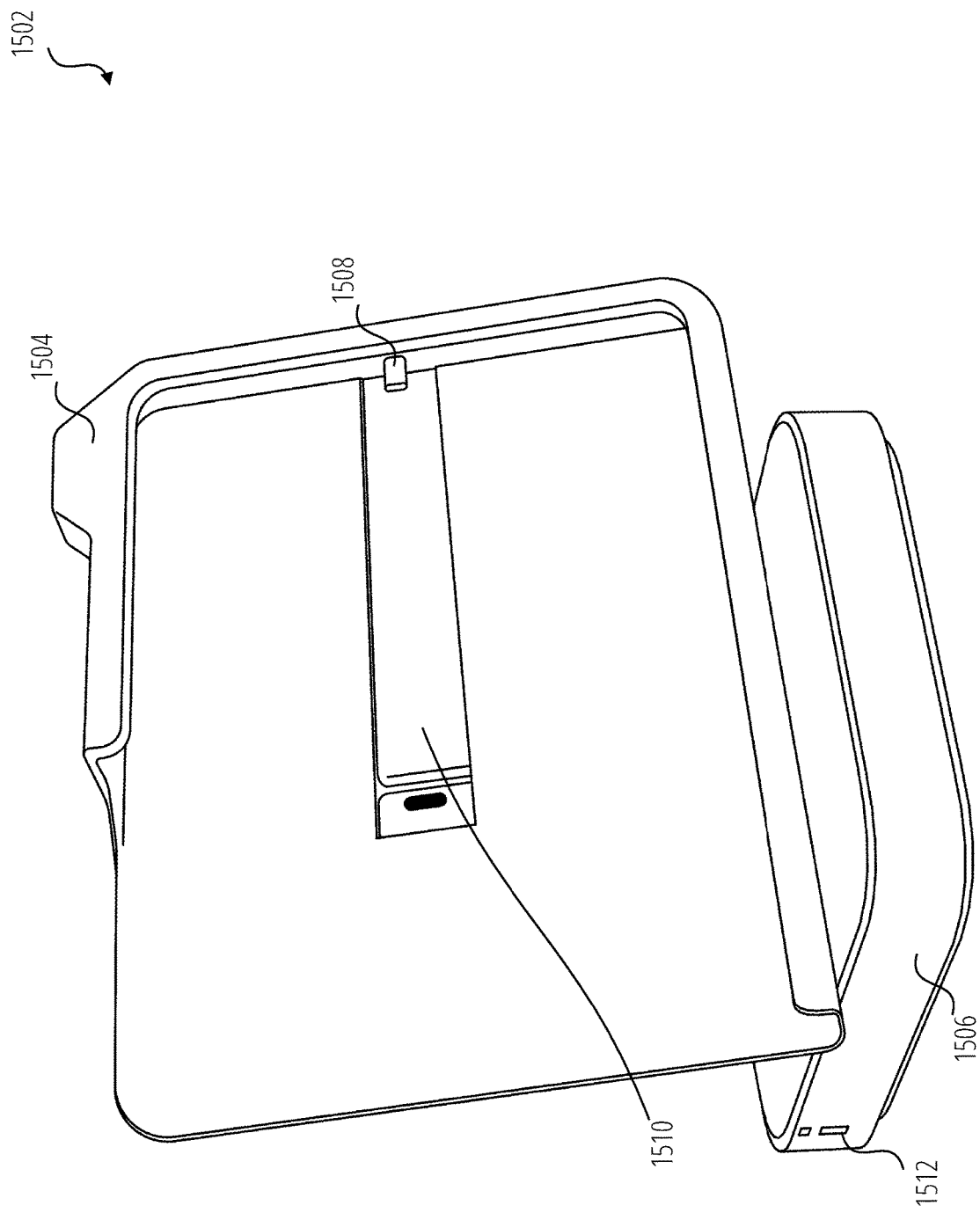
FIG. 15 illustrates a front perspective view of a docking stand assembly according to an embodiment.

FIG. 15 illustrates a front perspective view of a docking stand assembly 1502 according to an embodiment. The docking stand assembly 1502 includes the docking tray 1504, the base 1506, and a support member (not visible in FIG. 15) between the docking tray 1504 and the base 1506.

The docking tray 1504 may further include a connector 1508 configured to removably couple with a connector of a PED once the PED has been placed within the docking tray 1504. The connection of the PED with the connector 1508 may enable a power and/or data connection with the PED that has been received in the docking tray 1504, as will be discussed in further detail below. Accordingly, in embodiments herein, each of the connector 1508 and the connector of the PED may be a combined power/data connector. The connector 1508 may be a USB (e.g., USB-C) connector, a lightning connector, or any other physical connector capable of power and/or data communication to and/or from the PED. The connector 1508 may be positioned within the docking tray 1504 such that it interfaces with the connector of the PED when the PED is inserted into the docking tray 1504 (perhaps as encased in a case made for the PED, where the case has further been designed for interaction with the docking tray 1504 of the docking stand assembly 1502).

The docking tray 1504 may further include a removable access 1510. The removable access 1510 may lift away from the docking tray 1504 in order to provide access to one or more attachment devices securing the docking tray 1504 to the support member (not shown) of the docking stand assembly 1502. These attachment devices may be, for example, screws. Once access is gained to the one or more attachment devices, they may be disengaged to allow the docking tray 1504 to come away from the support member. This removability may allow for the docking tray 1504 to be replaced by a second docking tray. This second docking tray may be configured for use with a different PED than the PED for which the docking tray 1504 is used (e.g., is of a different size, different placement of the connector 1508, and/or has a connector that is of a different type than the connector 1508).

The base 1506 of the docking tray 1504 may include the lock slot 1512. The lock slot 1512 may be configured to interface with a device lock so that a user may secure the docking stand assembly 1502 via the device lock.

Figure 16:
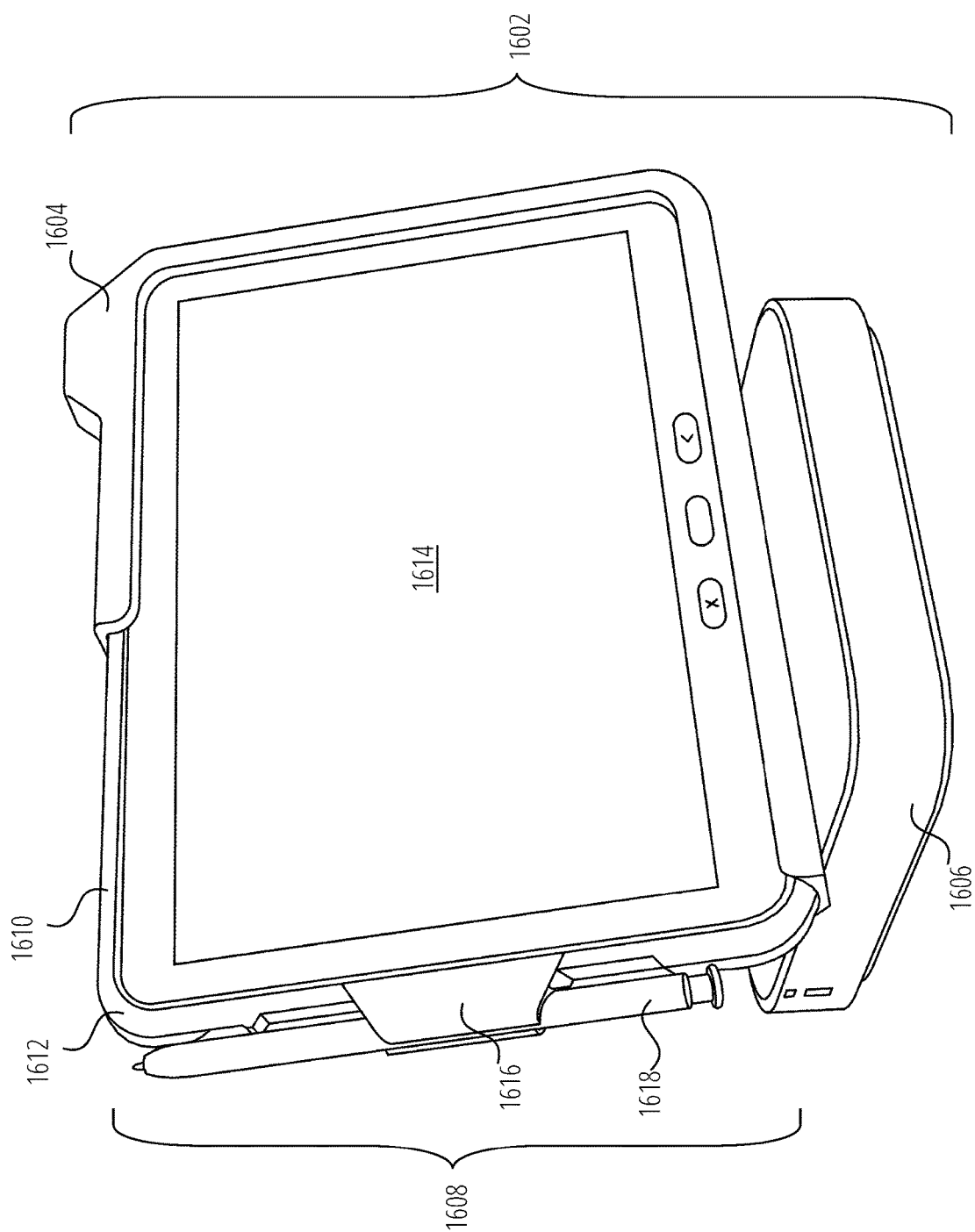
FIG. 16 illustrates a front perspective view of a docking stand assembly with a docking tray that has received a PED assembly, according to an embodiment.

FIG. 16 illustrates a front perspective view of a docking stand assembly 1602 with a docking tray 1604 that has received a PED assembly 1608, according to an embodiment. Like the docking stand assembly 1502 of FIG. 15, the docking stand assembly 1602 includes a docking tray 1604, a base 1606, and a support member (not shown). Further, the docking stand assembly 1602 has received a PED, in that the PED assembly 1608 comprising a PED 1610 (in this instance, a tablet computer) and a case 1612 has been inserted into the docking tray 1604.

The case 1612 of the PED assembly 1608, when used with the docking tray 1604, positions the PED 1610 of the PED assembly 1608 appropriately for use with the docking tray 1604 of the docking stand assembly 1602. This may mean that the PED 1610 is positioned such that, for example, a screen 1614 of the PED is fully (or at least substantially) accessible when the PED assembly 1608 is placed within the docking tray 1604. Further, it may mean that the PED 1610 is positioned such that a connector of the PED 1610 aligns with a connector of the docking tray 1604 (not shown, but as in, e.g., the connector 1508 of FIG. 15) when the PED assembly 1608 is placed within the docking tray 1604.

The case 1612 may include further features for convenience, such as the clamp mechanism 1616 useful for holding the stylus 1618, so that the user of the docking stand assembly 1602 has easy access to the stylus 1618.

While the case 1612 has been illustrated as working with a PED 1610 that is a tablet computer of a first type, it is contemplated that another case may work similarly within the docking tray 1604 of the docking stand assembly 1602, with this second case configured to encase a second type of PED (such as a second type of tablet computer). In other words, a different type of PED may be used with the docking tray 1604 of the docking stand assembly 1602 simply by swapping out the case 1612 with a second case meant to be used the new PED and with the docking tray 1604 of the docking stand assembly 1602.

It is also contemplated that docking stand assemblies may include docking trays that are shaped and configured to receive a PED that is not encased in a case, and to provide for alignment between/proper positioning of a connector of the PED and a connector of the docking tray in such instances.

Figure 17:
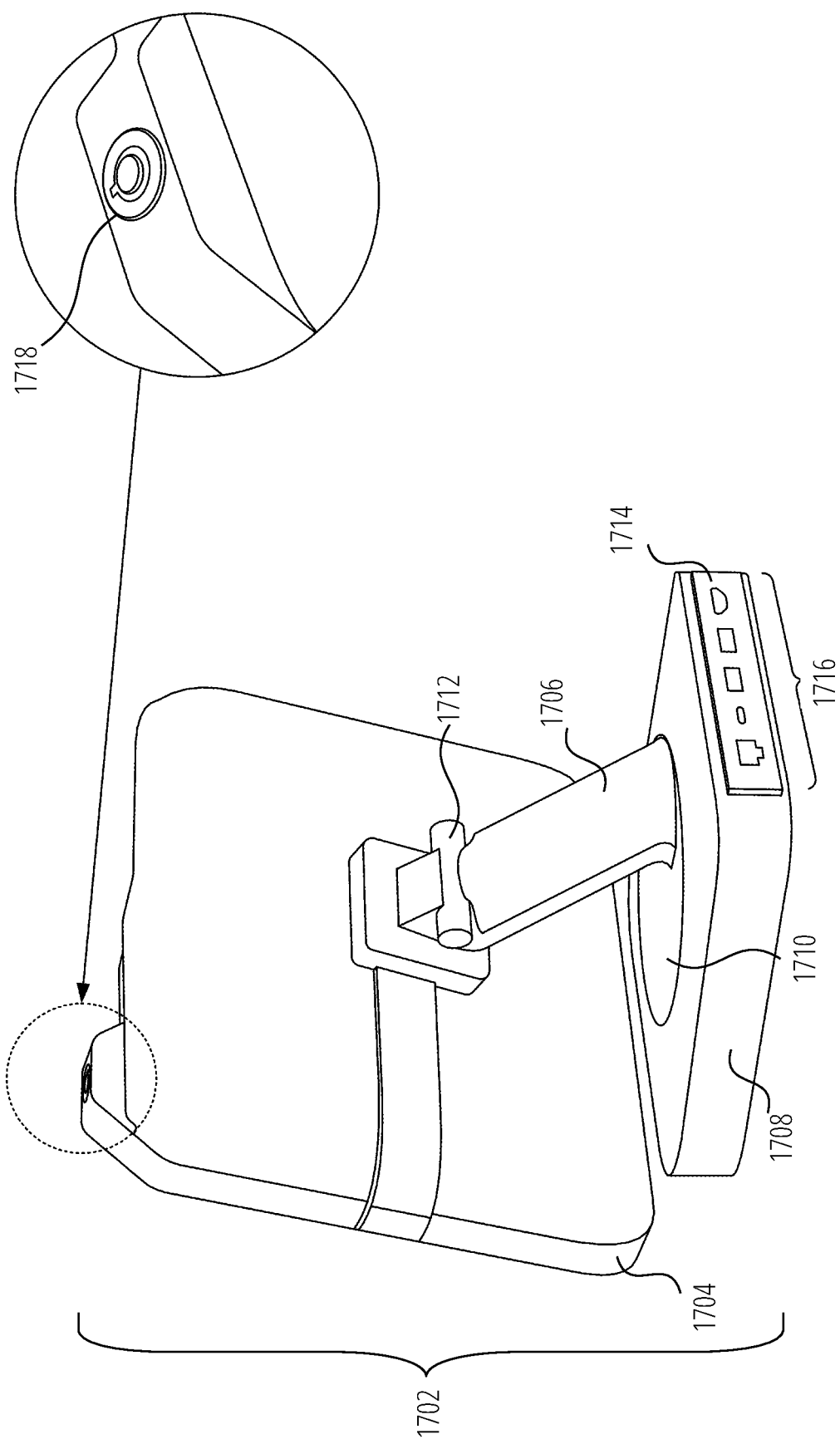
FIG. 17 illustrates a rear perspective view of a docking stand assembly, according to an embodiment.

FIG. 17 illustrates a rear perspective view of a docking stand assembly 1702, according to an embodiment. The docking stand assembly 1702 includes a docking tray 1704, a support member 1706, and a base 1708. The support member 1706 of the docking stand assembly 1702 may include a hinge 1712, which may allow the docking tray 1704 to tilt relative to the base 1708. The support member 1706 of the docking stand assembly 1702 is mounted to the top of the base 1708 via a turntable 1710, which allows the support member 1706 (and, accordingly, the docking tray 1704) to rotate about the top of the base 1708.

The base 1708 includes a docking station receptacle 1716 that is configured to receive a docking station such as the docking station 1714. A connector (not shown) may be disposed within the docking station receptacle 1716. This connector may removably couple or interface with a connector of the docking station 1714 to connect to the docking station 1714. This connector of the docking station receptacle 1716 may be connected to a power and data delivery pathway (not shown) that runs between the connector of the docking station receptacle 1716 and up through the base 1708, the support member 1706, and the docking tray 1704 to the connector of the docking tray 1704 (e.g., the connector 1508 of FIG. 15). Accordingly, these connectors and the power and delivery pathway between them may provide power and data communication between the docking station 1714 and a PED that has been placed in the docking tray 1704 of the docking stand assembly 1702. This permits the PED to communicate not only with the docking station 1714, but also with any external objects that may be connected to the one or more connectors of the docking station 1714.

The docking station 1714 may be optionally inserted into and/or removed from into the docking stand assembly 1702. The docking stand assembly 1702 may be compatible with multiple types of docking station (of which the docking station 1714 is one), each of which may optionally be inserted into the docking station receptacle 1716 of the docking stand assembly 1702. The various docking stations may provide different types and/or amounts of connectors and features, giving the docking station 1714 flexibility to adapt to various use cases and/or to be adapted to the specific needs of a larger device ecosystem.

The docking tray 1704 may include a lock 1718. The lock 1718 may be configured to removably interlock with a case of a PED that has been inserted into the docking tray 1704, securing the PED within the docking tray 1704. While the lock 1718 has been illustrated as a barrel keyhole to be locked and unlocked using a barrel key, other types of locks and keys are contemplated. Further, it is contemplated that the lock 1718 may be substituted for a keyless lock (such as a combination lock that releases the interlock between the docking tray 1704 and the case after a proper combination is entered).

Figure 18:
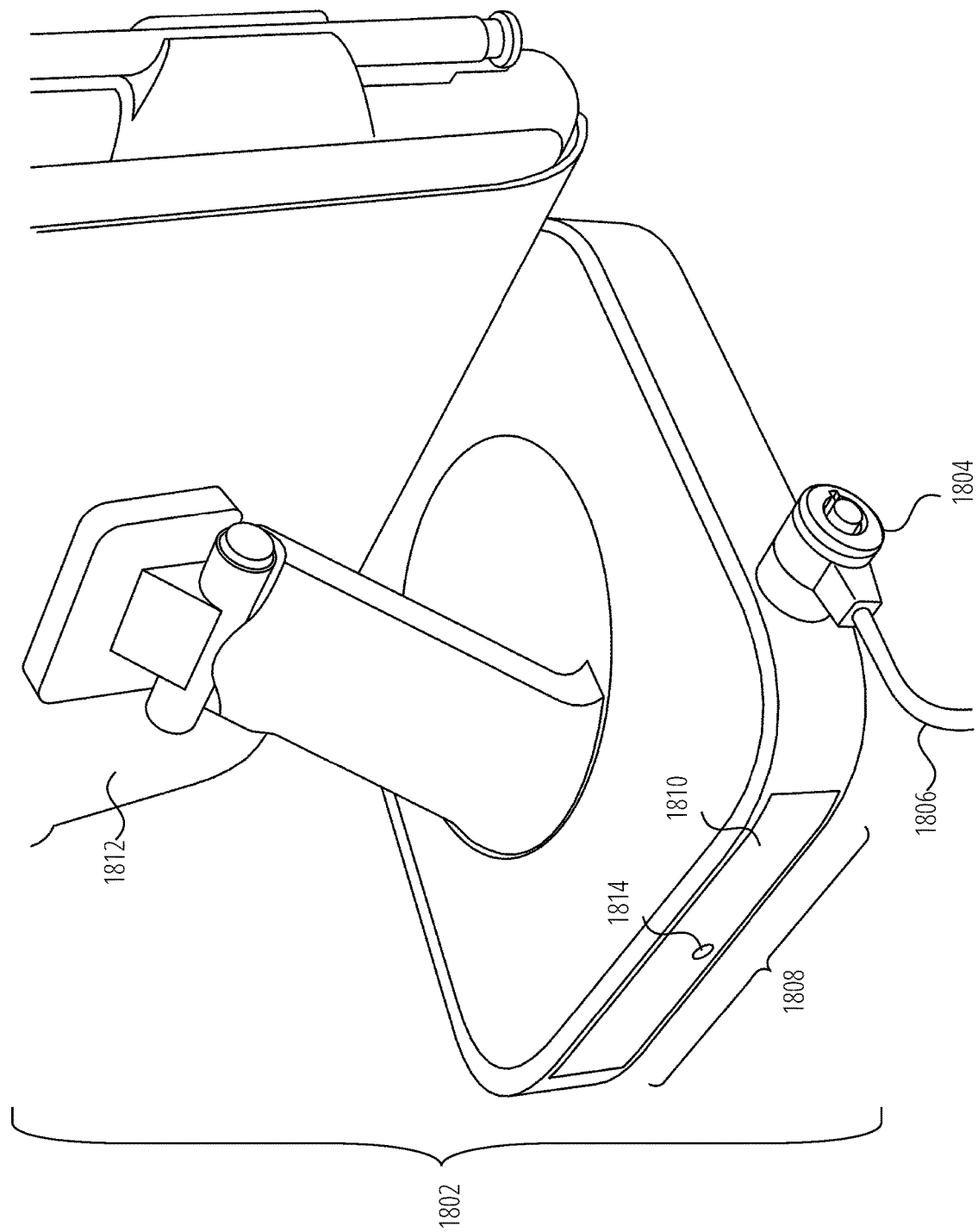
FIG. 18 illustrates a rear perspective view of a docking stand assembly, according to an embodiment.
Figure 19:
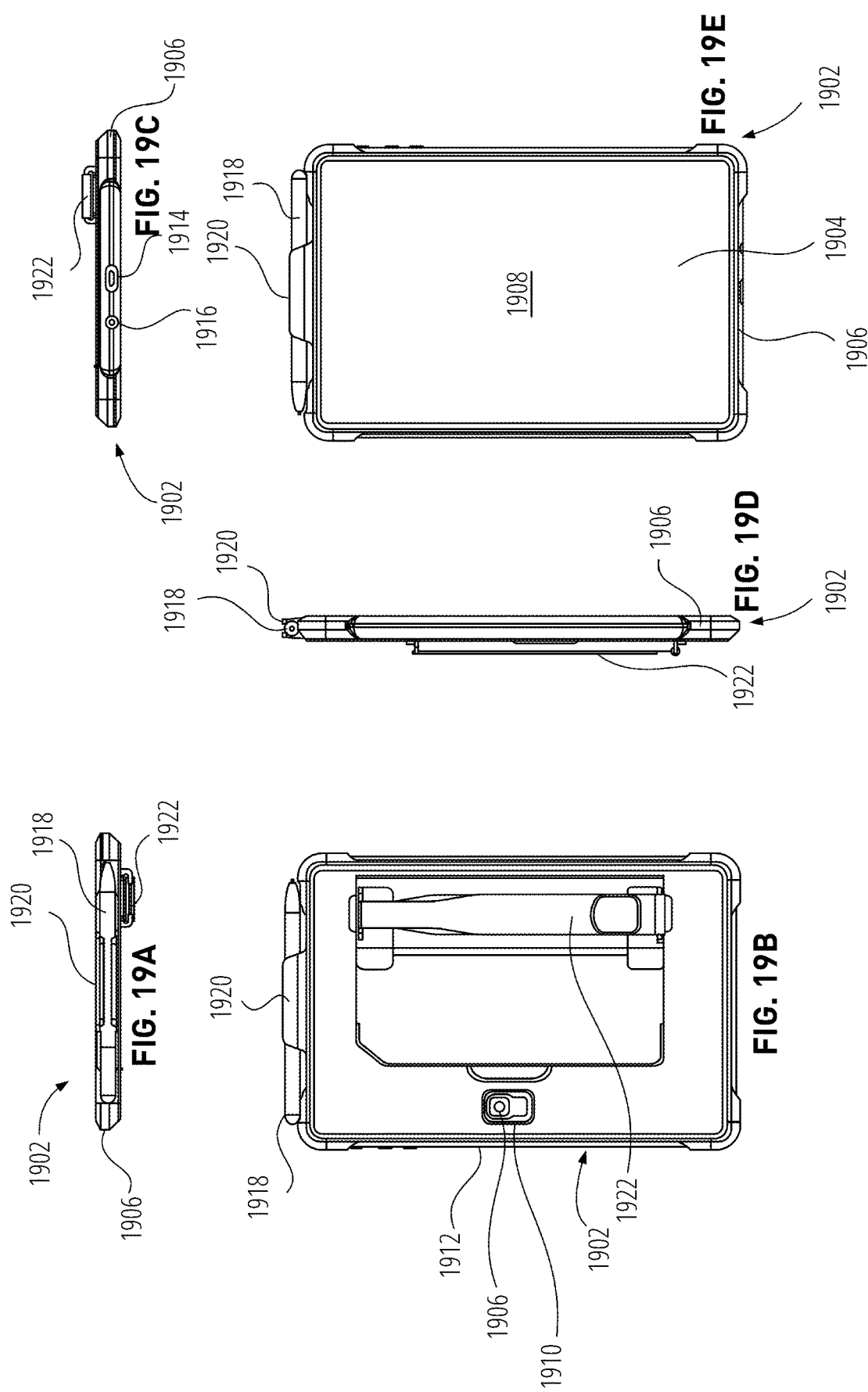
FIGS. 19A-19E illustrate various perspective views of a PED assembly for use with a docking stand assembly, according to various embodiments.

FIG. 18 illustrates a rear perspective view of a docking stand assembly 1802, according to an embodiment. As illustrated, the docking stand assembly 1802 has been shown as secured by attaching a device lock 1804 to a lock slot (covered by the device lock 1804 in FIG. 18) of the docking stand assembly 1802 and subsequently securing the security cable 1806 of the device lock 1804 to something immobile.

In the embodiment of FIG. 18, a docking station receptacle 1808 of the docking stand assembly 1802 is not being used with a docking station. Instead, the dust flap 1810 sits across the face of the docking station receptacle 1808 to keep foreign objects from entering the docking station receptacle 1808. The dust flap 1810 may be a hinged flap that folds back into the docking station receptacle 1808 upon insertion of a docking station, or it may be entirely removable from the face of the docking station receptacle 1808. The dust flap 1810 further includes an access hole 1814 through which a cable may be run for purposes of attaching to a connector within the docking station receptacle 1808 (not shown). This may allow for a device that is external to the docking stand assembly 1802 (e.g., a docking station that has not been placed in the docking station receptacle 1808) to interface with the connector of the docking station receptacle 1808 via the cable and thus permit communication with a PED that has been placed in a docking tray 1812 of the docking stand assembly 1802 via a power and data delivery pathway of the docking stand assembly 1802.

FIGS. 19A-19E illustrate various perspective views of a PED assembly 1902 for use with a docking stand assembly, according to various embodiments. The PED assembly 1902 may include a PED 1904 and a case 1906. The case 1906 may incorporate various apertures allowing for immediate physical access to a connector or other device integrated into the PED 1904, including, for example, a screen aperture 1908 for a display of the PED 1904, a camera aperture 1910 for a camera 1912 of the PED 1904, a combined power/data connector aperture 1914 for a combined power/data connector of the PED 1610, and an audio connector aperture 1916 for an audio connector of the PED 1904. Other apertures for, e.g., a button, a speaker, a microphone, a power connector, an audio connector, a video connector, a data connector, or some other element or connector are also contemplated.

The PED assembly 1902 may also hold, e.g., a stylus 1918 at the side of the PED assembly 1902 in a removable fashion. The stylus 1918 may be held in place using a clamp mechanism 1920 included in the case 1906 of the PED assembly 1902, or in another way (e.g., via a magnet in either or both of the case 1906 or the PED 1904 of the PED assembly 1902).

The PED assembly 1902 may incorporate other features. For example, the case 1906 of the PED assembly 1902 may incorporate a handle 1922 which allows the PED assembly 1902 to be securely held and moved when it is not docked in a tray of a docking stand assembly. The handle 1922 may optionally extend outward from the case 1906 of the PED assembly 1902 in a manner such that a user using the PED assembly 1902 when it is not attached to, for example, a docking tray of a docking stand assembly can slide part of a hand under the handle 1922 in order to keep the PED assembly 1902 secure while moving it about. This handle 1922 may further optionally collapse into the case 1906 of the PED assembly 1902 such that it sits flush with, or even within, the case 1906 of the PED assembly 1902. Collapsing the handle 1922 in this fashion may permit the PED assembly 1902 to fit properly within, e.g., a docking tray of a docking stand assembly.

Figure 20:
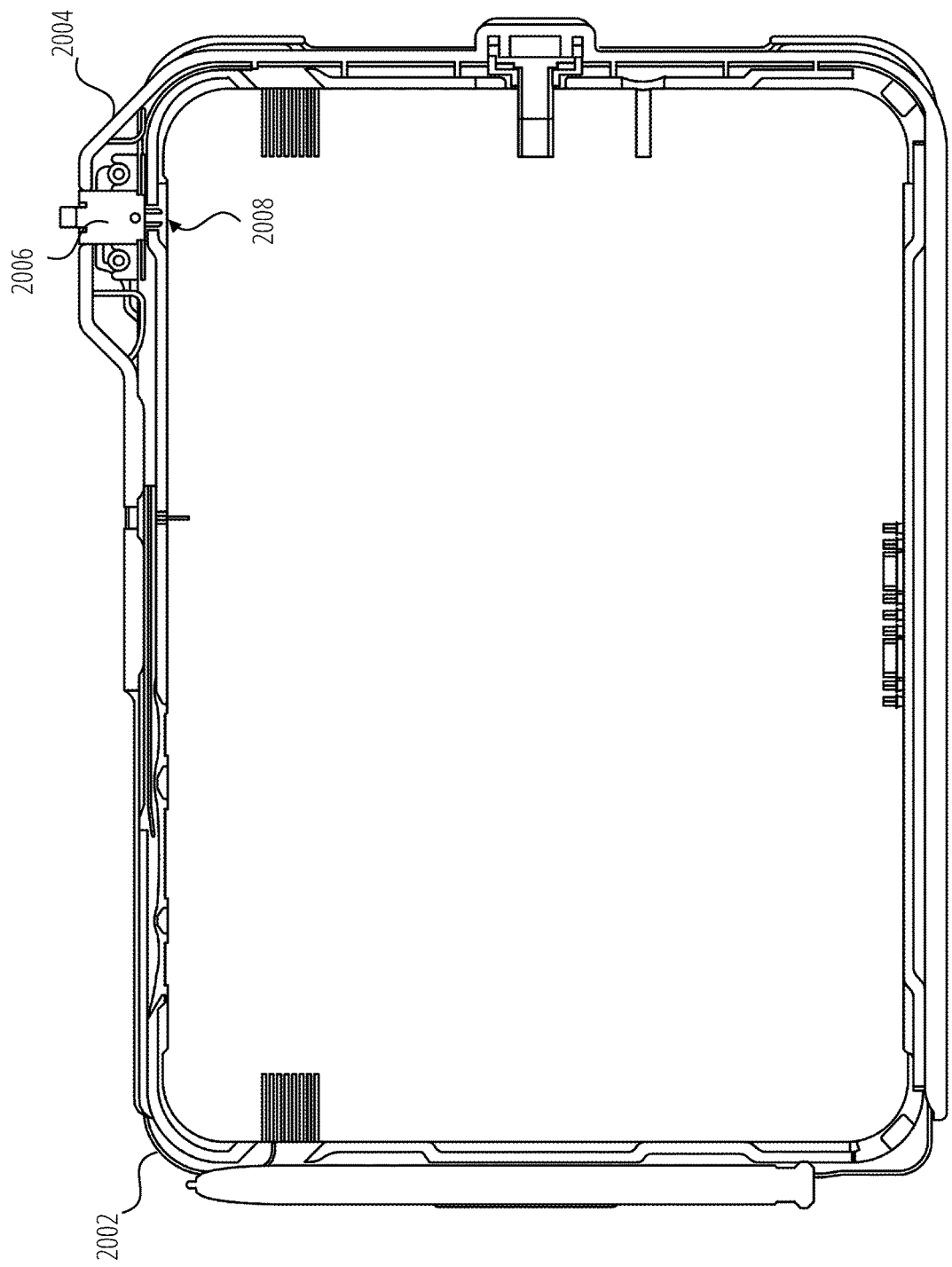
FIG. 20 illustrates a front view of a cross-section of a case for a PED of a PED assembly, as such case has been inserted into a docking tray, according to an embodiment.

FIG. 20 illustrates a front view of a cross-section of a case 2002 for a PED of a PED assembly as such case 2002 has been inserted into a docking tray 2004, according to an embodiment. The docking tray 2004 includes a lock 2006, which has (removably) interlocked with the case 2002 via the extension of the prongs 2008, thereby securing the case 2002 within the docking tray 2004. When a user actuates the lock 2006, the prongs 2008 retract, thereby allowing for the release of the case 2002 from the docking tray 2004.

Figure 21:
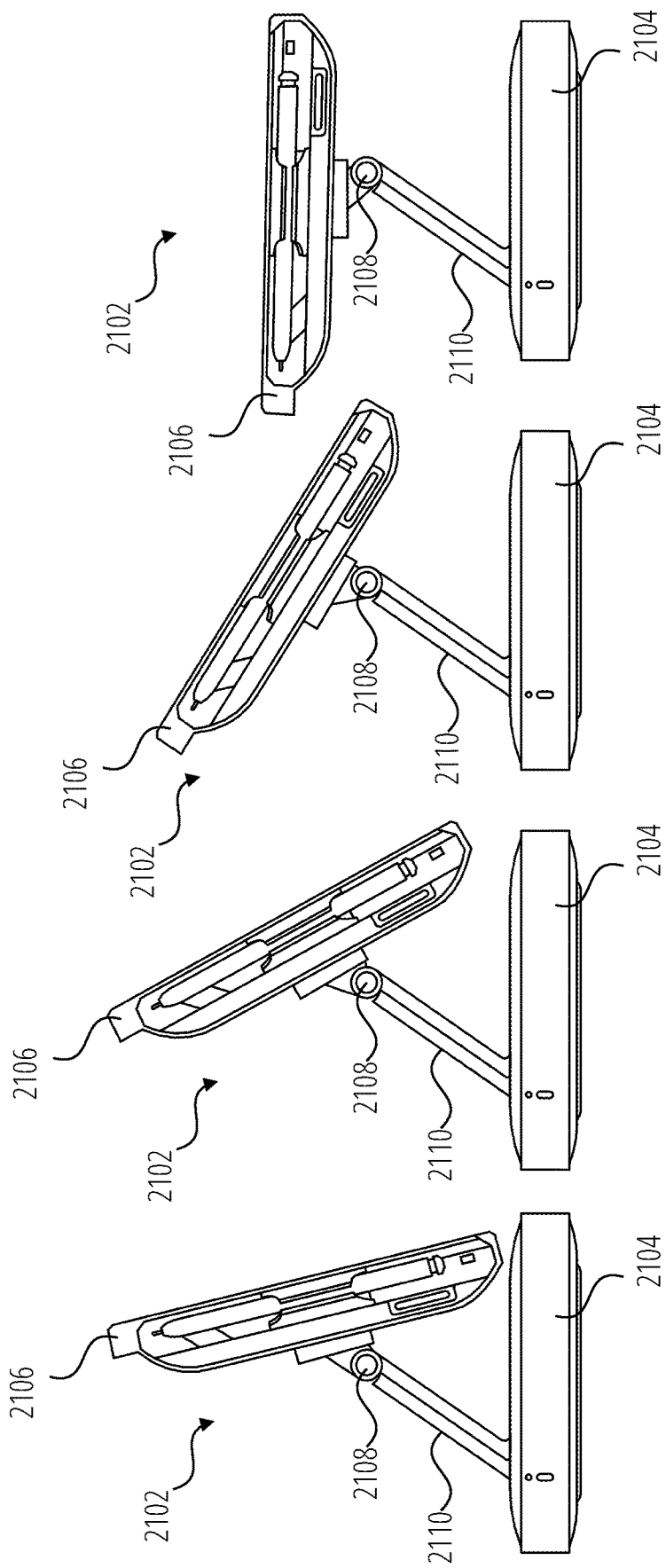
FIG. 21 illustrates various side views of a docking station apparatus, according to an embodiment.

FIG. 21 illustrates various side views of a docking stand assembly 2102, according to an embodiment. As illustrated, a hinge 2108 is located in a support member 2110 between a base 2104 and a docking tray 2106. The hinge 2108 allows for the docking tray 2106 to be tilted relative to the base 2104 at angles including (but not limited to) those illustrated here. It is contemplated that the hinge 2108 may allow for a full range of motion around an axis of the hinge that is limited only by the interaction of either the top or the bottom of the docking tray 2106 with the base 2104 and/or the support member 2110.

Figure 22:
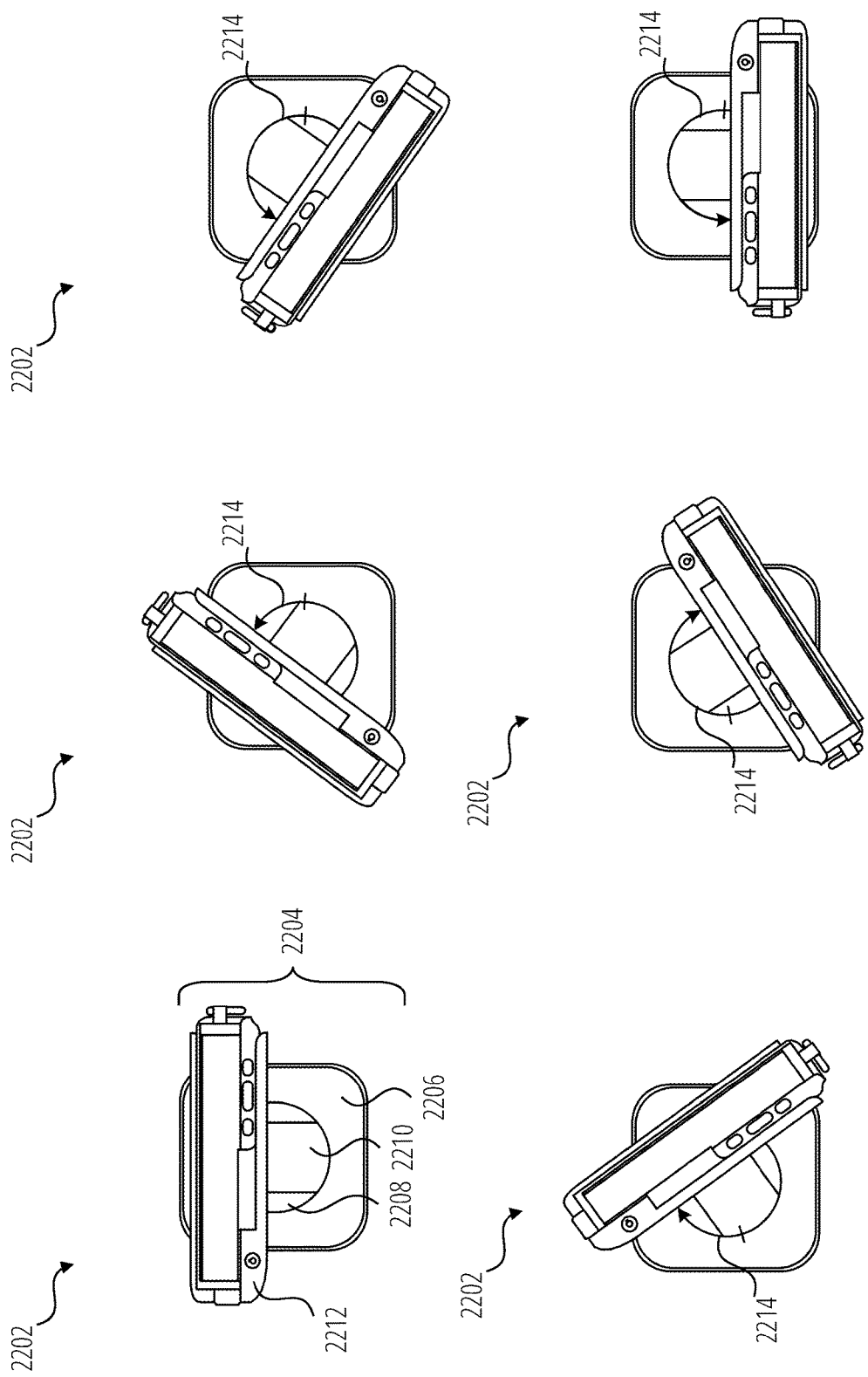
FIG. 22 illustrates various top views of a docking stand assembly, according to an embodiment.

FIG. 22 illustrates various top views of a docking stand assembly 2202, according to an embodiment. The docking stand assembly 2202 may include a support member 2210 that is supporting a docking tray 2212. The support member 2210 may itself be supported on a base 2206 of the docking stand assembly 2202 via a turntable 2208. The turntable 2208 may be configured to allow the support member 2210 to rotate about the top of the base 2206. A starting position 2204 is illustrated. From this starting position, various rotations 2214 are illustrated showing the manner in which this rotation about the top of the base 2206 may be accomplished. It is contemplated that the rotations are not limited to the examples shown here, but that a full 360 degree (or more) range of rotation (either clockwise and/or counter-clockwise) may be possible.

Figure 23:
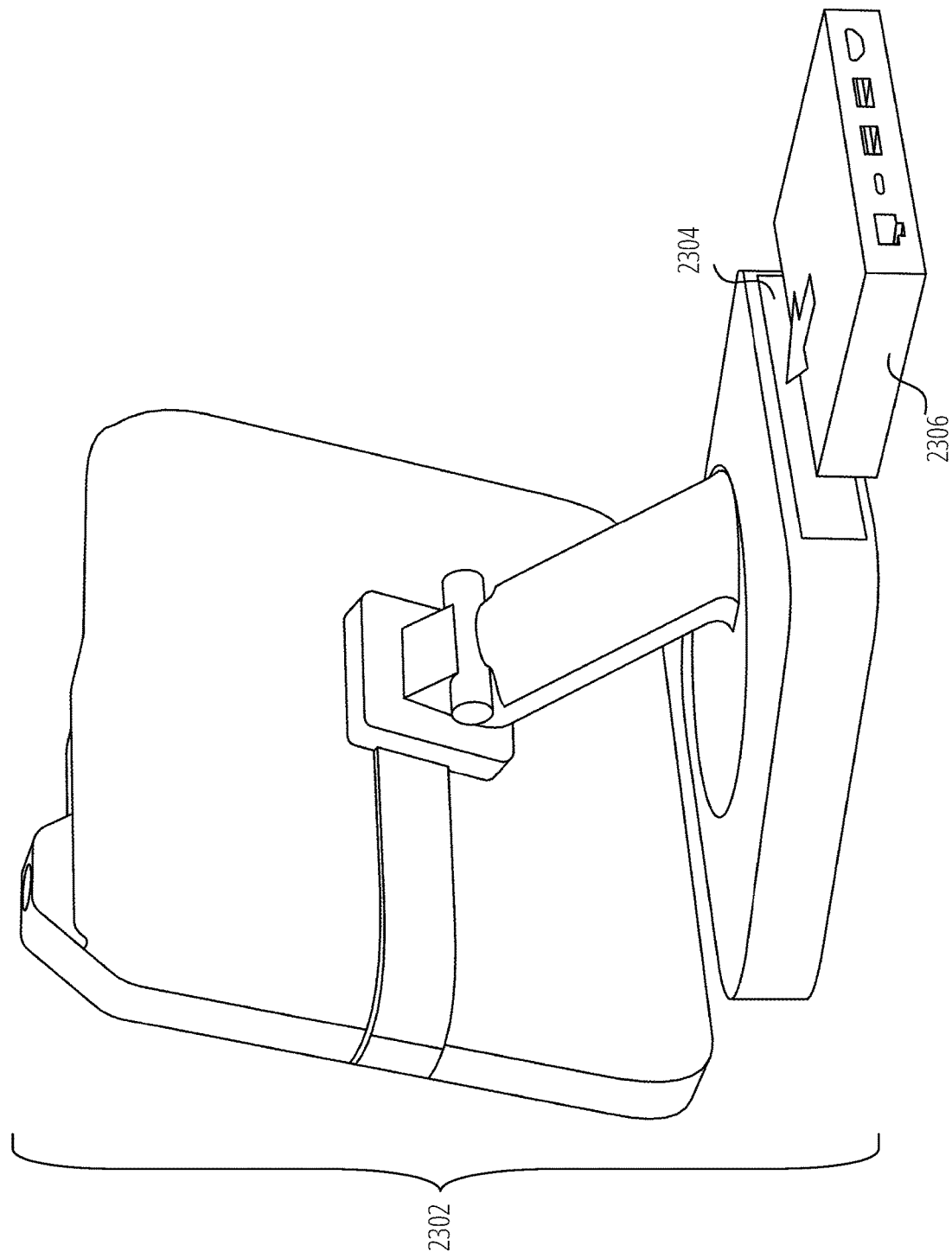
FIG. 23 illustrates the insertion of a docking station into a docking station receptacle of a docking stand assembly, according to an embodiment.

FIG. 23 illustrates the insertion of a docking station 2306 into a docking station receptacle 2304 of a docking stand assembly 2302, according to an embodiment. The docking station 2306 may be slid into the docking station receptacle 2304 of the docking stand assembly 2302 as shown.

Figure 24:
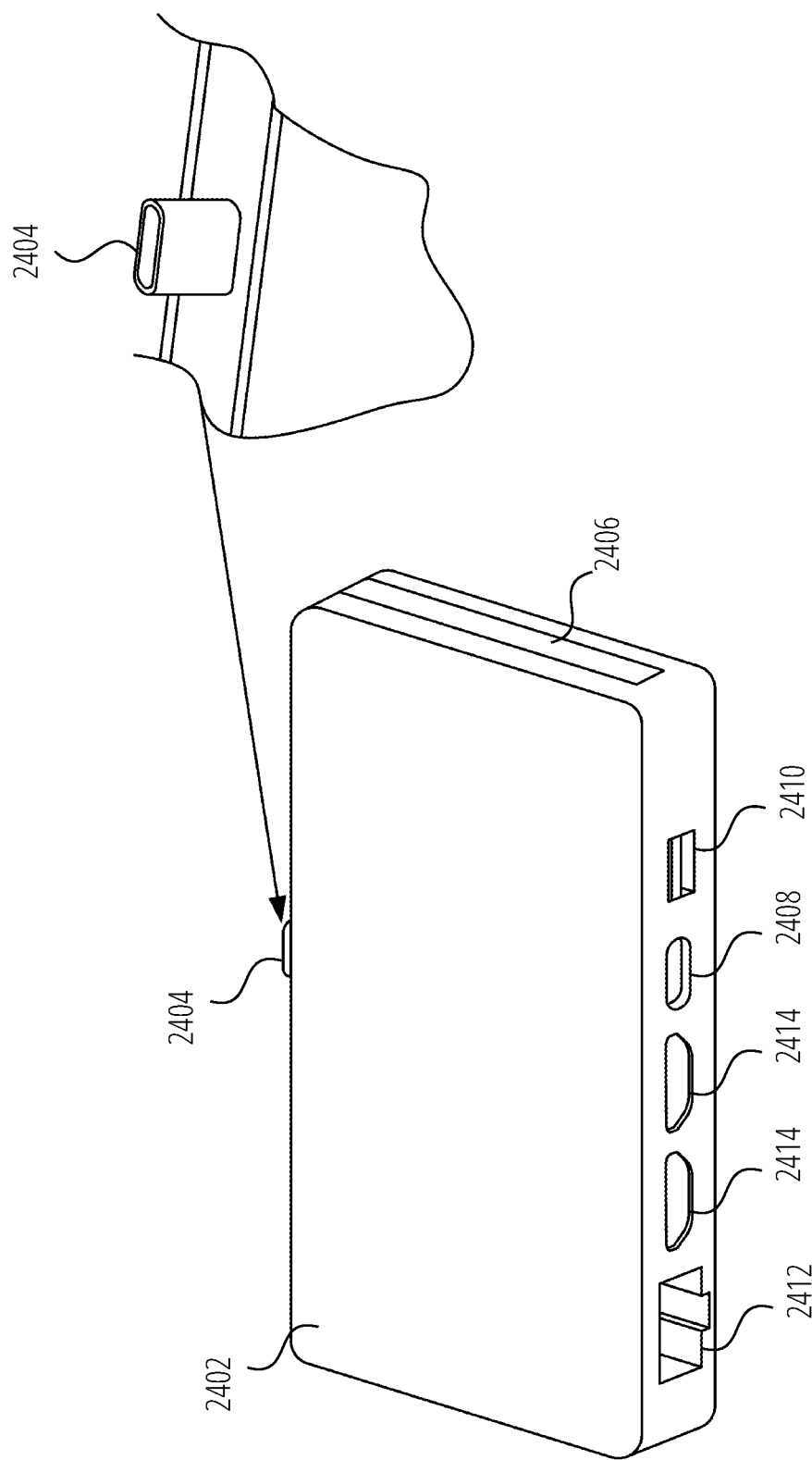
FIG. 24 illustrates a docking station, according to an embodiment.

FIG. 24 illustrates a docking station 2402, according to an embodiment. The docking station 2402 may include a connector 2404 for connecting to a connector of docking station receptacle of a docking stand assembly in order to communicate power and/or data to and/or from the docking station 2402 to a PED that has been placed in a docking tray of the docking stand assembly via a power and data delivery pathway of the docking stand assembly, in the manner described above. Accordingly, it may be that one or both of the connector 2404 and the connector of the docking station is a combined power/data connector. The connector 2404 may be, e.g., a USB-C connector, a lightning connector, a custom connector (as in, for example, the custom connector 332 of FIGS. 3A and 3B, which uses goldfingers), or any other type of connector appropriate for transporting power and/or data between the docking station 2402 and the PED. In the example of FIG. 24, the connector 2404 has been illustrated as a USB-C connector.

The docking station 2402 may include a rail 2406. The rail 2406 may interact with a rail on a docking station receptacle of an appropriate docking stand assembly, thereby ensuring proper alignment of the docking station within the docking station receptacle (e.g., so that the connector 2404 is aligned with a connector of the docking station receptacle). It is contemplated that there may be more than one rail on the docking station 2402 (with corresponding additional rail(s) in the docking station receptacle) useful for this purpose.

The docking station 2402 may further include a USB-C connector 2408. The USB-C connector 2408 may act as a power connector that is a power source connector that receives power from an external power source, in the manner described above. This power may be used to operate the docking station 2402. In some embodiments, at least some of the power received at the docking station 2402 from the external power source at the USB-C connector 2408 may also be communicated (via the connector 2404) to a PED located in a tray of a docking stand assembly to which the docking station 2402 is connected. This power may be used by the PED to operate, charge a battery of the PED, and/or for any other purpose for which the PED may require power. This power may be provided from the docking station USB-C connector 2408 to the PED via the connector 2404 via the power and data delivery pathway described above.

It is also contemplated that the USB-C connector 2408 may also act as a communications connector and/or a data connector. In these cases, data between the PED and input and/or output devices connected to the docking station 2402 via the USB-C connector 2408 and/or communications data between the PED and one or more communications devices connected to the docking station 2402 via the USB-C connector 2408 may be transported along the power and data delivery pathway of the docking station apparatus.

The docking station 2402 may further include a USB-A connector 2410. This USB-A connector may act as a communications connector and/or a data connector, as those connectors are described above. When so used, data (e.g., input/output device data or communications device data) may be transported between the connected external object and the docking station 2402. Such data received at the docking station may be forwarded from the docking station 2402 to the PED located in a docking station receptacle of a docking stand assembly to which the docking station 2402 is connected via the power and delivery pathway described above, and/or forwarded from the docking station 2402 to another external object connected to the docking station 2402. Further, data from either of the PED or another external object may be forwarded through the docking station 2402 and to the external object connected to the USB-A connector 2410 via the USB-A connector 2410. It is also contemplated that the USB-A connector 2410 may be used as a power source connector for the docking station 2402 in some embodiments (either solely, or in addition to as a communications connector and/or a data connector), similarly to the use of the USB-C connector 2408 as described.

The docking station 2402 may further include an RJ-45 connector 2412. The RJ-45 connector 2412 may act as either a communications connector or a power connector (e.g., using Power over Ethernet), as those connectors are described above. When so used, power and/or data (e.g. communications device data) may be transported between the external object connected to the RJ-45 connector 2412, the docking station 2402, a PED located in a docking station receptacle of a docking stand assembly to which the docking station 2402 is connected, and/or another external object connected to the docking station 2402, as in the manner described above.

The docking station 2402 may further include one or more HDMI connectors 2414. These HDMI connectors 2414 may each act as a data connector that is an auxiliary graphical data connector, as described above. When so used, graphical data from the PED of the docking stand assembly docking station 2402 may be transported to the docking station 2402 and from there to any display apparatus(es) connected to the HDMI connectors 2414. It is further contemplated that graphical data from an external object received at the docking station 2402 may also be so transported via the HDMI connectors 2414 and displayed in this manner.

Figure 25:
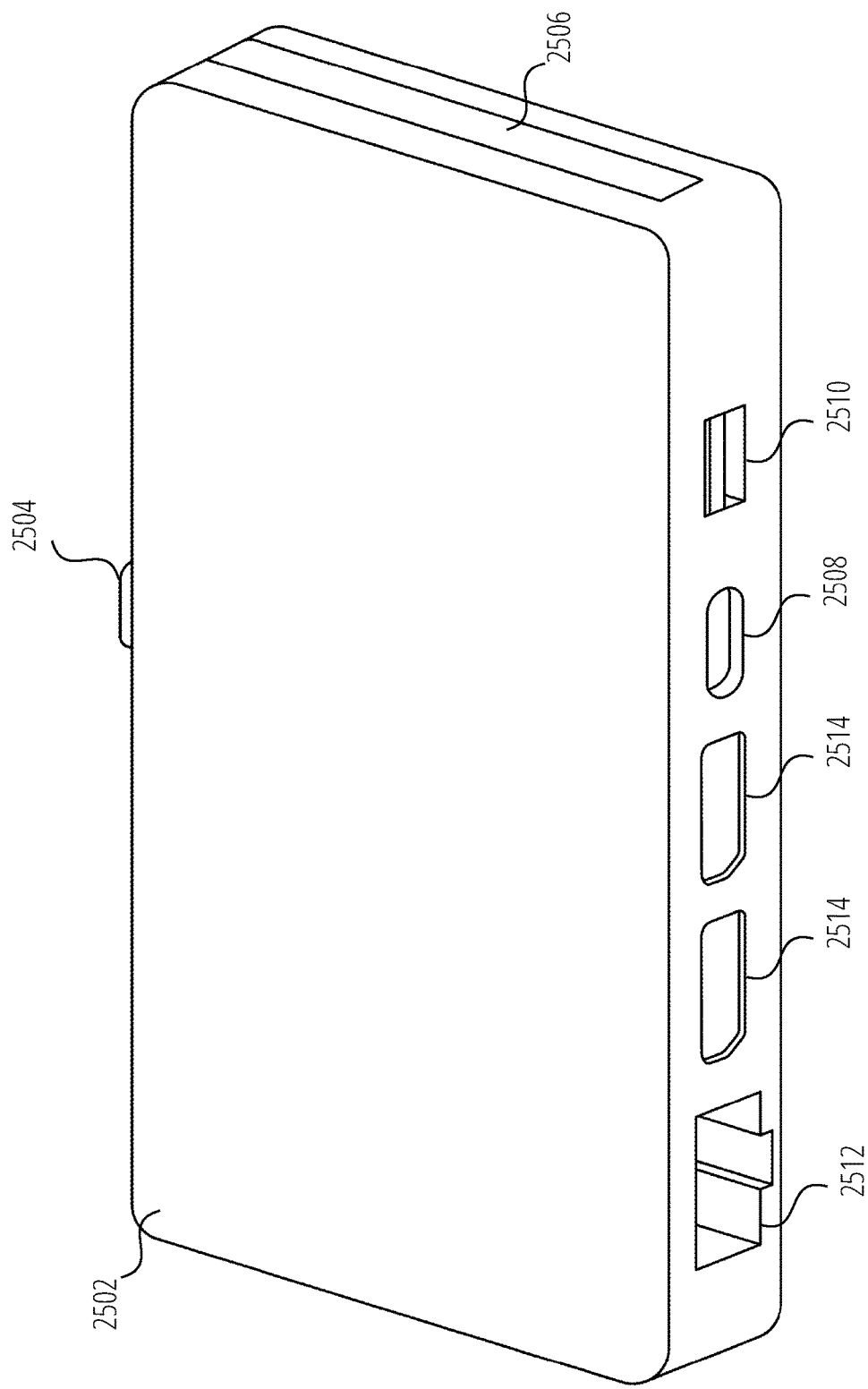
FIG. 25 illustrates a docking station, according to an embodiment.

FIG. 25 illustrates a docking station 2502, according to an embodiment. The docking station 2502 may include a connector 2504. The connector 2504 may be similar in nature and use to the connector 2404 of FIG. 24.

The docking station 2502 may include a rail 2506. The rail 2506 may be similar in nature and use to the rail 2406 of FIG. 24.

The docking station 2502 may include a USB-C connector 2508. The USB-C connector 2508 may be similar in nature and use to the USB-C connector 2408 of FIG. 24.

The docking station 2502 may include a USB-A connector 2510. The USB-A connector 2510 may be similar in nature and use to the USB-A connector 2410 of FIG. 24.

The docking station 2502 may include an RJ-45 connector 2512. The RJ-45 connector 2512 may be similar in nature and use to the RJ-45 connector 2412 of FIG. 24.

The docking station 2502 may include the DisplayPorts 2514. These DisplayPorts 2514 may each act as a data connector that is an auxiliary graphical data connector, as described above. When so used, graphical data from the PED of the docking stand assembly docking station 2402 may be transported to the docking station 2402 and from there to any display apparatus(es) connected to the DisplayPorts 2514. It is further contemplated that graphical data from an external object received at the docking station 2402 may also be so transported via the DisplayPorts 2514 and displayed in this manner.

Figure 26:
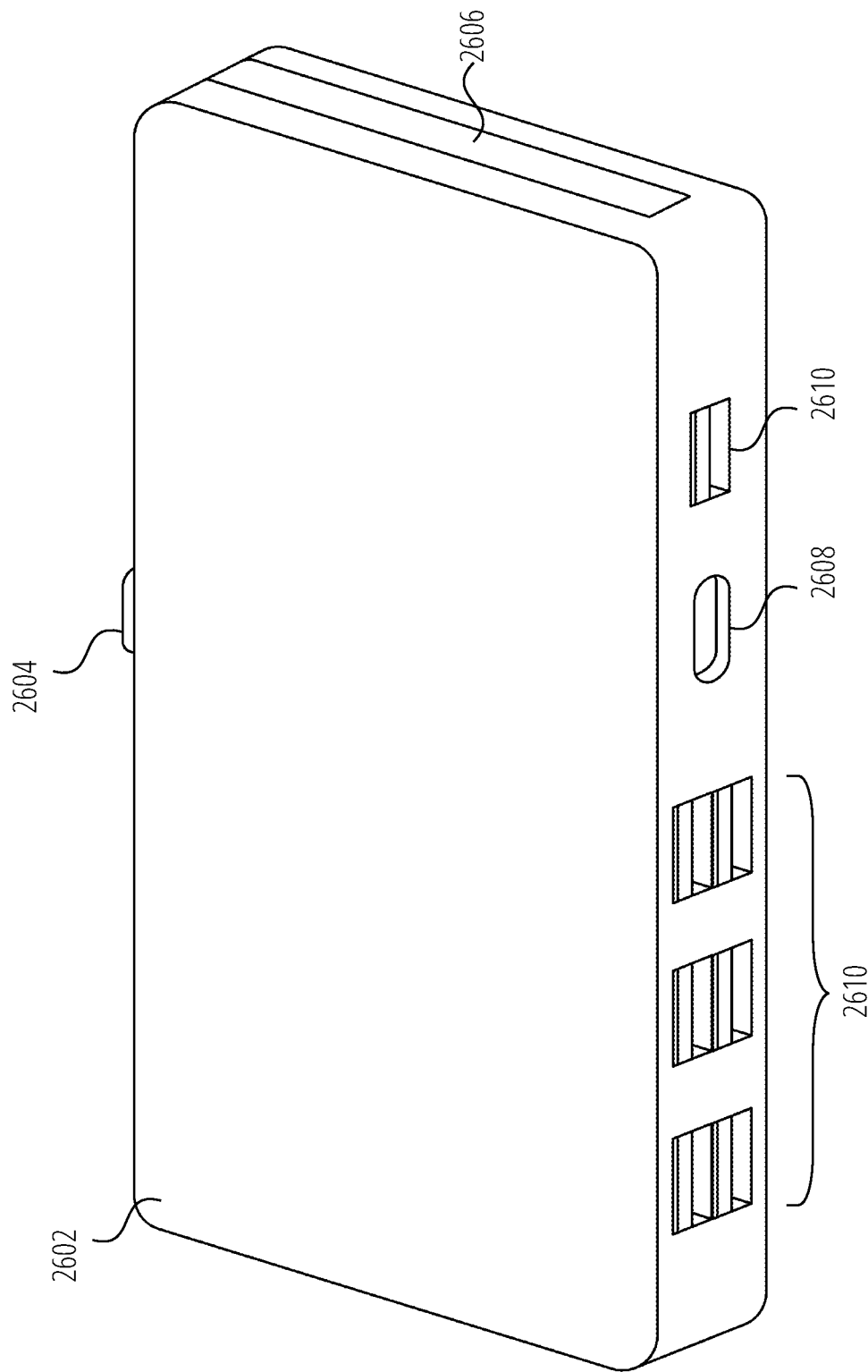
FIG. 26 illustrates a docking station, according to an embodiment.

FIG. 26 illustrates a docking station 2602, according to an embodiment. The docking station 2602 may include a connector 2604. The connector 2604 may be similar in nature and use to the connector 2404 of FIG. 24.

The docking station 2602 may include a rail 2606. The rail 2606 may be similar in nature and use to the rail 2406 of FIG. 24.

The docking station 2602 may include a USB-C connector 2608. The USB-C connector 2608 may be similar in nature and use to the USB-C connector 2408 of FIG. 24.

The docking station 2602 may include the USB-A connectors 2610. The USB-A connectors 2610 may each be similar in nature and use to the USB-A connector 2410 of FIG. 24.

Figure 27:
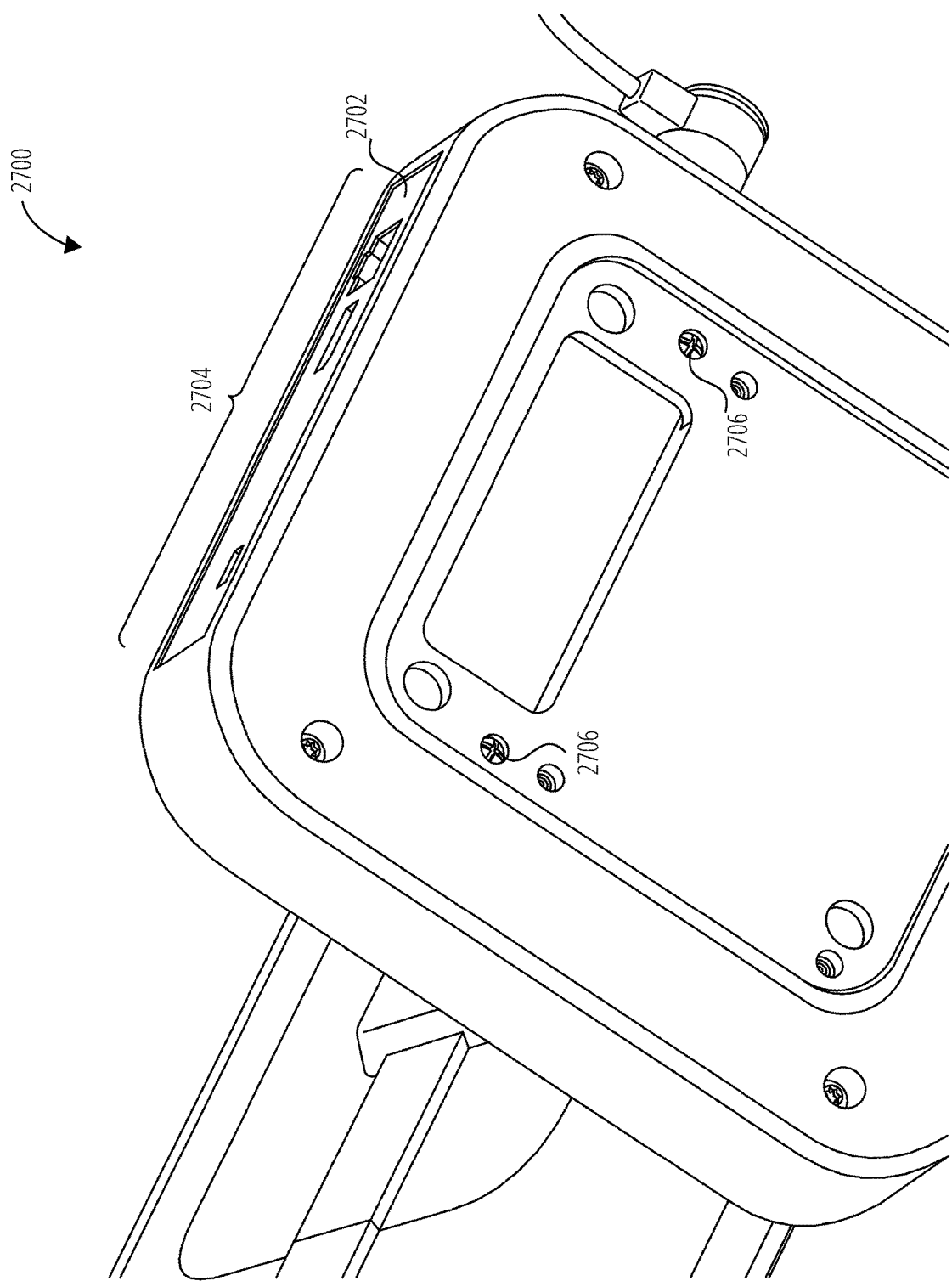
FIG. 27 illustrates a perspective view of the bottom of a docking stand assembly, according to an embodiment.

FIG. 27 illustrates a perspective view of the bottom of a docking stand assembly 2700, according to an embodiment. A docking station 2702 has been inserted into the docking station receptacle 2704 of the docking stand assembly 2700. Further one or more security screws 2706 has been inserted through the bottom of the docking stand assembly 2700 and into corresponding threaded holes (not shown) on the bottom of the docking station 2702. In this manner, the docking station 2702 is securely held within the docking stand assembly 2700.

It is contemplated that other embodiments of docking stand assemblies and docking stations may use other types of mounting features (other than screws) to secure the docking station in a docking station receptacle of the docking stand assembly. Examples of such mounting features (and their use) are described above in relation to docking station receptacles of display apparatuses and docking stations for use therewith.

Figure 28:
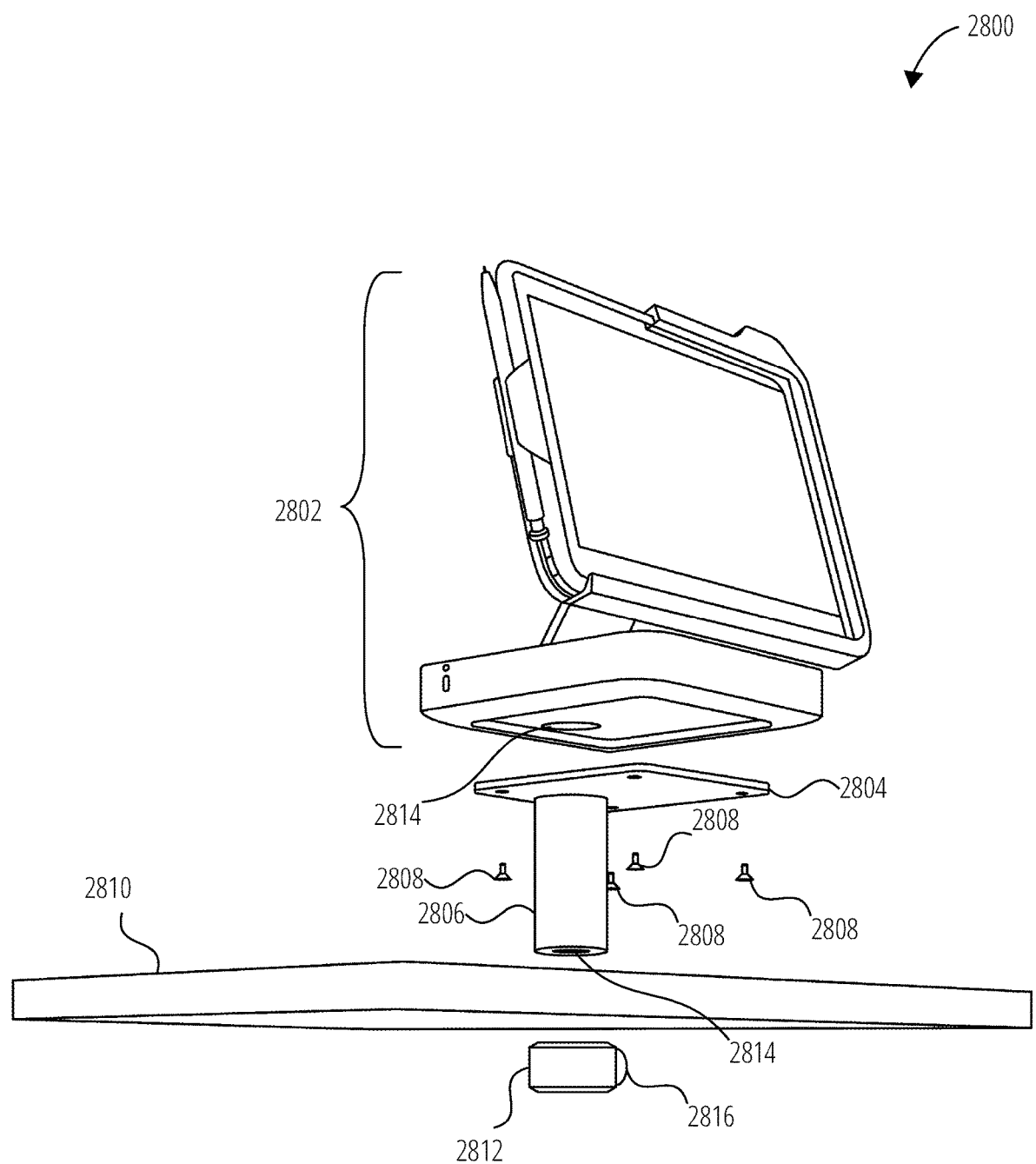
FIG. 28 illustrates an exploded view of a mounting configuration for a docking stand assembly, according to an embodiment.

FIG. 28 illustrates an exploded view of a mounting configuration 2800 for a docking stand assembly 2802, according to an embodiment. A locking plate 2804 may be attached to the bottom of the docking stand assembly 2802 via one or more fasteners 2808 (illustrated here has screws). The locking plate 2804 is attached to post 2806. For example, the locking plate 2804 may be welded to the post 2806, or alternatively the locking plate 2804 and the post 2806 are formed together. That the post 2806 may be removably attached to the locking plate 2804 (e.g., via screws (not shown) coming down through the top of the locking plate 2804 and into the post 2806) is also contemplated. The post 2806 may then be passed through a hole in the surface 2810 to which the docking stand assembly 2802 is to be mounted. The sleeve 2812 is then passed over the portion of the post 2806 that extends from the bottom of the surface 2810. The tension knob 2816 of the sleeve 2812 is then tightened to hold the sleeve 2812 in place on the post 2806 and thus hold the mounting configuration 2800 in place.

The underside of the surface 2810 may be in a relatively secure location (e.g., may be the underside of a service counter with an underside that is only accessible from a secure side). Further, the tension knob 2816 may be secured with a padlock or a knob lockout, and or may alternatively be tooled such that removal of the tension knob 2816 requires a certain tool.

The bottom of the docking stand assembly 2802, the locking plate 2804 and the post 2806 may include ducting 2814. This ducting 2814 may allow a cable to pass from the bottom of the post up through the locking plate 2804 and the bottom of the docking stand assembly 2802 in order to interface with a connector within a docking station receptacle of the docking stand assembly.

Figure 29:
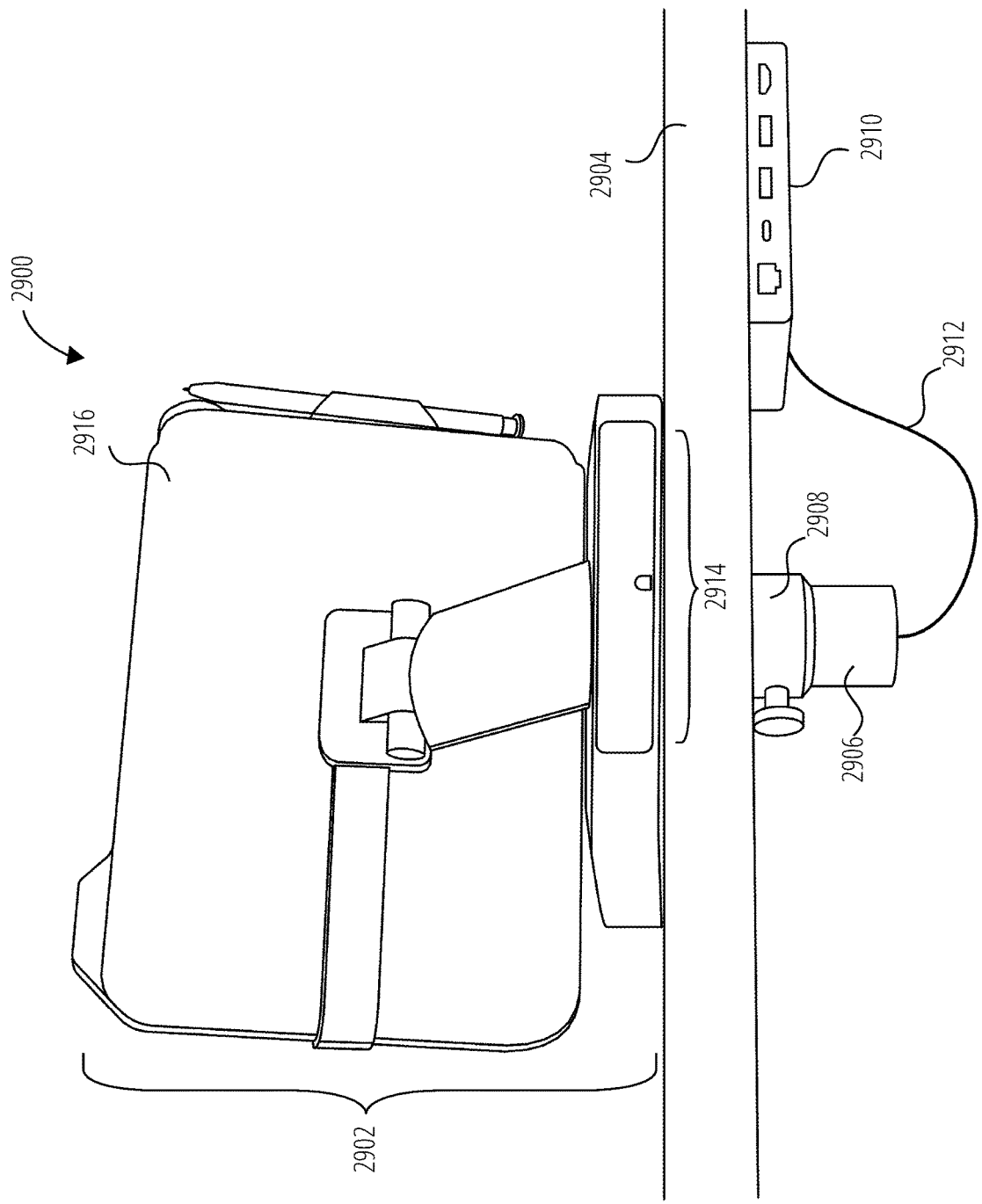
FIG. 29 illustrates a back perspective view of a docking stand assembly that has been mounted to a surface using a mounting plate (not visible) and post and allowing for cable access through ducting according to a mounting configuration, according to an embodiment.

FIG. 29 illustrates a back perspective view of a docking stand assembly 2902 that has been mounted to a surface 2904 using a mounting plate (not visible) and a post 2906 (secured by a sleeve 2908) and allowing for access by a cable 2912 through ducting according to a mounting configuration 2900, according to an embodiment. As illustrated, a user may prefer to place the docking station 2910 (or another device) in a location other than inside the docking station receptacle 2914 of the docking stand assembly 2902. In this case, when using the mounting configuration 2900 illustrated, a cable may run from a connector of the docking station 2910 (or other device) up through ducting found in the post 2906, the mounting plate, and the bottom of the docking stand assembly 2902 and to a connector located within the docking station receptacle 2914 of the docking stand assembly 2902. This may enable the use of the docking station 2910 (or other device) with a PED inserted in the docking tray 2916 of the docking stand assembly 2902. In the case of the docking station 2910, the use of the docking station 2910 may be functionally the same as if the docking station 2910 were inserted directly into the docking station receptacle 2914.

Figure 30:
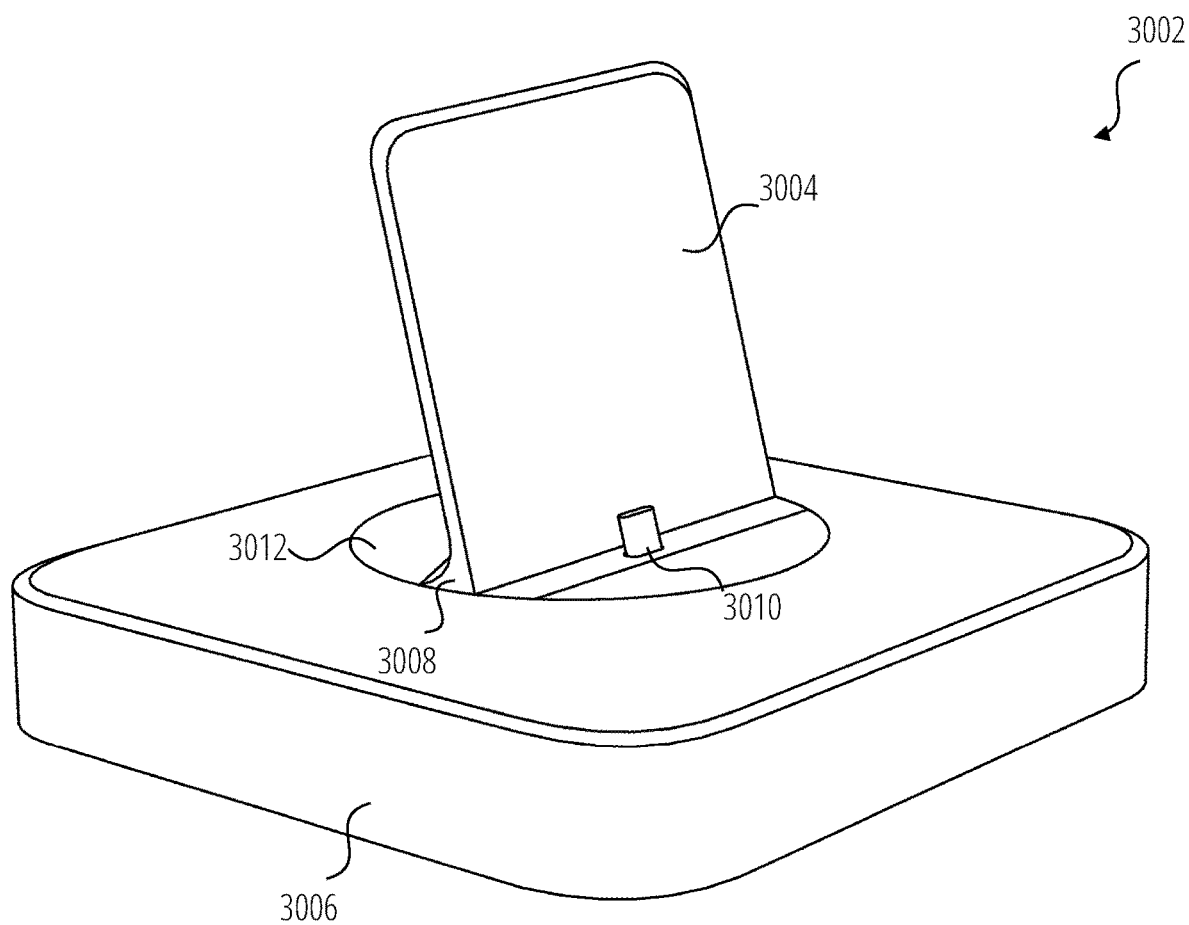
FIG. 30 illustrates a front perspective view of a docking stand assembly according to an embodiment.

FIG. 30 illustrates a front perspective view of a docking stand assembly 3002 according to an embodiment. The docking stand assembly 3002 includes a docking tray 3004, a base 3006, and a support member 3008 between the docking tray 3004 and the base 3006. The docking stand assembly 3002 may be configured to work with a different type of PED than, for example, the docking stand assembly 1502 of FIG. 15. For example, while the docking stand assembly 1502 may be configured for use with a PED that is a tablet computer, the docking stand assembly 3002 may instead be configured for use with a PED that is a smartphone.

The docking tray 3004 may further include a connector 3010 configured to removably couple with a connector of a PED once the PED has been placed within the docking tray 3004. The connection of the PED with the connector 3010 may enable a power and/or data connection with the PED that has been received in the docking tray 3004, in the manner described above. The connector 3010 may be a USB (e.g., USB-C) connector, a lightning connector, or any other physical connector capable of power and/or data communication to and/or from the PED. The connector 3010 may be positioned within the docking tray 3004 such that it interfaces with the connector of the PED when the PED is inserted into the docking tray 3004 (perhaps as encased in a case made for the PED, where such a case is also designed for interaction with the docking tray 3004 of the docking stand assembly 3002).

The support member 3008 of the docking stand assembly 3002 is mounted to the top of the base 3006 via a turntable 3012, which allows the support member 3008 (and, accordingly, the docking tray 3004) to rotate about the top of the base 3006.

Figure 31:
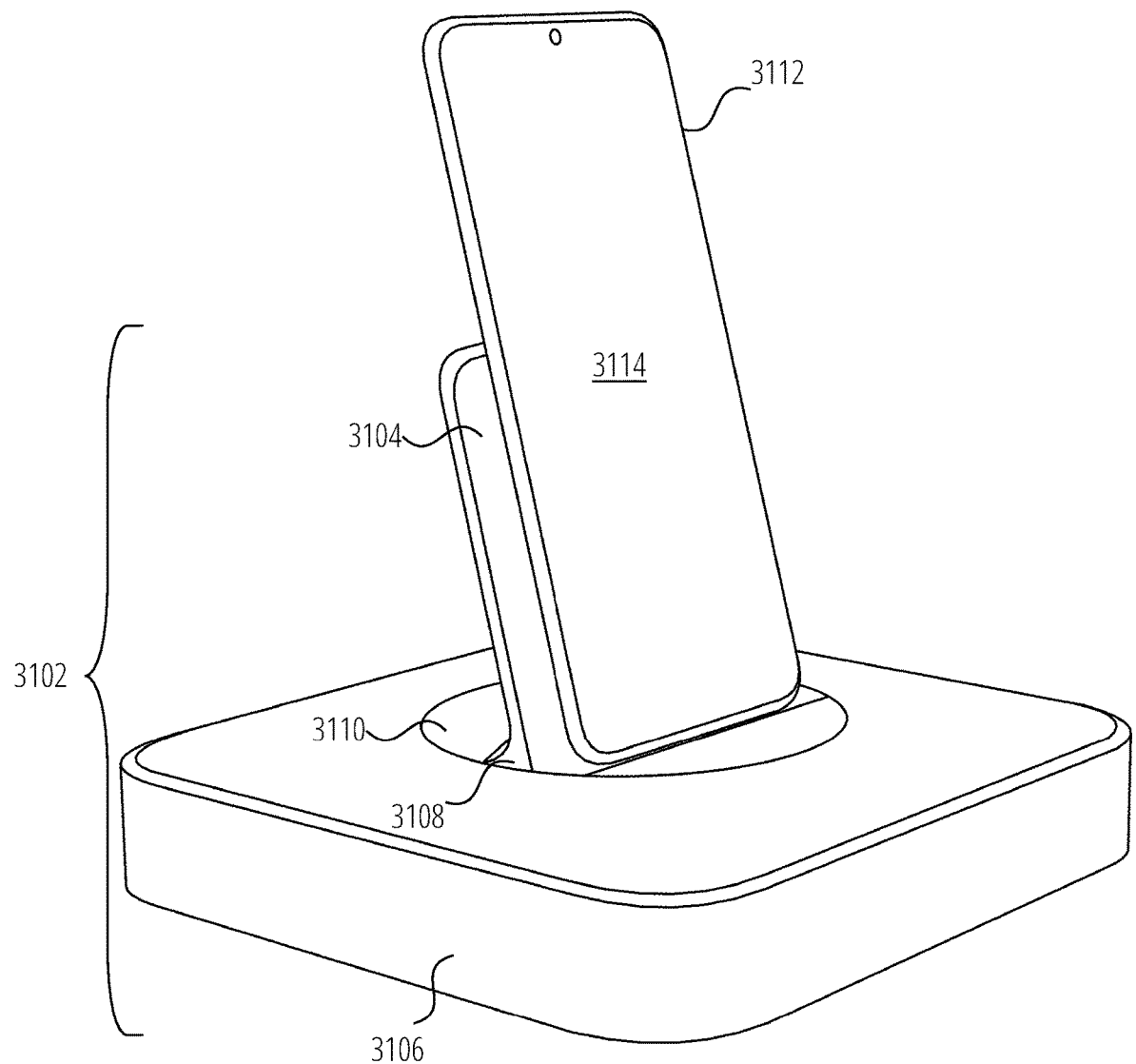
FIG. 31 illustrates a front perspective view of a docking stand assembly with a docking tray that has received a PED, according to an embodiment.

FIG. 31 illustrates a front perspective view of a docking stand assembly 3102 with a docking tray 3104 that has received a PED 3112, according to an embodiment. Like the docking stand assembly 3002 of FIG. 30, the docking stand assembly 3102 includes a docking tray 3104, a base 3106, a support member 3108 and a turntable 3110. Further, the docking stand assembly 3102 has received the PED 3112 in the docking tray 3104.

The PED 3112 is positioned relative to the docking tray 3104 such that a connector of the PED 3112 aligns with a connector of the docking tray 3104 (not shown, but as in, e.g., the connector 3010 of FIG. 30). This positioning also provides that a screen 3114 of the PED is fully (or at least substantially) accessible when the PED 3112 is placed within the docking tray 3104.

Figure 32:
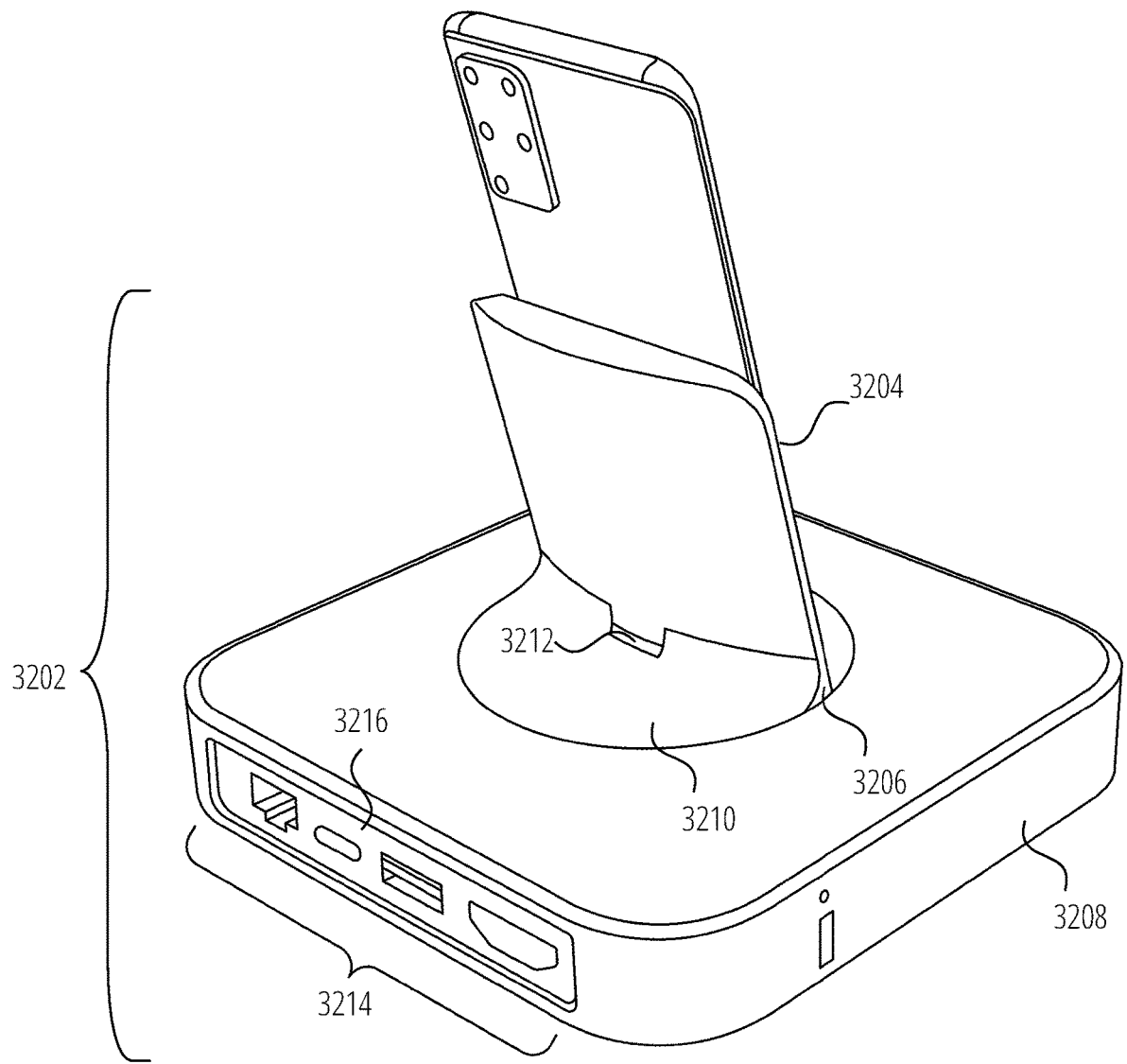
FIG. 32 illustrates a rear perspective view of a docking stand assembly, according to an embodiment.

FIG. 32 illustrates a rear perspective view of a docking stand assembly 3202, according to an embodiment. The docking stand assembly 3202 includes a docking tray 3204, a support member 3206, a base 3208, and a turntable 3210. The support member 3206 of the docking stand assembly 3202 may include a hinge 3212, which may allow the docking tray 3204 to tilt relative to the base 3208.

The base 3208 includes a docking station receptacle 3214 that is configured to receive a docking station such as the docking station 3216. A connector (not shown) may be disposed within the docking station receptacle 3214. This connector may removably couple or interface with a connector of the docking station 3216 to connect to the docking station 3216. This connector of the docking station receptacle 3214 may be connected to a power and data delivery pathway (not shown) that runs between the connector of the docking station receptacle 3214 and up through the base 3208, the support member 3206, and the docking tray 3204 to the connector of the docking tray 3204 (e.g., the connector 3010 of FIG. 30). Accordingly, these connectors and the power and delivery pathway between them may provide power and data communication between the docking station 3216 and a PED that has been placed in the docking tray 3204 of the docking stand assembly 3202. This permits the PED to communicate not only with the docking station 3216, but also with any external objects that may be connected to or interfaced with the external object connectors of the docking station 3216. These communications may be as described above in relation to other embodiments of docking stations and their use with docking stand assemblies.

Similarly to previously described embodiments, the docking station 3216 may be optionally inserted into and/or removed from the docking stand assembly 3202. The docking stand assembly 3202 may be compatible with multiple types of docking stations (of which the docking station 3216 is one), each of which may optionally be inserted into the docking station receptacle 3214 of the docking stand assembly 3202. The various docking stations may provide different types and/or amounts of connectors and features, giving the docking station 3216 flexibility to adapt to various use cases and/or to be adapted to the specific needs of a larger device ecosystem.

Figure 33:
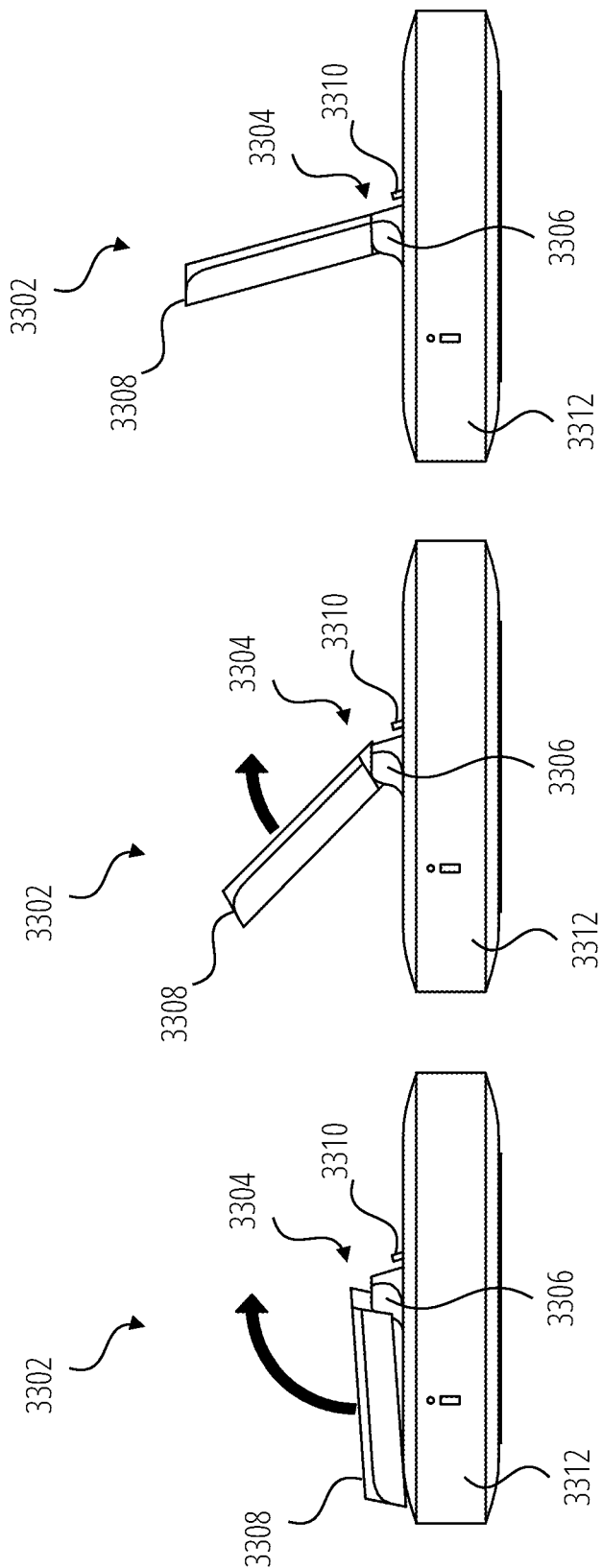
FIG. 33 illustrates various side views of a docking stand assembly, according to an embodiment.

FIG. 33 illustrates various side views of a docking stand assembly 3302, according to an embodiment. As illustrated, a hinge 3304 is located in a support member 3306 between a base 3312 and a docking tray 3308. The hinge 3304 allows for the docking tray 3308 to be tilted relative to the base 3312 at angles including (but not limited to) those illustrated here. The base 3312 may include the combined power/data connector 3310. The act of tilting the docking tray 3308 as illustrated may act to create or disengage an interface between a combined power/data connector of a PED (not shown) and the combined power/data connector 3310 of the docking stand assembly 3302.

Figure 34:
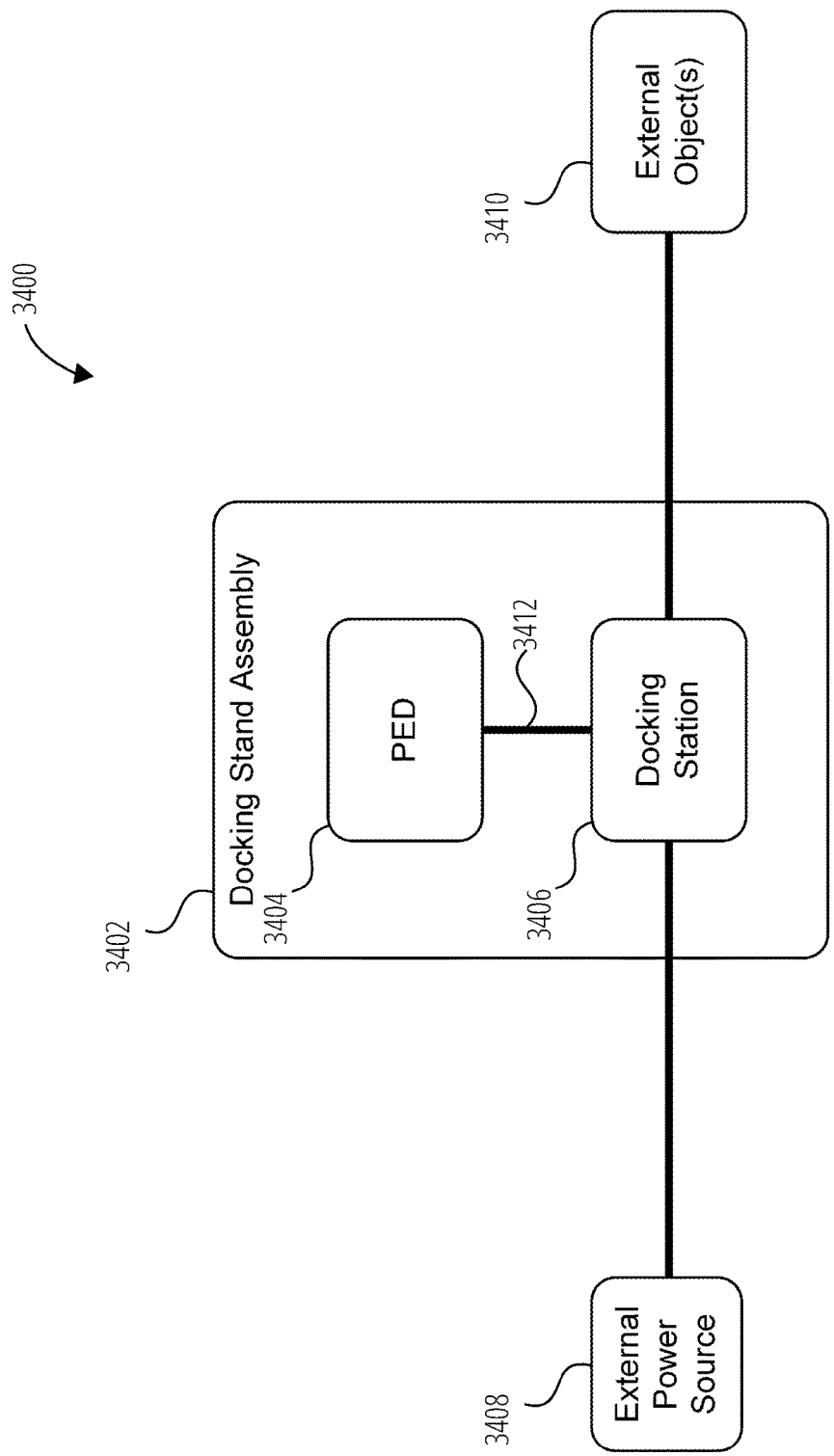
FIG. 34 is a block diagram of a system using a docking stand assembly, according to an embodiment

FIG. 34 is a block diagram of a system 3400 using a docking stand assembly 3402, according to an embodiment. This system includes the docking stand assembly 3402, the PED 3404, the docking station 3406, the external power source 3408, the external object(s) 3410. In the system 3400, the PED 3404 and the docking station 3406 may have been removably attached to the docking stand assembly 3402, with the PED 3404 located in a docking tray (not illustrated) of the docking stand assembly 3402 and the docking station 3406 located at a docking station receptacle (not illustrated) of the docking stand assembly 3402, in like manner as described herein.

The external power source 3408 may be connected to the docking station 3406. The external power source 3408 may be, for example, a battery, a connection to a utility transformer via a wall outlet, or any other appropriate external power source. The docking station 3406 may take power directly from the external power source 3408 in order to operate. It may further provide at least some of the power from the external power source 3408 to the PED 3404 with which it is communicating (e.g., via a power and data delivery pathway 3412 of the docking stand assembly 3402 as described above). The PED 3404 may use power supplied via the docking station 3406 in this way to operate, charge a battery of the PED 3404, and/or for any other purpose for which the PED 3404 may require power. The docking station 3406 may also provide at least some of the power from the external power source 3408 to one or more of the external object(s) 3410.

The external object(s) 3410 may include one or more of an input device, an output device, a display device, a communications device, or any other external object as discussed above. These external object(s) 3410 may be connected to and communicate with the docking station 3406 using an appropriate connector of the docking station 3406, as described above. The PED 3404 may communicate with the one or more external object(s) 3410 by sending data to the docking station 3406 to be forwarded to the external object(s) 3410, and the external object(s) 3410 may communicate with the PED 3404 by sending data to the docking station 3406 to be forwarded to the PED. Data so shared in this manner may include input data, output data, graphical data, communications data, or any other type of data described above.

Figure 35:
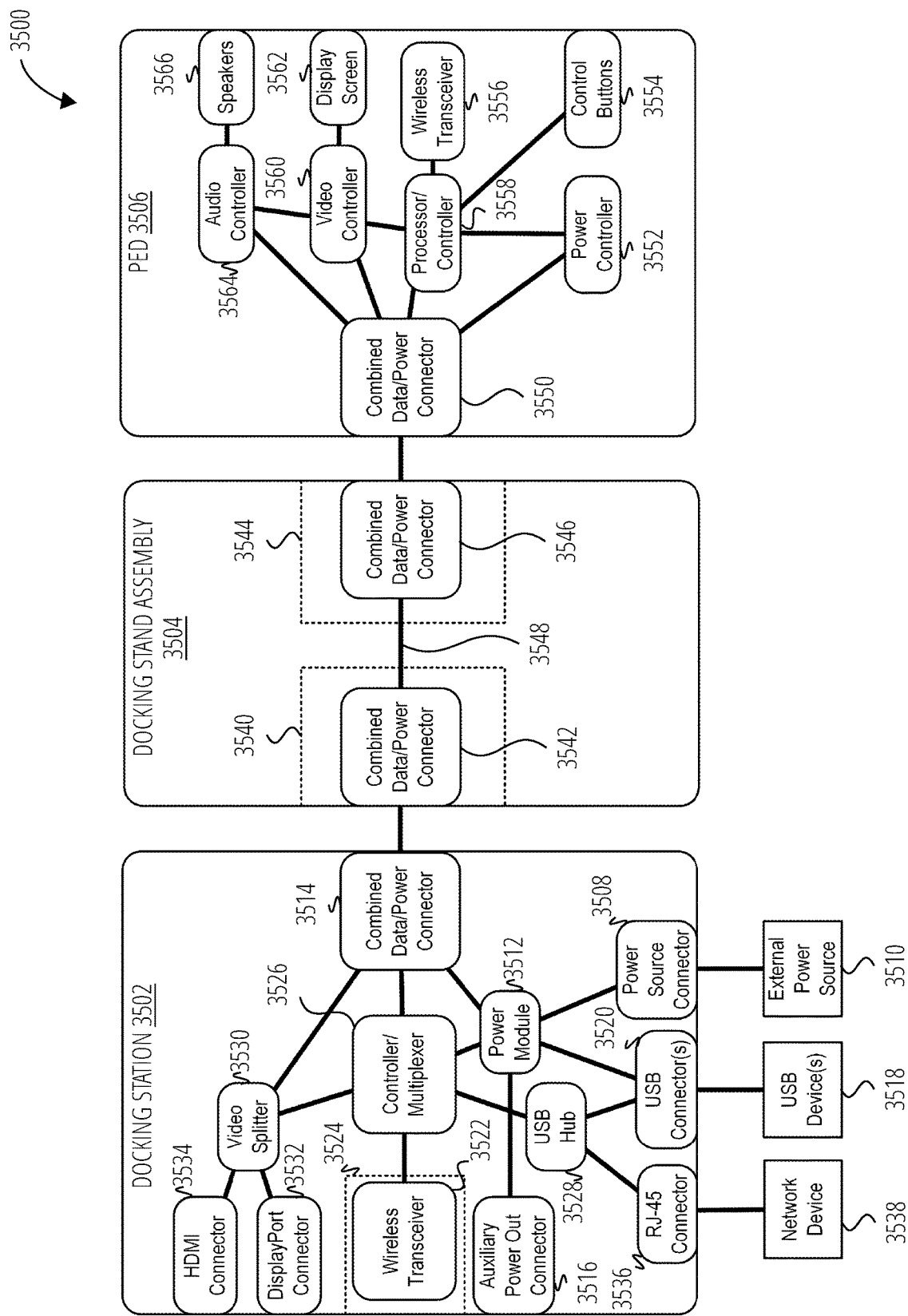
FIG. 35 is a block diagram of a system for using a docking station and a PED with a docking stand assembly, according to an embodiment.

FIG. 35 is a block diagram of a system 3500 for using a docking station 3502 and a PED 3506 with a docking stand assembly 3504, according to an embodiment. In the embodiment of FIG. 35, the docking station 3502 may be removably attached to the docking stand assembly 3504, in like manner to that described above. Further, the PED 3506 may be removably attached to the docking stand assembly 3504, in like manner to that described above. This should be understood even though, merely for purposes of illustration, the docking station 3502 and the PED 3506 have been drawn apart from, and similarly sized to, the docking stand assembly 3504.

The docking station 3502 may include a power source connector 3508. The power source connector 3508 may receive power from the external power source 3510. The power source connector 3508 may be any connector (including custom and/or hybrid connectors) capable of connecting to a connector on the external power source 3510. The power provided may be communicated to a power module 3512 of the docking station 3502 for distribution to the rest of the docking station 3502 in order to operate the docking station 3502. There may be sufficient remaining power for the docking station 3502 to further communicate power to the PED 3506 via the combined data/power connector 3514 in the manner described herein. Additionally (or alternatively), there may be sufficient remaining power to be communicated to, for example, the auxiliary power out connector 3516, in order to provide power to, e.g., a secondary display apparatus (not shown) for it to operate. There may also be sufficient power remaining to communicate power (perhaps indirectly) to external objects connected to other connectors of the docking station 3502 (e.g., USB device(s) 3518 connected to USB connector(s) 3520), or for any other purpose for which power may be used by the docking station 3502.

The docking station 3502 may further include a wireless transceiver 3522. This wireless transceiver 3522 may communicate with a wireless transceiver of the PED 3506, to form a network. This wireless network may be used for data communications between the docking station 3502 and the PED 3506. The wireless transceiver 3522 may use, for example, a Wi-Fi™ protocol, a Bluetooth™ protocol, or any other appropriate wireless protocol useable to transfer data as part of network communication.

The wireless transceiver 3522 may also be used by the docking station 3502 to connect to other wireless network devices (e.g., a network device such as a router) in order to receive independent data (e.g., data not from the PED 3506) from a network. This data may be used to operate the PED 3506 (e.g., used to power on and/or off the primary PED 3506, used to render a display on a display screen 3562 of the PED 3506). The wireless transceiver 3522 may or may not be removable 3524 from the docking station 3502 in the manner described herein.

The controller/multiplexer 3526 may receive power from the power module 3512. The controller/multiplexer 3526 may then communicate this power to, for example, a USB hub 3528. The controller/multiplexer 3526 may also send data (e.g., graphical data provided from the PED 3506) to a video splitter 3530. The controller/multiplexer 3526 may also send and/or receive data to and/or from the USB hub 3528 and/or the wireless transceiver 3522 in the manner described herein. The controller/multiplexer 3526 may be, in some embodiments, a Thunderbolt™ 3/USB-C controller/multiplexer.

The controller/multiplexer 3526 or another processor/controller of the docking station 3502 may have instructions thereon to implement one or more other features of the docking station 3502 consistent with embodiments of docking stations discussed herein. Such instructions may be sourced from a non-transitory computer-readable medium (not shown) on or associated with these processors and/or controllers.

The USB hub 3528 may be connected to the USB connector(s) 3520, and may be responsible for routing data and/or power between the USB connector(s) 3520, an RJ-45 connector 3536, and the controller/multiplexer 3526. As described above, data at the USB connector(s) 3520 may be provided by and/or sent to the USB device(s) 3518. Further, power to the USB device(s) 3518 may be provided by the USB hub 3528. Data from the RJ-45 connector 3536 may be provided by a network device 3538 connected to the RJ-45 connector 3536.

The video splitter 3530 may receive data (including graphical data) from the controller/multiplexer 3526. This graphical data may have originated from, for example, the PED 3506 or an external object in the manner described herein. The video splitter 3530 may provide all or a portion of received graphical data from an external object to the combined data/power connector 3514 of the docking station 3502. This graphical data may be communicated, eventually, to the PED 3506 to be used to render a display on the display screen 3562 in the manner described herein. The video splitter 3530 may provide (alternatively or additionally) all or a portion of received graphical data from either an external object and/or the PED 3506 to either of, e.g., the DisplayPort connector 3532 and/or HDMI connector 3534 of the docking station 3502. From the DisplayPort connector 3532 and/or the HDMI connector 3534, that graphical data may then be communicated to, e.g., a secondary display apparatus (not shown).

It is contemplated that in some embodiments, the video splitter 3530 of the docking station 3502 may provide all or a portion of received graphical data to a plurality of auxiliary graphical data connectors such as the DisplayPort connector 3532 and the HDMI connector 3534. In these cases, each auxiliary graphical data connector may provide graphical data from the docking station 3502 to other display apparatuses which are not illustrated.

The docking station 3502 may further include the auxiliary power out connector 3516. This auxiliary power out connector 3516 may be an auxiliary power out connector according to FIGS. 1A and 2A. The auxiliary power out connector 3516 may include, for example, a DC connector, a USB (e.g., USB-C) connector, an IEC 420 C13 or C14 connector, or any other connector (including custom and/or hybrid connectors) capable of communicating power from the auxiliary power out connector 3516 to, for example, an auxiliary power in connector of a display apparatus as described herein. The auxiliary power out connector 3516 may be able to connect to a display apparatus in order to provide power to the display apparatus for the display apparatus to operate in the manner described herein.

The docking stand assembly 3504 may include a docking station receptacle 3540 that includes a combined data/power connector 3542. Further, the docking stand assembly 3504 may include a docking tray 3544 that includes a combined data/power connector 3546. A power and data delivery pathway 3548 may run between the combined data/power connector 3542 of the docking station receptacle 3540 and the combined data/power connector 3546 of the docking tray 3544 to support the transfer of power and/or data to and/or from the docking station 3502 and the PED 3506.

The PED 3506 may include a combined data/power connector 3550. The combined data/power connector 3550 may be configured to interface with and communicate power and/or data to and/or from a combined data/power connector 3546 of the docking stand assembly 3504. The combined data/power connector 3550 of the PED 3506 and/or the combined data/power connector 3546 of the docking stand assembly 3504 may be, for example, USB (e.g., USB-C) connectors, lightning connectors, or any other appropriate connectors as described above. The data received at the PED 3506 via the combined data/power connector 3550 may be data (e.g., graphical and/or other data) communicated by the docking station 3502 from an external object via the docking stand assembly 3504.

The PED 3506 may also include a video controller 3560. The video controller 3560 may be able to receive graphical data from, for example, the combined data/power connector 3550 and or the wireless transceiver 3556 via the processor/controller 3558. The video controller 3560 may then use the graphical data to render a display on a display screen 3562 of the PED 3506.

The PED 3506 may also include an audio controller 3564. The audio controller 3564 may be able to receive audio data from the combined data/power connector 3550 and/or the wireless transceiver 3556 via the processor/controller 3558. The audio controller 3564 may then reproduce the audio data for on the speakers 3566 of the PED 3506.

The PED 3506 may further include control buttons 3554. The control buttons 3554 may include a power button for turning the PED 3506 on and off. This may also turn on and off any docking station attached to the PED 3506 via a docking stand assembly (e.g., the docking station 3502 via the docking stand assembly 3504) by using signal(s) sent to the docking station 3502 via the power and data delivery pathway 3548 of the docking stand assembly 3504. The control buttons 3554 may include one or more volume buttons for adjusting the volume of the speakers 3566 of the PED 3506.

The PED 3506 may include a power controller 3552. The power controller 3552 may be responsible for distributing power to the rest of the PED 3506 in order to operate the PED 3506. This power may be received from, for example, the docking station 3502 via the power and data delivery pathway 3548 of the docking stand assembly 3504, in the manner described above.

Any of the power controller 3552, the video controller 3560, and/or the audio controller 3564, or another processor/controller 3558 of the PED 3506 may have instructions thereon to implement one or more features of the PED 3506 consistent with embodiments of PEDs discussed herein. Such instructions may be sourced from a non-transitory computer-readable medium (not shown) on or associated with these processors and/or controllers.

Data used in the system 3500 may be, e.g., data received from an IoT system (such as, e.g., an IoT home automation system). This data may be received at, e.g., the RJ-45 connector 3536, the USB connector(s) 3520, and/or the wireless transceiver 3522 of the docking station 3502, and/or this data may be received at the wireless transceiver 3556 of the PED 3506. It is contemplated that this data may be used to display settings corresponding to one or more networked devices (e.g., an IoT device) on the display screen 3562 of the PED 3506. It is also contemplated that the PED 3506 may be used to send commands to networked devices modifying these settings or performing other control tasks (e.g., via one of the control buttons 3554 on the PED 3506, and/or via interaction with a display screen 3562 of the PED 3506 that is a touch screen). Further, informational items (such as, e.g., weather, news, or status of another device on the network) may be similarly sent to the PED 3506 and displayed on the display screen 3562.

The docking station 3502 may receive an instruction via the wireless transceiver 3522 to communicate with a control panel of the PED 3506 (which may be a software engine that exists in one or more of the power controller 3552, the video controller 3560, the audio controller 3564, and/or another processor/controller 3558 of the primary PED 3506). In this way, an administrator of the system 3500 (through a separate network device in communication with the wireless transceiver 3522) may have access to, e.g., information about the usage (power usage, time of use, time of day of usage statistics, etc.) of the PED 3506 (that is being tracked by, e.g., the control panel of the PED 3506). This communication with a control panel of the PED 3506 may also allow an administrator of the system 3500 to set various control features (e.g., time allowed for use, time of day allowed for use, maximum allowed power use, etc.) to control the functionality of the PED 3506. The docking station 3502 may also be similarly controlled by an administrator in this way (e.g., via a control panel of the docking station 3502 with features analogous to that of the control panel of the PED 3506).

Figure 36:
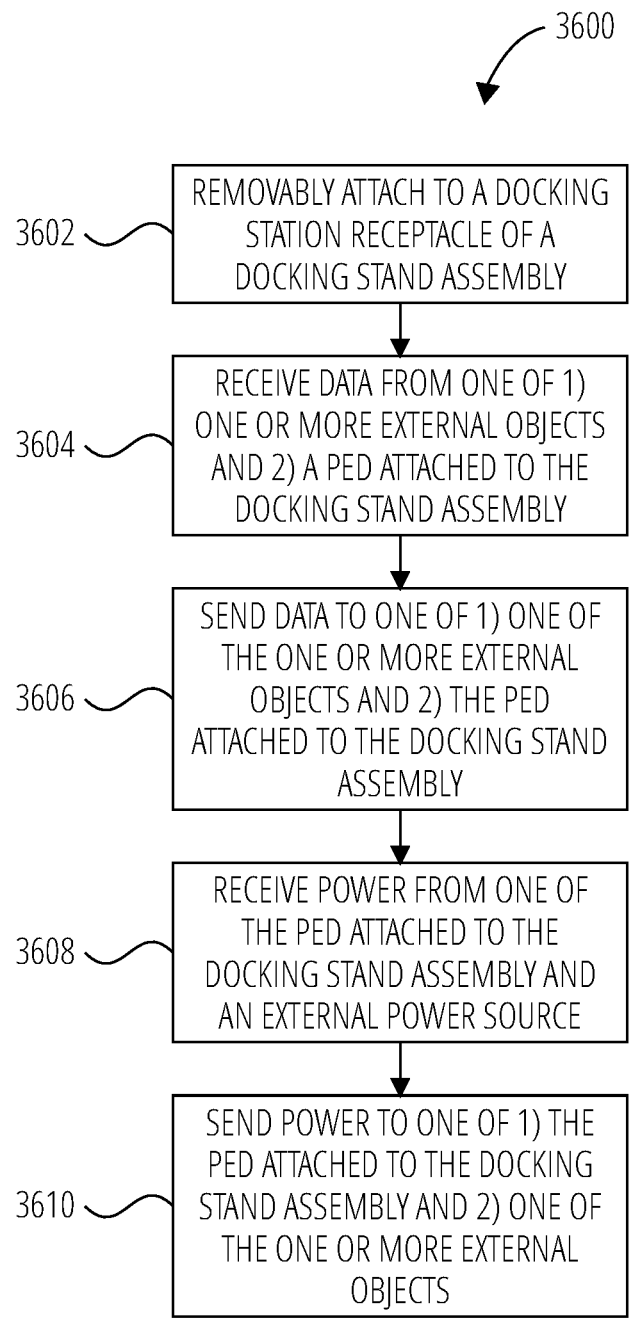
FIG. 36 illustrates a method of a docking station, according to an embodiment.

FIG. 36 illustrates a method 3600 of a docking station, according to an embodiment. The method 3600 includes removably attaching 3602 to a docking station receptacle of a docking stand assembly. This attachment may cause a combined data/power connector of the docking station to interface with a combined data/power connector of the docking station receptacle of the docking stand assembly.

The method 3600 further includes receiving 3604 data from one of 1) one or more external objects and 2) a PED attached to the docking stand assembly. Data received from an external object may be received via a connector (e.g., an RJ-45 connector, a USB connector, an HDMI connector, a DisplayPort connector, etc.) of the docking station and/or via a wireless transceiver of the docking station. Data received from the PED attached to the docking stand assembly may be received at a combined data/power connector of the docking station from a power and data delivery pathway of the docking stand assembly or via the wireless transceiver of the docking station.

The method 3600 further includes sending 3606 data to one of 1) one of the one or more external objects and 2) the PED attached to the docking stand assembly. Data sent to an external object may be sent via a connector (e.g., an RJ-45 connector, a USB connector, an HDMI connector, a DisplayPort connector, etc.) of the docking station and/or via a wireless transceiver of the docking station. Data sent to the PED attached to the docking stand assembly may be sent via a combined data/power connector of the docking station and transported via a power and data delivery pathway of the docking stand assembly or via the wireless transceiver of the docking station.

The method 3600 further includes receiving 3608 power from one of the PED attached to the docking stand assembly and an external power source. Power received from the PED attached to the docking stand assembly may be received at a combined data/power connector of the docking station from a power and data delivery pathway of the docking stand assembly. Power received from an external object may be received via a connector (e.g., an RJ-45 connector, a USB connector, etc.) of the docking station.

The method 3600 further includes sending 3610 power to one of 1) the PED attached to the docking stand assembly and 2) one of the one or more external objects. Power sent to the PED attached to the docking stand assembly may be sent using the combined data/power connector of the docking station and transported via a power and data delivery pathway of the docking stand assembly. Power sent to an external object may be sent via a connector (e.g., an RJ-45 connector, a USB connector, etc.) of the docking station.

Figure 37:
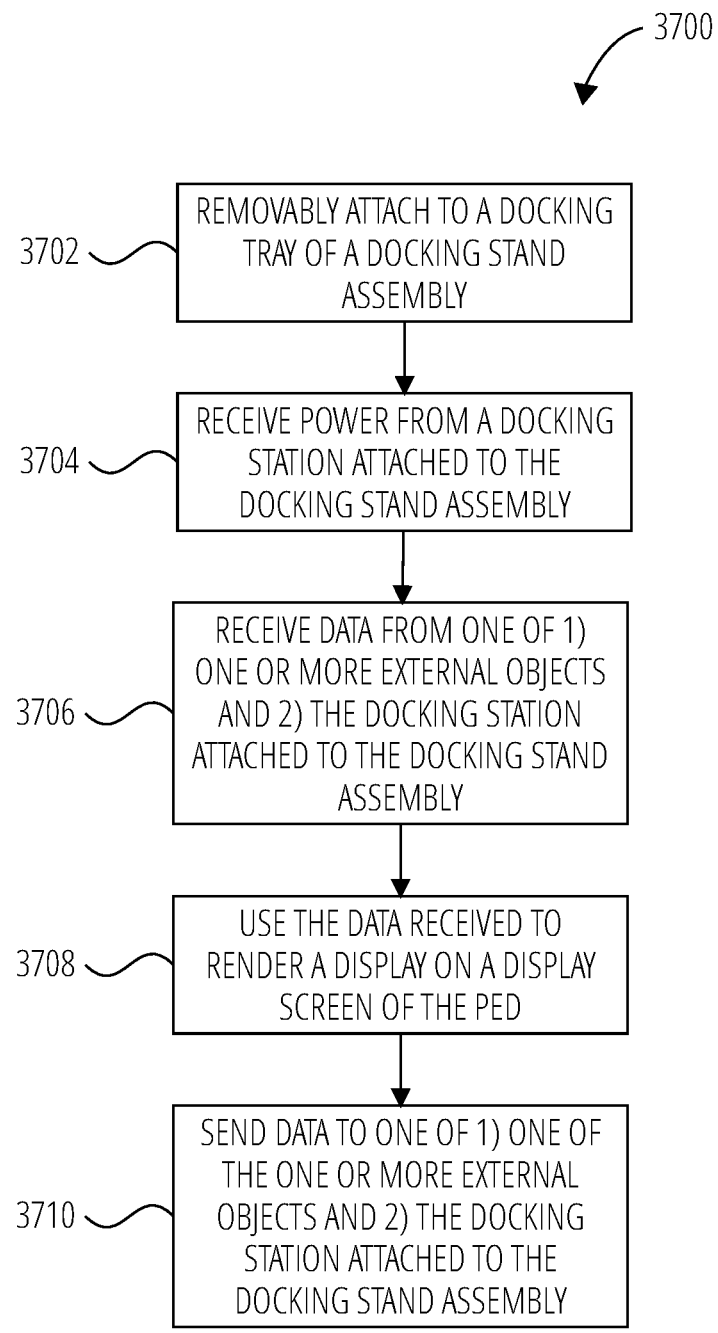
FIG. 37 illustrates a method of a PED, according to an embodiment.

FIG. 37 illustrates a method 3700 of a PED, according to an embodiment. The method 3700 includes removably attaching 3702 to a docking tray of a docking stand assembly. This attachment may cause a combined data/power connector of the PED to interface with a combined data/power connector of the docking tray of the docking stand assembly.

The method 3700 further includes receiving 3704 power from a docking station attached to the docking stand assembly. Power received from the docking station attached to the docking stand assembly may be received at a combined data/power connector of the PED from a power and data delivery pathway of the docking stand assembly.

The method 3700 further includes receiving 3706 data from one of 1) one or more external objects and 2) the docking station attached to the docking stand assembly. Data received from an external object may be received via a wireless transceiver of the PED. Data received from the docking station attached to the docking stand assembly may be received at a combined data/power connector of the PED from a power and data delivery pathway of the docking stand assembly or via the wireless transceiver of the PED.

The method 3700 further includes using 3708 the data received to render a display on a display screen of the PED. This data may also be used to play one or more sounds on speakers of the PED, perform calculations using a processor/controller of the PED, or for any other purpose.

The method 3700 further includes sending 3710 data to one of 1) one of the one or more external objects and 2) the docking station attached to the docking stand assembly. Data sent directly to an external object may be sent via a wireless transceiver of the docking station. Data sent to the docking station attached to the docking stand assembly may be sent via a combined data/power connector of the docking station and transported via a power and data delivery pathway of the docking stand assembly or via the wireless transceiver of the PED. From there, the docking station may use the data or subsequently forward it to an external object.

The docking stations, display apparatuses, and docking stand assemblies disclosed herein may respectively include one or more processors and/or controllers using instructions present thereon to implement one or more functionalities of each such docking station/display apparatus as those functionalities are described herein. The instructions used by such processors and/or controllers may be stored on a non-transitory computer readable storage medium on (or in communication with) such controllers and/or processors. It is anticipated that these processors and/or controllers (and associated non-transitory computer-readable instructions for use thereon) may be present in any embodiment disclosed herein (even if not explicitly discussed).

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present invention should, therefore, be determined by the following claims.

What is claimed is:

1. A docking stand assembly to receive and support a portable electronic device, comprising:
   a docking tray configured to receive the portable electronic device;
   a base comprising:
      a docking station receptacle configured to removably receive and house a docking station, wherein the docking station receptacle comprises an alignment rail configured to receive the docking station, and
      a locking plate receptacle to receive a locking plate, wherein the locking plate receptacle and the locking plate each comprise an access port to the docking station receptacle;
   a support member connecting the docking tray and the base;
   a first combined power/data connector disposed in the docking tray and configured to removably couple with a combined power/data connector of the portable electronic device to enable power and data communication with the portable electronic device;

a second combined power/data connector in electrical communication with the first combined power/data connector, and disposed in the docking station receptacle of the base; and a power and data delivery pathway between the first combined power/data connector and the second combined power/data connector and extending through at least part of the base.

2. The docking stand assembly of claim 1, wherein the second combined power/data connector is configured to interface with a combined data/power connector of the docking station when the docking station is placed within the docking station receptacle.

3. The docking stand assembly of claim 1, wherein the docking tray is removable.

4. The docking stand assembly of claim 1, wherein the docking tray is configured to receive a case and the portable electronic device disposed within the case.

5. The docking stand assembly of claim 4, wherein the docking tray comprises a lock configured to removably interlock with the case in order to secure the portable electronic device within the docking tray.

6. The docking stand assembly of claim 1, the base further comprising a lock slot to receive a device lock.

7. The docking stand assembly of claim 1, wherein the support member comprises a hinge configured to allow the docking tray to tilt relative to the base.

8. The docking stand assembly of claim 1, wherein the support member is attached to a top of the base and is configured to rotate about the top of the base.

9. The docking stand assembly of claim 1, further comprising an attachment device within the docking station receptacle to removably attach the docking station to the docking station receptacle.

10. A docking stand assembly to receive and support a portable electronic device, comprising:
   a docking tray configured to receive the portable electronic device;
   a base comprising:
      a docking station receptacle configured to removably receive and house a docking station, wherein the docking station receptacle comprises an alignment rail configured to receive the docking station, and
      a locking plate receptacle to receive a locking plate, wherein the locking plate receptacle and the locking plate each comprise an access port to the docking station receptacle;
   a support member connecting the docking tray and the base;
   a first combined power/data connector disposed in the docking tray and configured to removably couple with a combined power/data connector of the portable electronic device to enable power and data communication with the portable electronic device;
   a second combined power/data connector in electrical communication with the first combined power/data connector, and disposed in the docking station receptacle of the base; and
   a power and data delivery pathway between the first combined power/data connector and the second combined power/data connector and extending through at least part of the base; and
   the docking station to removably attach to the docking station receptacle of a docking stand assembly, comprising:
      a combined data/power connector to interface with the second combined power/data connector of the docking stand assembly to provide power and data communication between the docking station and a portable electronic device located at the docking tray of the docking stand assembly;
      an attachment device to removably attach the docking station to the docking station receptacle of the docking stand assembly; and
      one or more external object connectors to connect the docking station to one or more external objects.

11. The docking station of claim 10, wherein the combined data/power connecter is configured to directly interface with the second combined power/data connector of the docking stand assembly when the docking station is placed within the docking station receptacle of the docking stand assembly.

12. The docking station of claim 10, wherein one of the one or more external object connectors is a power connector; wherein an external object attached to the power connector provides power to the docking station.

13. The docking station of claim 12, wherein the power connector is a Universal Serial Bus (USB)-Type C (USB-C) connector.

14. The docking station of claim 10, wherein one of the one or more external object connectors comprises a communications connector to enable network communications between a communication device connected to the communications connector and the portable electronic device.

15. The docking station of claim 10, wherein the one or more external object connectors comprises a data connector.

16. The docking station of claim 15, wherein the data connector comprises a High Definition Media Interface (HDMI) connector.

17. The docking station of claim 15, wherein the data connector comprises a DisplayPort connector.

18. The docking station of claim 15, wherein the data connector comprises a Universal Serial Bus (USB) connector.

19. The docking station of claim 15, wherein the data connector is to communicate data from the portable electronic device to an output device attached to the data connector.

20. The docking station of claim 15, wherein the data connector is to communicate data from an input device attached to the data connector to the portable electronic device.

21. The docking station of claim 10, wherein the one or more external object connectors comprises a hybrid connector.

22. The docking station of claim 10, wherein the docking station comprises a wireless transceiver.

23. A docking stand assembly for interfacing with a portable electronic device, comprising:
   a docking tray configured to receive the portable electronic device;
   a base comprising,
      a docking station receptacle to removably receive and house a docking station, wherein the docking station receptacle comprises an alignment rail configured to receive the docking station, and
      a locking plate receptacle to receive a locking plate, wherein the locking plate receptacle and the locking plate each comprise an access port to the docking station receptacle;
   a support member connecting the docking tray and the base;
   a first combined power/data connector disposed in the docking tray and configured to removably couple with a combined power/data connector of the portable electronic device to enable power and data communication with the portable electronic device;
a second combined power/data connector in electrical communication with the first combined power/data connector and disposed in the docking station receptacle of the base; and
a power and data delivery pathway coupled to the first combined power/data connector and the second combined power/data connector and extending through at least part of the base; and
the docking station configured to be removably inserted into the docking station receptacle comprising:
an attachment device to removably attach the docking station to the docking station receptacle of the docking stand assembly;
a combined data/power connector to interface with the second combined power/data connector of the docking stand assembly when the docking station is inserted into the docking station receptacle of the docking stand assembly to provide power and data transport between the docking station and the portable electronic device when the portable electronic device is located in the docking tray of the docking stand assembly; and
one or more external object connectors to connect the docking station to one or more external objects.

24. The docking stand assembly of claim 23, further comprising the attachment device within the docking station receptacle to removably attach the docking station to the docking station receptacle of the docking stand assembly.

\* \* \* \* \*